US012539331B2

(12) United States Patent
Talaat et al.

(10) Patent No.: US 12,539,331 B2
(45) Date of Patent: Feb. 3, 2026

(54) ADJUVANT FOR ANIMAL AND HUMAN VACCINES

(71) Applicant: Wisconsin Alumni Research Foundation, Madison, WI (US)

(72) Inventors: Adel M. Talaat, Madison, WI (US); Shaswath Chandrasekar, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 18/450,908

(22) Filed: Aug. 16, 2023

(65) Prior Publication Data

US 2024/0091349 A1      Mar. 21, 2024

Related U.S. Application Data

(62) Division of application No. 16/900,070, filed on Jun. 12, 2020, now Pat. No. 11,771,761.

(60) Provisional application No. 62/860,640, filed on Jun. 12, 2019.

(51) Int. Cl.
*A61K 39/39* (2006.01)
*A61K 39/215* (2006.01)
*B82Y 5/00* (2011.01)
*A61K 39/00* (2006.01)

(52) U.S. Cl.
CPC ............ *A61K 39/39* (2013.01); *A61K 39/215* (2013.01); *A61K 2039/55577* (2013.01); *A61K 2039/55583* (2013.01); *B82Y 5/00* (2013.01)

(58) Field of Classification Search
CPC ...... A61K 2039/53; A61K 2039/55577; A61K 2039/55583; A61K 39/215; A61K 39/39; A61K 2039/55566; A61K 2039/55511; A61K 9/51; A61K 47/28; B82Y 5/00; B82Y 40/00
See application file for complete search history.

(56) References Cited

U.S. PATENT DOCUMENTS

| 7,897,744 B2 * | 3/2011 | Plummer ................ C12N 7/00 435/235.1 |
| 9,220,764 B2 | 12/2015 | Talaat |
| 9,663,758 B2 | 5/2017 | Talaat |
| 2009/0169636 A1 | 7/2009 | O'Hagan |
| 2018/0147272 A1 | 5/2018 | Talaat |

FOREIGN PATENT DOCUMENTS

| EP | 1227840 B1 | 10/2007 |
| WO | 2004092329 A2 | 10/2004 |

OTHER PUBLICATIONS

Sun et al. Vavvine, 2009, pp. 1787-1796.*
Zhang P, et al. 2017. Astragalus polysaccharides enhance the immune response to avian infectious bronchitis virus vaccination in chickens. Microb Pathog 111:81-85.
Bande et al., "Synthesis and Characterization of Chitosan-Saponin Nanoparticle for Application in Plasmid DNA Delivery," Journal of Nanomaterials, vol. 2015, Article ID 371529, 8 pages., Hindawi Publishing Corporation, http://dx.doi.org/10.1155/2015/371529, (2015).
Kamstrup et al., "Preparation and characterization of quillaja saponin with less heterogeneity than Quil-A," Vaccine 18, (2000) pp. 2244-2249.
Moreno et al., "Preparation and Characterization of an Oral Vaccine Formulation Using Electrosprayed Chitosan Microparticles," AAPS PharmSciTech, vol. 19, No. 8, (2018), DOI: 10.1208/s12249-018-1190-1.
Ren et al., "Construction and immunogenicity of a DNA vaccine coexpressing GP3 and GP5 of genotype-l porcine reproductive and respiratory syndrome virus," BMC Veterinary Research, (2014), 10:128.
Dalsgaardk, "Saponin Adjuvants", Archiv fur die gesamte Virusforschung, Sep. 30, 1974, pp. 1-12, XP093113544.
Gregory et al., "Vaccine delivery using nanoparticles", Frontiers in Cellular and Infection Microbiology, vol. 3, Jan. 1, 2013, XP093042960, DOI: 10.3389/fcimb.2013.00013.
Alpar, H. O., et al. "Quil-A-Chitosan: A novel mucosal adjuvant." (2003). MVADS Conference. Dublin, Ireland. Jun. 4-6, 2003.
Barhate, G., et al. "Quillaja saponaria extract as mucosal adjuvant with chitosan functionalized gold nanoparticles for mucosal vaccine delivery: stability and immunoefficiency studies." International journal of pharmaceutics 441.1-2 (2013): 636-642.
Behzadi S, et al. 2017. Cellular uptake of nanoparticles: journey inside the cell. Chem Soc Rev 46:4218-4244.
Berge, S. M., et al. "Pharmaceutical salts." Journal of pharmaceutical sciences 66.1 (1977): 1-19.
Borges O, et al. 2005. Preparation of coated nanoparticles for a new mucosal vaccine delivery system. Int J Pharm 299:155-66.
Britton P, et al. 2012. Modification of the avian coronavirus infectious bronchitis virus for vaccine development. Bioengineered Bugs 3:114-119.
Cavanagh D, et al. 1997. Relationship between sequence variation in the S1 spike protein of infectious bronchitis virus and the extent of cross-protection in vivo. Avian Pathology 26:63-74.
Chhabra R, et al. 2015. Immune Responses to Virulent and Vaccine Strains of Infectious Bronchitis Viruses in Chickens. Viral Immunol 28:478-88.
Chhabra R, et al. 2015. Mucosal, Cellular, and Humoral Immune Responses Induced by Different Live Infectious Bronchitis Virus Vaccination Regimes and Protection Conferred against Infectious Bronchitis Virus Q1 Strain. Clin Vaccine Immunol 22:1050-9.
Collisson EW, et al. 2000. Cytotoxic T lymphocytes are critical in the control of infectious bronchitis virus in poultry. Dev Comp Immunol 24:187-200.

(Continued)

Primary Examiner — Bao Q Li
(74) Attorney, Agent, or Firm — Quarles & Brady LLP

(57) ABSTRACT

Quil-A chitosan spherical nanostructure complexes as well as methods of making and using such complexes are disclosed herein. Also provided are Quil-A chitosan spherical nanostrucutres loaded with one or more RNA, DNA, or protein payload molecules as well as methods of making and using such loaded complexes.

20 Claims, 38 Drawing Sheets

Specification includes a Sequence Listing.

(56) References Cited

OTHER PUBLICATIONS

De Wit JJ, et al. 2014. Factors influencing the outcome of infectious bronchitis vaccination and challenge experiments. Avian Pathol 43:485-97.
Dolz R, et al. 2012. New insights on infectious bronchitis virus pathogenesis: Characterization of Italy 02 serotype in chicks and adult hens. Veterinary Microbiology 156:256-264.
Fraga AP, et al. 2013. Emergence of a New Genotype of Avian Infectious Bronchitis Virus in Brazil. Avian Diseases 57:225-232.
Ganapathy K, et al. 2005. A comparison of methods of inducing lachrymation and tear collection in chickens for detection of virus-specific immuoglobulins after infection with infectious bronchitis virus. Avian Pathol 34:248-51.
Garg, R. et al. "A novel combination adjuvant platform for human and animal vaccines." Vaccine 35.35 (2017):4486-4489.
Guo Z, et al. 2010. Priming with a DNA vaccine and boosting with an inactivated vaccine enhance the immune response against infectious bronchitis virus. J Virol Methods 167:84-9.
Hamers C, et al. 2007. DNA vaccination against pseudorabies virus and bovine respiratory syncytial virus infections of young animals in the face of maternally derived immunity. J Comp Pathol 137 Suppl 1:S35-41.
Harush-Frenkel O, et al. 2007. Targeting of nanoparticles to the clathrin-mediated endocytic pathway. Biochem Biophys Res Commun 353:26-32.
Ho Ni, et al. 2018. Adjuvants Enhancing Cross-Presentation by Dendritic Cells: The Key to More Effective Vaccines? Front Immunol 9:2874.
Hoven, V. P., et al. "Surface-charged chitosan: Preparation and protein adsorption." Carbohydrate Polymers 68.1 (2007): 44-53.
International Searching Authority. International Search Report and Written Opinion for application PCT/US2020/037438. Mailed on Nov. 4, 2020. 11 pages.
Jackwood MW, et al. 2009. Infectious bronchitis virus field vaccination coverage and persistence of Arkansas-type viruses in commercial broilers. Avian Dis 53:175-83.
Jazayeri SD, et al. 2019. Recent advances in delivery of veterinary DNA vaccines against avian pathogens. Vet Res 50:78.
Kapczynski DR, et al. 2003. Protection of chickens from infectious bronchitis by in ovo and intramuscular vaccination with a DNA vaccine expressing the S1 glycoprotein. Avian Dis 47:272-85.
Kingstad-Bakke, B. A., et al. "Effective mosaic-based nanovaccines against avian influenza in poultry." Vaccine 37.35 (2019): 5051-5058.
Lai, RPJ, et al. "Mixed adjuvant formulations reveal a new combination that elicit antibody response comparable to Freund's adjuvants." PloS one 7.4 (2012): e35083.
Levast, B., et al. "Vaccine potentiation by combination adjuvants." Vaccines 2.2 (2014): 297-322.
Liu MA. 2003. DNA vaccines: a review. J Intern Med 253:402-10.
Marangon S, et al. 2007. The use of vaccination in poultry production. Rev Sci Tech 26:265-74.
Mckinley ET, et al. 2008. Avian coronavirus infectious bronchitis attenuated live vaccines undergo selection of subpopulations and mutations following vaccination. Vaccine 26:1274-84.

Mockett AP, et al. 1987. Maternally-derived antibody to infectious bronchitis virus: Its detection in chick trachea and serum and its role in protection. Avian Pathol 16:407-16.
Mohammed MA, et al. 2017. An Overview of Chitosan Nanoparticles and Its Application in Non-Parenteral Drug Delivery. Pharmaceutics 9.
Mutwiri, G., et al. "Combination adjuvants: the next generation of adjuvants?." Expert review of vaccines 10.1 (2011): 95-107.
Orr-Burks N, et al. 2014. Immunoglobulin A as an early humoral responder after mucosal avian coronavirus vaccination. Avian Dis 58:279-86.
Oyewumi MO, et al. 2010. Nano-microparticles as immune adjuvants: correlating particle sizes and the resultant immune responses. Expert Rev Vaccines 9:1095-107.
Rajput ZI, et al. 2007. Adjuvant effects of saponins on animal immune responses. J Zhejiang Univ Sci B 8:153-61.
Riteau N, et al. 2016. Chitosan: An Adjuvant with an Unanticipated STING. Immunity 44:522-524.
Roy K, et al. 1999. Oral gene delivery with chitosan—DNA nanoparticles generates immunologic protection in a murine model of peanut allergy. Nat Med 5:387-91.
Seo SH, et al. 2000. Adoptive transfer of infectious bronchitis virus primed alphabeta T cells bearing CD8 antigen protects chicks from acute infection. Virology 269:183-9.
Shirvani E, et al. 2018. A Recombinant Newcastle Disease Virus (NDV) Expressing S Protein of Infectious Bronchitis Virus (IBV) Protects Chickens against IBV and NDV. Sci Rep 8:11951.
Sogias IA, et al. 2008. Why is chitosan mucoadhesive? Biomacromolecules 9:1837-42.
Tan B, et al. 2009. Coadministration of chicken GM-CSF with a DNA vaccine expressing infectious bronchitis virus (IBV) S1 glycoprotein enhances the specific immune response and protects against IBV infection. Arch Virol 154:1117-24.
Tan L, et al. 2016. Infectious bronchitis virus poly-epitope-based vaccine protects chickens from acute infection. Vaccine 34:5209-5216.
Tang M, et al. 2008. Enhancement of the immunogenicity of an infectious bronchitis virus DNA vaccine by a bicistronic plasmid encoding nucleocapsid protein and interleukin-2. J Virol Methods 149:42-8.
Tian L, et al. 2008. The immunoreactivity of a chimeric multi-epitope DNA vaccine against IBV in chickens. Biochem Biophys Res Commun 377:221-5.
Wack, A., et al. "Combination adjuvants for the induction of potent, long-lasting antibody and T-cell responses to influenza vaccine in mice." Vaccine 26.4 (2008): 552-561.
Wolff JA, et al. 1990. Direct gene transfer into mouse muscle in vivo. Science 247:1465-8.
Yan F, et al. 2013. Protection of chickens against infectious bronchitis virus with a multivalent DNA vaccine and boosting with an inactivated vaccine. J Vet Sci 14:53-60.
Yang T, et al. 2009. Multivalent DNA vaccine enhanced protection efficacy against infectious bronchitis virus in chickens. J Vet Med Sci 71:1585-90.
Zhang F, et al. 2016. Intranasal Immunization of Mice to Avoid Interference of Maternal Antibody against H5N1 Infection. PLoS One 11:e0157041.

* cited by examiner

DLS size measurement (Chitosan-DNA complex 100 ug/ml – left and 100 ug/ml – right FIGS. 19A-19B
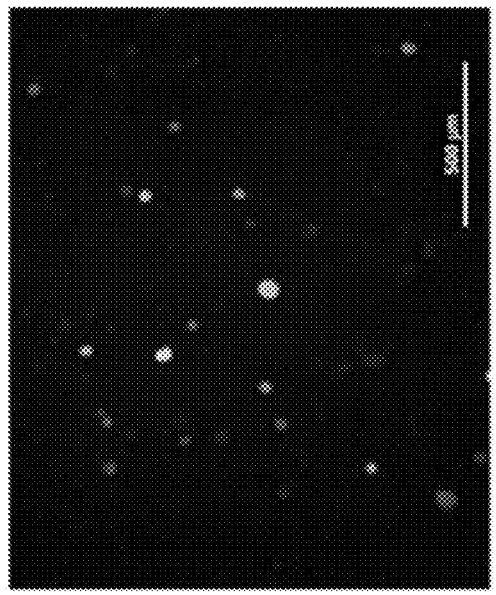
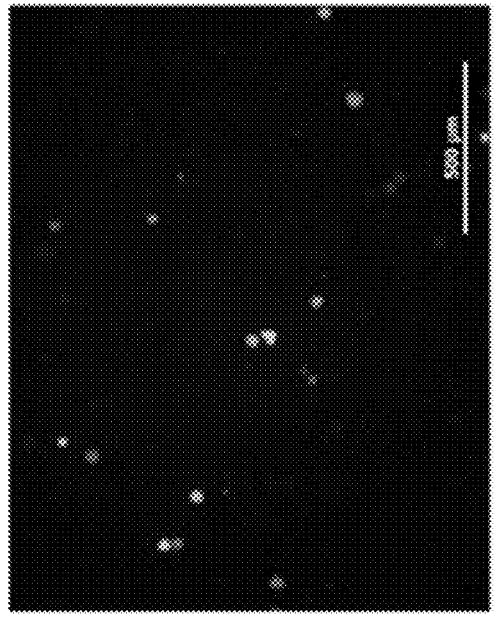
A)
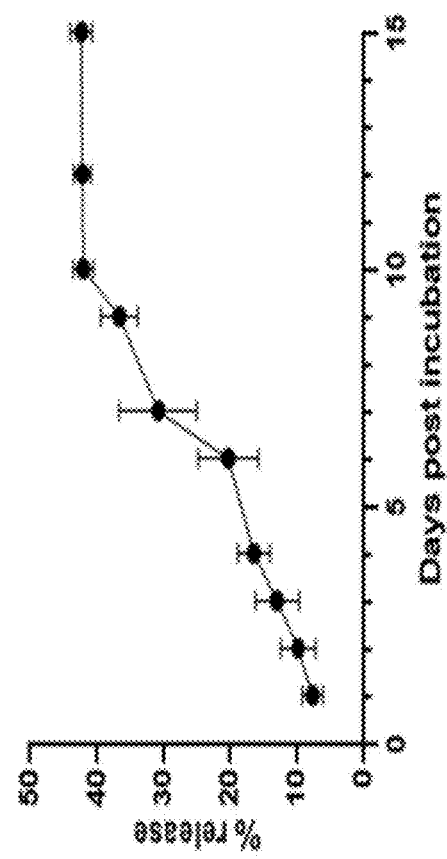
B)

FIGS. 21A-21B
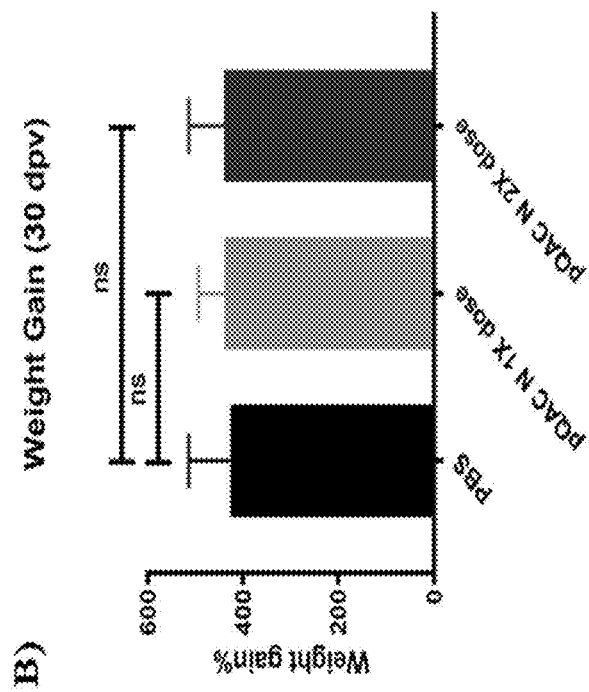
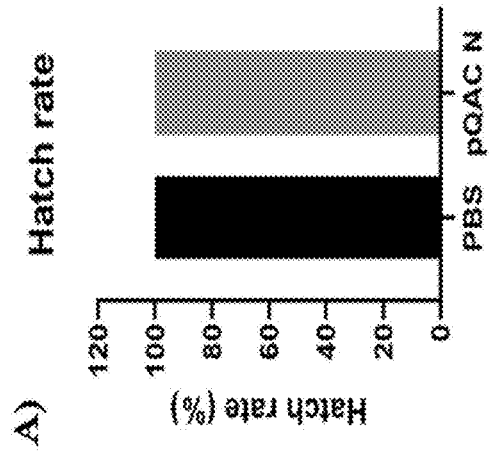

FIG. 29 pCAG- IBV Arkansas Truncated Spike
8121 bp

SEQUENCE LISTING

```
Sequence total quantity: 20
SEQ ID NO: 1                  moltype = DNA  length = 6051
FEATURE                       Location/Qualifiers
misc_feature                  1..6051
                              note = synthetic
source                        1..6051
                              mol_type = other DNA
                              organism = synthetic construct
SEQUENCE: 1
gtcgacattg attattgact agttattaat agtaatcaat tacggggtca ttagttcata    60
gcccatatat ggagttccgc gttacataac ttacggtaaa tggcccgcct ggctgaccgc   120
ccaacgaccc ccgccattg acgtcaataa tgacgtatgt tcccatagta acgccaatag    180
ggactttcca ttgacgtcaa tgggtggact atttacggta aactgcccac ttggcagtac   240
atcaagtgta tcatatgcca agtacgcccc ctattgacgt caatgacggt aaatggcccg   300
cctggcatta tgcccagtac atgaccttat gggactttcc tacttggcag tacatctacg   360
tattagtcat cgctattacc atgggtcgag gtgagcccca cgttctgctt cactctcccc   420
atctcccccc cctccccacc cccaattttg tatttattta tttttaatt attttgtgca    480
gcgatggggg cggggggggg ggggcgcgc gccaggcggg gcgggcggg gcgaggggcg     540
gggcggggcg aggcggagag gtgcggcggc agccaatcag agcggcgcgc tccgaaagtt   600
tccttttatg gcgaggcggc ggcggcggcg gccctataaa aagcgaagcg cgcggcgggc   660
gggagtcgct gcgttgcctt cgccccgtgc cccgctccgc gccgctcgc gccgcccgcc    720
ccggctctga ctgaccgcgt tactcccaca ggtgagcggg cgggacggcc cttctcctcc   780
gggctgtaat tagcgcttgg tttaatgacg gctcgttct tttctgtggc tgctgaaag     840
ccttaaaggg ctccgggagg gcccctttgtg cgggggggag cggctcgggg ggtgcgtgcg  900
tgtgtgtgtg cgtggggagc gccgcgtgcg gcccgcgctg cccggcggct gtgagcgctg   960
cgggcgcggc gcggggcttt gtgcgctccg cgtgtgcgcg aggggagcgc ggccggggc   1020
ggtgcccgc ggtgcggggg ggctgcgagg gaacaaagg ctgcgtgcgg ggtgtgtgcg    1080
tgggggggtg agcaggggt gtgggcgcgg cggtcggct gtaaccccc cctgcacccc    1140
cctcccgag ttgctgagca cggcccggct tcgggtgcgg ggctccgtgc ggggcgtggc  1200
gcggggctcg ccgtgccggg cggggggtgg cggcaggtgg gggtgccggg cggggcgggg  1260
ccgcctcggg ccggggaggg ctcgggggag gggcgcggcg gccccccggag cgccggcggg  1320
tgtcgaggcg cggcgagccg cagccattgc ctttattggt aatcgtgcga gaggcgcag  1380
ggacttcctt tgtcccaaat ctgtgcggag ccgaaatctg ggaggcgccg ccgcacccc   1440
tctagcgggc gcggggcgaa gcggtgcggc gccggcagga aggaaatggg cggggagggc  1500
cttcgtgcgt cgccgcgccg ccgtcccctt ctccctctcc agcctcgggg ctgtccgcgg  1560
gggacggct gccttcgggg gggacggggc agggcgggt tcggcttctg gcgtgtgacc    1620
ggcggctcta gagcctctgc taaccatgtt catgccttct tcttttcct acagctcctg   1680
ggcaacgtgc tggttattgt gctgtctcat cattttggca agaattcac catggcaagc   1740
ggtaaagcaa ctggaaagac agacgcccca gcgccagtca tcaaactagg aggaccaaag  1800
ccacctaaag ttggttcttc tggaaatgca tcttggtttc aagcaataaa agccaagaag  1860
ctaaattcac atccacctaa gtttgaaggt agcggtgttc ctgataatga aaatcttaaa  1920
acaagtcagc aacatggata ctggaggcgc caagccaggt ttaagccagt taaaggcgga  1980
agaaaaccag tcccagatgc ttggtacttc tattatactg gaacaggacc agccgctgac  2040
ctgaattggg gtgatagcca agatggtata gtgtgggttg ctgcaaaggg tgctgatgtt  2100
aaatctagat ctcaccaggg tacaaggac cctgacaagt tgaccaata tccactacga    2160
ttctcggacg gaggacctga tggtaatttc cgttgggact tcattcctct gaatcgtggt  2220
aggagtgaa gatcaacagc agcttcatca gcagcatcta gtagagcacc gtcgcgtgac  2280
ggctcgcgtg gtcgtagaag tggttctgaa gatgatcta ttgctcgtgc agcaaagata   2340
atccaggatc agcagaagaa gggttctcgc attactaagg ttaaggctga tgaaatggct  2400
caccgccggt attgcaagcg cactattcca cctggttata aggttgatca agtctttggc  2460
ccccgtacta aaggtaagga gggaaatttt ggtgatgaca agatgaatga ggaaggtatt  2520
aaggagggcg tgttacagc aatgctcaac ctagtcccta gcagccatgc ttgtcttttt  2580
ggaagtagag tgacgcccaa actacaacca gatgggctgc acttgaaatt tgaatttact  2640
actgtggtcc cacgtgatga tccgcagttt gataattatg ttaaaatttg tgatcagtgt  2700
gttgatggtg taggaacacg tccaaagat gatgaaccga gaccaaagtc acgctcaagt  2760
tcaagacctg ctacaagaac aagttctccg gcgccaagac aacaacgccc aaagaaggag  2820
aaaaagccaa agaagcagga tgatgaagta gataaagcat tgacctcaaa tgaggagagg  2880
```

```
aacaatgcac agctggaatt tgatgaggaa cccaaggtga ttaactgggg ggatgcagct    2940
ctaggagaga atgaacttgg aggaggtcat catcaccatc accactaagc ggccgcactc    3000
ctcaggtgca ggctgcctat cagaaggtgg tggctggtgt ggccaatgcc ctggctcaca    3060
aataccactg agatcttttt ccctctgcca aaaattatgg ggacatcatg aagccccttg    3120
agcatctgac ttctggctaa taaaggaaat ttattttcat tgcaatagtg tgttggaatt    3180
ttttgtgtct ctcactcgga aggacatatg ggagggcaaa tcatttaaaa catcagaatg    3240
agtatttggt ttagagtttg gcaacatatg cccatatgct ggctgccatg aacaaaggtg    3300
gctataaaga ggtcatcagt atatgaaaca gcccctgct gtccattcct tattccatag    3360
aaaagccttg acttgaggtt agatttttt tatattttgt tttgtgttat tttttcttt    3420
aacatcccta aaattttcct tacatgttt actagccaga tttttcctcc tctcctgact    3480
actcccagtc atagctgtcc ctcttctctt atgaagatcc ctcgacctgc agcccaagct    3540
tggcgtaatc atggtcatag ctgtttcctg tgtgaaattg ttatccgctc acaattccac    3600
acaacatacg agccggaagc ataaagtgta aagcctgggg tgcctaatga gtgagctaac    3660
tcacattaat tgcgttgcgc tcactgcccg ctttccagtc gggaaacctg tcgtgccagc    3720
ggatccgcat ctcaattagt cagcaaccat agtcccgccc ctaactccgc ccatcccgcc    3780
cctaactccg cccagttccg cccattctcc gccccatggc tgactaattt ttttttattta   3840
tgcagaggcc gaggccgcct cggcctctga gctattccag aagtagtgag gaggcttttt    3900
tggaggccta ggcttttgca aaaagctaac ttgtttattg cagcttataa tggttacaaa    3960
taaagcaata gcatcacaaa tttcacaaat aaagcatttt tttcactgca ttctagttgt    4020
ggtttgtcca aactcatcaa tgtatcttat catgtctgga tccgctgcat taatgaatcg    4080
gccaacgcgc ggggagaggc ggtttgcgta ttgggcgctc ttccgcttcc tcgctcactg    4140
actcgctgcg ctcggtcgtt cggctgcggc gagcggtaa agctcactca aaggcggtaa    4200
tacggttatc cacagaatca ggggataacg caggaaagaa catgtgagca aaaggccagc    4260
aaaaggccag gaaccgtaaa aaggccgcgt tgctggcgtt tttccatagg ctccgccccc    4320
ctgacgagca tcacaaaaat cgacgctcaa gtcagaggtg gcgaaacccg acaggactat    4380
aaagatacca ggcgtttccc cctggaagct ccctcgtgcg ctctcctgtt ccgaccctgc    4440
cgcttaccgg atacctgtcc gcctttctcc cttcggaagc gtggcgctt tctcaatgct    4500
cacgctgtag gtatctcagt tcggtgtagg tcgttcgctc caagctgggc tgtgtgcacg    4560
aaccccccgt tcagcccgac cgctgcgcct tatccggtaa ctatcgtctt gagtccaacc    4620
cggtaagaca cgacttatcg ccactggcag cagccactgg taacaggatt agcagagcga    4680
ggtatgtagg cggtgctaca gagttcttga agtggtggcc taactacggc tacactagaa    4740
ggacagtatt tggtatctgc gctctgctga agccagttac cttcggaaaa agagttggta    4800
gctcttgatc cggcaaacaa accaccgctg gtagcggtgg tttttttgtt tgcaagcagc    4860
agattacgcg cagaaaaaaa ggatctcaag aagatccttt gatcttttct acggggtctg    4920
acgctcagtg gaacgaaaac tcacgttaag ggattttggt catgagatta tcaaaaagga    4980
tcttcaccta gatcctttta aattaaaaat gaagttttaa atcaatctaa agtatatatg    5040
agtaaacttg gtctgacagt taccaatgct taatcagtga ggcacctatc tcagcgatct    5100
gtctatttcg ttcatccata gttgcctgac tccccgtcgt gtagataact acgatacggg    5160
agggcttacc atctggcccc agtgctgcaa tgataccgcg agaaccacgc tcaccggctc    5220
cagatttatc agcaataaac cagccagccg aagggccga gcgcagaagt ggtcctgcaa    5280
ctttatccgc ctccatccag tctattaatt gttgccggga agctagagta agtagttcgc    5340
cagttaatag tttgcgcaac gttgttgcca ttgctacagg catcgtggtg tcacgctcgt    5400
cgtttggtat ggcttcattc agctccggtt cccaacgatc aaggcgagtt acatgatccc    5460
ccatgttgtg caaaaaagcg gttagctcct tcggtcctcc gatcgttgtc agaagtaagt    5520
tggccgcagt gttatcactc atggttatgg cagcactgca taattctctt actgtcatgc    5580
catccgtaag atgcttttct gtgactggtg agtactcaac caagtcattc tgagaatagt    5640
gtatgcggcg accgagttgc tcttgcccgg cgtcaatacg ggataaatcc gcgcacata    5700
gcagaacttt aaaagtgctc atcattggaa aacgttcttc ggggcgaaaa ctctcaagga    5760
tcttaccgct gttgagatcc agttcgatgt aacccactcg tgcacccaac tgatcttcag    5820
catctttac tttcaccagc gtttctgggt gagcaaaaac aggaaggcaa aatgccgcaa    5880
aaaagggaat aagggcgaca cggaaatgtt gaatactcact actcttcctt tttcaatatt    5940
attgaagcat ttatcagggt tattgtctca tgagcggata catatttgaa tgtatttaga    6000
aaaataaaca aataggggtt ccgcgcacat ttccccgaaa agtgccacct  g           6051

SEQ ID NO: 2            moltype = DNA  length = 8121
FEATURE                 Location/Qualifiers
misc_feature            1..8121
                        note = synthetic
source                  1..8121
                        mol_type = other DNA
                        organism = synthetic construct
SEQUENCE: 2
gtcgacattg attattgact agttattaat agtaatcaat tacgggtca ttagttcata     60
gcccatatat ggagttccgc gttacataac ttacggtaaa tggcccgcct ggctgaccgc    120
ccaacgaccc ccgcccattg acgtcaataa tgacgtatgt tcccatagta acgccaatag    180
ggactttcca ttgacgtcaa tgggtggact atttacggta aactgcccac ttggcagtac    240
atcaagtgta tcatatgcca agtacgcccc ctattgacgt caatgacggt aaatggcccg    300
cctggcatta tgcccagtac atgaccttat gggactttcc tacttggcag tacatctacg    360
tattagtcat cgctattacc atggtcgag gtgagcccca cgttctgctt cactctcccc    420
atctcccccc cctccccacc cccaattttg tatttattta ttttttaatt attttgtgca    480
gcgatggggg cggggggggg ggggcgcgc gccaggcggg gcgggcggg gcgaggggcg      540
gggcgggcc aggcggagag gtgcggcggc agccaatcag agcggcgcgc tccgaaagtt     600
tccttttatg gcgaggcggc ggcggcgcg gccctataaa aagcgaagcg cgcggcgggc     660
gggagtcgct gcgttgcctt cgccccgtgc cccgctccgc cgccgcctcg cgccgcccgc    720
ccggctctga ctgaccgcgt tactcccaca ggtgagcggg cgggacggcc cttctcctcc    780
gggctgtaat tagcgcttgg tttaatgacg gctcgtttct tttctgtggc tgcgtgaaag    840
ccttaaaggg ctccgggagg gccctttgtg cggggggag cggctcgggg ggtgcgtgcg    900
tgtgtgtgtg cgtggggagc gccgcgtgcg gcccgcgctg cccggcggct gtgagcgctg    960
cgggcgcggc gcggggcttt gtgcgctccg cgtgtgcgcg aggggagcgc ggccggggc    1020
```

```
ggtgccccgc ggtgcggggg ggctgcgagg ggaacaaagg ctgcgtgcgg ggtgtgtgcg   1080
tgggggggtg agcagggggt gtgggcgcgg cggtcgggct gtaacccccc cctgcacccc   1140
cctccccgag ttgctgagca cggcccggct tcggtgcgg  ggctccgtgc ggggcgtggc   1200
gcggggctcg ccgtgccggg cggggggtgg cggcaggtgg gggtgccggg cggggcgggg   1260
ccgcctcggg ccgggaggg  ctcggggag  gggcgcgggg gccccggag  cgccggcggc   1320
tgtcgaggcg cggcgagccg cagccattgc cttttatggt aatcgtgcga gagggcgcag   1380
ggacttcctt tgtcccaaat ctgtgcgag  ccgaaatctg ggaggcgccg ccgcacccc   1440
tctagcgggc gcggggcgaa gcggtgcggc gccggcagga aggaaatggg cggggagggc   1500
cttcgtgcgt cgccgcgccg ccgtcccctt ctccctctcc agcctcgggg ctgtccgcgg   1560
ggggacggct gccttcgggg gggacggggc agggcgggt  tcggctttctg gcgtgtgacc   1620
ggcggctcta gagcctctgc taaccatgtt catgccttct tctttttcct acagctcctg   1680
ggcaacgtgc tggttattgt gctgtctcat cattttggca aagaattcac catgttggtg   1740
aagtcactgt ttctagtgac cattttgttt gcactatga  gtgctaattt atatgacaac   1800
gaatcttttg tgtattacta ccagagtgct tttaggccag gacatggttg gcatttacat   1860
ggaggtgctt atgcagtagt taatgtgtct agtgaaaata ataatgcagg tactgcccca   1920
agttgcactg ctggtgctat tggctacagt aagaatttca gtgcgcctc  agtagccatg   1980
actgcaccac taagtggtat gtcatggtct gcctcatctt tttgtacagc tcactgtaat   2040
tttacttctt atatagtgtt tgttacacat tgttttaaga gcggatcaaa tagttgtcct   2100
ttgacaggtc ttattccaag cggttatatt cgtattgctg ctatgaaaca tggaagtgct   2160
acgcctggtc acttatttta taacttaaca gtttctgtga ctaaatatcc taagtttaga   2220
tcgctacaat gtgttaataa tcatacttct gtatatttaa atggtgacct tgttttcaca   2280
tctaactata ctgaagtgat tgtagctgca ggtgtccatt ttaaaagtgg tggacctata   2340
acttataaag ttatgagaga ggttaaagcc ttggcttatt ttgtcaatgg tactgcacat   2400
gatgtcattc tatgtgatga cacacctaga ggtttgttag catgccaata taatactggc   2460
aattttttcag atggcttcta tcctttact  aatactagta ttgttaagga taagtttatt   2520
gtttatcgtg aaagtagtgt caatactcact ttgcattaa  ctaatttcac gtttagtaat   2580
gaaagtggtg cccctcctaa tacaggtggg gttgacagtt ttattttata ccagacacaa   2640
acagctcaga gtggttatta aatttttaat ttttcatttc tgagtagttt tgtttataagg   2700
gaaagtaatt atatgtatgg atcttaccat ccacgttgta gttttagacc tgaaacccctt   2760
aatggtttgt ggtttaattc cctttctgtt tcattaacat acggtcccat tcaaggtggt   2820
tgtaagcaat ctgtatttaa tggtaaagca acttgttgtt atgcttattc atacggagga   2880
cctcgtgctt gtaaaggtgt ctatagaggt gagctaacac agcatttga  atgtggtttg   2940
ttagtttatg ttactaagag cgatggctcc cgtatacaaa ctgcaacaca accacctgta   3000
ttaaccccaaa attttttataa taacatcact ttaggtaagt gtgttgatta taatgtttat   3060
ggtagaactg gacaaggttt tattactaat gtaactgatt tagctacttc tcataattac   3120
ttagcggatg gaggattagc tattttagat acatctggtg ccatagacat cttcgttgta   3180
caaggtgaat atgccctaa  ctactataag gttaatctat gtgaagatgt taaccaacag   3240
tttgtagttt ctggtggtaa attagtaggt attctcactt cacgtaatga aactggttct   3300
cagcctcttg aaaaccagtt ttacattaag atcactaatg aacacatcg  ttctagacgt   3360
tctgttaatg aaaatgttac gaattgccct tatgttagtt atggcaagtt ttgtatataaaa  3420
cctgatggtt cagtttctcc tatagtacca aagaacttg  aacagtttgt ggcacctttta   3480
cttaatgtta ctgaaaatgt gctcatacct aacagtttta acttaactgt tacagatgag   3540
tacataccaaaa cgcatatgga taagatccaa attaattgtc tgtgatgtt  ttgtggcaac   3600
tctttggctt gtagaaagct gttttcaacaa tatgggcctg tttgtgacaa catattgtct   3660
gtagtaaata gtgttggtca aaaagaagat atggaacttt taagcttcta ttcttctact   3720
aaaccatctg gttttaatac accagttttt agtaatctta gcactggtga gtttaatatc   3780
tctcttttgt taacaacccc tagtagtcct agagggcctt cttttattga agatctttta   3840
tttacaagtg ttgaatctgt tggattacca acagatgaag cttataaaaa gtgcactgca   3900
ggacctttag gctttcttaa agaccttgca tgtgctcgtg aatataatgg tttgcttgtg   3960
ttgcctccta tttaacagc  agaaatgcaa actttgtata ctagttctct agtagttct    4020
atggcttttgt ggtgattac ttcagctggt gctatacctt ttgccacaca actgcaggct   4080
agaattaatc acttgggat  tacccagtca cttttgttga agaatcaaga aaaaattgct   4140
gcttccttta ataaggccat tggtcatatg caggaaggtt ttaggagtac atctctagca   4200
ttacaacaaa ttcaagatgt tgttaataag cagagtgcta ttcttactga gactatgtta   4260
gcacttaata aaaattttgg tgctatttct tctgtgattc aagacatttta ccagcaactt   4320
gatgacatac aagcagatgc tcaagtggat cgactcataa ctggtagatt gtcatcactt   4380
tctgtcttag catctgctaa gcagtcggag tacattagag tgtcacaaca gcgtgagtta   4440
gctactcaga aaattaatga gtgtgttaaa tcacagtcta ttaggtattc cttttgtggt   4500
aatggacgac atgttttaac cataccacaa aatgcccta  atggtatagt ttttatacac   4560
tttacttata caccagagag cttttataat gttactgcag tagtaggttt ttgtgtaagt   4620
cctgctaatg ctagtcagta tgcaatagtg cccgctaatg gtagggtat  ttttatacaa   4680
gttaatggta gttactacat cactgcacgt gatatgtata tgccaagaga tattactgca   4740
ggagatatag ttacgcttac ttcttgtcaa gcaaattatg taagtgtaaa caagaccgtc   4800
attactacat ttgtagacaa tgatgatttt gattttgatg acgaattta  aaaatgggt    4860
aatgaaacta agcacgagtt gccagacttt gaccagttta attaccaccat tcccgtttta   4920
aatataactt atgatattga caagattgag gaagttatta gggacttaa  tgattccttg   4980
attgacctcg aaacattgtc aattctcaaa acttatatta agtggccggg aggaggtcat   5040
catcaccatc accactaagc ggccgcactc ctcaggtgca ggctgcctat cagaaggtgg   5100
tggctggtgt ggccaatgcc ctggctcaca aataccactg agatcttttt ccctctgcca   5160
aaaattatgg ggacatcatg aagccccttg agcatctgac ttctggctaa taaggaaat   5220
ttattttcat tgcaatagtg tgttggaatt ttttgtgtct ctcactcgga aggacatatg   5280
ggagggcaaa tcatttaaaa catcagaatg agtatttggt ttagagtttg gcaacatatg   5340
cccatatgct ggctgccatg aacaaggtg  gctaaaaga  ggtcatcagt atatgaaaca   5400
gcccccctgct gtccattcct tattccatag aaaagccttg acttgaggtt agatttttt   5460
tatatttttgt tttgtgttat ttttttcttt aacatcccta aattttcctt tacatgtttt   5520
actagccaga ttttttcctcc tctcctgact actcccagtc atagctgtcc ctcttctctt   5580
atgaagatcc ctcgacctgc agcccaagct tggcgtaatc atggtcatag ctgtttcctg   5640
tgtgaaattg ttatccgctc acaattccac acaacatacg agccgaagc  ataaagtgta   5700
aagcctgggg tgcctaatga gtgagctaac tcacattaat tgcgttgcgc tcactgcccg   5760
```

```
ctttccagtc gggaaacctg tcgtgccagc ggatccgcat ctcaattagt cagcaaccat    5820
agtcccgccc ctaactccgc ccatcccgcc cctaactccg cccagttccg cccattctcc    5880
gccccatggc tgactaattt tttttatttta tgcagaggcc gaggccgcct cggcctctga    5940
gctattccag aagtagtgag gaggcttttt tggaggccta ggcttttgca aaaagctaac    6000
ttgtttattg cagcttataa tggttacaaa taaagcaata gcatcacaaa tttcacaaat    6060
aaagcatttt tttcactgca ttctagttgt ggtttgtcca aactcatcaa tgtatccttat    6120
catgtctgga tccgctgcat taatgaatcg gccaacgcgc ggggagaggc ggtttgcgta    6180
ttgggcgctc ttccgcttcc tcgctcactg actcgctgcg ctcggtcgtt cggctgcggc    6240
gagcggtatc agctcactca aaggcggtaa tacggttatc cacagaatca ggggataacg    6300
caggaaagaa catgtgagca aaaggccagc aaaaggccag gaaccgtaaa aaggccgcgt    6360
tgctggcgtt tttccatagg ctccgccccc ctgacgagca tcacaaaaat cgacgctcaa    6420
gtcagaggtg gcgaaacccg acaggactat aaagatacca ggcgtttccc cctggaagct    6480
ccctcgtgcg ctctcctgtt ccgacccctgc cgcttaccgg atacctgtcc gcctttctcc    6540
cttcgggaag cgtggcgctt tctcaatgct cacgctgtag gtatctcagt tcggtgtagg    6600
tcgttcgctc caagctgggc tgtgtgcacg aaccccccgt tcagcccgac cgctgcgcct    6660
tatccggtaa ctatcgtctt gagtccaacc cggtaagaca cgacttatcg ccactggcag    6720
cagccactgg taacaggatt agcagagcga ggtatgtagg cggtgctaca gagttcttga    6780
agtggtggcc taactacggc tacactagaa ggacagtatt tggtatctgc gctctgctga    6840
agccagttac cttcggaaaa agagttggta gctcttgatc cggcaaacaa accaccgctg    6900
gtagcggtgg ttttttgtt tgcaagcagc agattacgcg cagaaaaaaa ggatctcaag    6960
aagatccttt gatcttttct acggggtctg acgctcagtg aacgaaaac tcacgttaag    7020
ggattttggt catgagatta tcaaaaagga tcttcaccta gatccttta aattaaaaat    7080
gaagttttaa atcaatctaa agtatatatg agtaaacttg gtctgacagt taccaatgct    7140
taatcagtga ggcacctatc tcagcgatct gtctatttcg ttcatccata gttgcctgac    7200
tccccgtcgt gtagataact acgatacggg agggcttacc atctggcccc agtgctgcaa    7260
tgatacccgcg agacccacgc tcaccggctc cagatttatc agcaataaac cagccagccg    7320
gaagggccga gcgcagaagt ggtcctgcaa ctttatccgc ctccatccag tctattaatt    7380
gttgccggga agctagagta agtagttcgc cagttaatag tttgcgcaac gttgttgcca    7440
ttgctacagg catcgtggtg tcacgctcgt cgtttggtat ggcttcattc agctccggtt    7500
cccaacgatc aaggcgagtt acatgatccc ccatgttgtg caaaaaagcg gttagctcct    7560
tcggtcctcc gatcgttgtc agaagtaagt tggccgcagt gttatcactc atggttatgg    7620
cagcactgca taattctctt actgtcatgc catccgtaag atgcttttct gtgactggtg    7680
agtactcaac caagtcattc tgagaatagt gtatgcggcg accgagttgc tcttgcccgg    7740
cgtcaatacg ggataatacc gcgccacata gcagaacttt aaaagtgctc atcattggaa    7800
aacgttcttc ggggcgaaaa ctctcaagga tcttaccgct gttgagatcc agttcgatgt    7860
aacccactcg tgcacccaac tgatcttcag catctttta cttcaccagc gtttctgggt    7920
gagcaaaaac aggaaggcaa aatgccgcaa aaaagggaat aagggcgaca cggaaatgtt    7980
gaatactcat actcttcctt tttcaatatt attgaagcat ttatcagggt tattgtctca    8040
tgagcggata catatttgaa tgtatttaga aaaataaaca aataggggtt ccgcgcacat    8100
ttccccgaaa agtgccacct g                                              8121

SEQ ID NO: 3          molType = DNA   length = 5471
FEATURE               Location/Qualifiers
misc_feature          1..5471
                      note = synthetic
source                1..5471
                      mol_type = other DNA
                      organism = synthetic construct
SEQUENCE: 3
accatgagcg ataacggacc ccagaaccaa cgtaacgccc ctcgcattac ttttggcggg      60
ccttccgact ctacaggttc taatcaaaac ggggagcgaa gcggggcacg cagcaagcaa    120
cgcaggcctc aagtctgcc aaacaacact gcttcttggt tcactgctct cactcaacat    180
ggcaaagagg atctgaaatt ccccgagga caagggtac cgatcaatac taactcctct    240
cccgatgatc aaattggata ctacaggcgc gccaccccga gaattcgcgg cggagacggg    300
aaaatgaagg accttagtcc aagatggtac ttttattact tggggaccgg accggaagct    360
ggcttgccct atggtgccaa taaggacgga attatttggg tggcgacaga gggcgctctg    420
aatactccca aggaccacat aggtactcgg aatcctgcta ataatgccgc catcgtgttg    480
cagctccccc aaggcaccac cctacccaag ggcttttatg ccgaggggtc ccgcggcggg    540
agccaggctt catccaggag ttctagtcgc tctcgcaact catcccgcaa ctccacccct    600
ggctctagta ggggtactag tcccgcccga atggccggca atggccgaga cgctccccta    660
gcgctgttgt tgctggatag actcaatcag ctcgaaagta agatgtccgg caaaggacaa    720
cagcagcaag gacaaacggt taccaagaaa agcgcagcag aggcaagtaa gaaacccagg    780
caaaagcgca ctgccaccaa agcttacaac gtgacacagg cctttggtcg cagaggaccc    840
gaacaaacac aaggcaattt tggagatcag gaacttataa ggcaaggaac gactataag    900
cattggcccc aaattgcaca atttgcccca tccgcttctg cattcttcgg tatgagtagg    960
attggaatgg aagttacacc cagtggcacc tggctcacat acaggcgct atcaagcttt   1020
gatgataagg atccgaattt taaggaccag gtgatcctgt tgaacaaca tatagacgct   1080
tataaaacct ttccccccgac tgaacctaag aagacaaga agaagaaagc tgatgaaact   1140
caagcgctgc cgcaaagaca aaagaaacaa caaaccgtta cgctcctgcc agcagctgac   1200
ctggacgatt ttagtaaaca actccaacaa agcatgtcta gcgccgatag tactcaggct   1260
ggcggcgggc accaccatca tcatcactga gctagcttga ctgactgaga tacagcgtac   1320
cttcagctca cagacatgat aagatacatt gatgagtttg acaaccac aactagaatg    1380
cagtgaaaaa aatgctttat ttgtgaaatt tgtgatgcta ttgctttatt tgtaaccatt   1440
ataagctgca ataaacaagt taacaacaac aattcattc attttatgtt tcaggttcag   1500
ggggaggtgt gggaggtttt ttaaagcaag taaaacctct acaaatgtgg tattggccca   1560
tctctatcgg tatcgtagca taaccccttg gggcctctaa acgggtctg aggggttttt    1620
tgtgcccctc gggccggatt gctatctacc ggcattggcg cagaaaaaaa tgcctgatgc   1680
gacgctgcgc gtcttatact cccacatatg ccagattcag caacggatac ggcttcccca   1740
acttgccac ttccatacgt gtcctcctta ccagaaattt atccttaagg tcgtcagcta   1800
```

```
tcctgcaggc gatctctcga tttcgatcaa gacattcctt taatggtctt ttctggacac   1860
cactagggt  cagaagtagt tcatcaaact ttcttccctc cctaatctca ttggttacct   1920
tgggctatcg aaacttaatt aaccagtcaa gtcagctact tggcgagatc gacttgtctg   1980
ggtttcgact acgctcagaa ttgcgtcagt caagttcgat ctggtccttg ctattgcacc   2040
cgttctccga ttacgagttt catttaaatc atgtgagcaa aaggccagca aaaggccagg   2100
aaccgtaaaa aggccgcgtt gctggcgttt ttccataggc tccgcccccc tgacgcagat   2160
cacaaaaatc gacgctcaag tcagaggtgg cgaaacccga caggactata agataccag   2220
gcgtttcccc ctggaagctc cctcgtgcgc tctcctgttc cgaccctgcc gcttaccgga   2280
tacctgtccg cctttctccc ttcgggaagc gtggcgcttt ctcatagctc acgctgtagg   2340
tatctcagtt cggtgtaggt cgttcgctcc aagctgggct gtgtgcacga ccccccgtt   2400
cagcccgacc gctgcgcctt atccggtaac tatcgtcttg agtccaaccc ggtaagacac   2460
gacttatcgc cactggcagc agccactggt aacaggatta gcagagcgag gtatgtaggc   2520
ggtgctacag agttcttgaa gtggtggcct aactacggct acactagaag aacagtattt   2580
ggtatctgcg ctctgctgaa gccagttacc ttcggaaaaa gagttggtag ctcttgatcc   2640
ggcaaacaaa ccaccgctgg tagcggtggt ttttttgttt gcaagcagca gattacgcgc   2700
agaaaaaaag gatctcaaga agatcctttg atcttttcta cggggtctga cgctcagtgg   2760
aacgaaaact cacgttaagg gattttggtc atgagattat caaaaaggat cttcacctag   2820
atccttttaa attaaaaatg aagttttaaa tcaatctaaa gtatatatga gtaaacttgg   2880
tctgacagtt accaatgctt aatcagtgag gcacctatct cagcgatctg tctatttcgt   2940
tcatccatag ttgcatttaa atttcgaac tctccaaggc cctcgtcgga aaatcttcaa   3000
acctttcgtc cgatccatct tgcaggctac ctctcgaacg aactatcgca agtctcttgg   3060
ccggccttgc gccttggca ttgcttggca gcgcctatcg ccaggtatta ctccaatccc   3120
gaatatccga gatcgggatc acccgagaga agttcaacct acatcctcaa tcccgatcta   3180
tccgagatcc gaggaaatatc gaaatcgggg cgcgcctggt gtaccgagaa cgatcctctc   3240
agtgcgagtc tcgacgatcc atatcgttgc ttggcagtca gccagtcgga atccagcttg   3300
ggacccagga agtccaatcg tcagatattg tactcaaggc tggtcacggc agcgtaccga   3360
tctgtttaaa cctagatatt gatagtctga tcggtcaacg tataatcgag tcctagcttt   3420
tgcaaacatc tatcaagaga caggatcagc aggaggcttt cgcatgagta ttcaacattt   3480
ccgtgtcgcc cttattccct tttttgcggc attttgcctt cctgttttttg ctcacccaga   3540
aacgctggtg aaagtaaaag atgctgaaga tcagttgggt gcgcgagtgg gttacatcga   3600
actggatctc aacagcggta agatccttga gagttttcgc cccgaagaac gctttccaat   3660
gatgagcact tttaaagttc tgctatgtgg cgcggtatta tcccgtattg acgccgggca   3720
agagcaactc ggtcgccgca tacactattc tcagaatgac ttggttgagt attcaccagt   3780
cacagaaaag catcttacgg atggcatgac agtaagagaa ttatgcagtg ctgccataac   3840
catgagtgat aacactgcgg ccaacttact tctgacaacg attggaggac cgaaggagct   3900
aaccgctttt ttgcacaaca tgggggatca tgtaactcgc cttgatcgtt gggaaccgga   3960
gctgaatgaa gccataccaa acgacgagcg tgacaccacg atgcctgtag caatggcaac   4020
aaccttgcgt aaactattaa ctggcgaact acttactcta gcttcccggc aacagttgat   4080
agactggatg gaggcggata agttgcagg accacttctg cgctcggccc ttccggctga   4140
ctggtttatt gctgataaat ctggagccgg tgagcgtggg tctcgcggta tcattgcagc   4200
actggggcca gatggtaagc cctcccgtat cgtagttatc tacacgacgg ggagtcaggc   4260
aactatggat gaacgaaata gacagatcgc tgagataggt gcctcactga ttaagcattg   4320
gtaaccgatt ctaggtgcat tggcgcagaa aaaatgcct gatgcgagcc tgcgcgtctt   4380
atactcccac atatgccaga ttcagcaacg gatacggctt ccccaacttg cccacttcca   4440
tacgtgtcct ccttaccaga aatttatcct taagatcccg aatcgtttaa actcgactct   4500
ggctctatcg aatctccgtc gtttcgagct tacgcgaaca gccgtggcgc tcatttgctc   4560
gtcgggcatc gaatctcgtc agctatcgtc agcttacctt tttggcagcg atcgcggctc   4620
ccgacatctt ggaccattag ctccacaggt atcttcttcc ctctagtggt cataacagca   4680
gcttcagcta cctctcaatt caaaaaaccc tcaagaccc gtttagaggc cccaaggggt   4740
tatgctatca atcgttgcgt tacacacaca aaaaccaac acacatccat cttcgatgga   4800
tagcgatttt attatctaac tgctgatcga gtgtagccag atctagtaat caattacggg   4860
gtcattagtt catagcccat atatggagtt ccgcgttaca taacttacgg taaatggccc   4920
gcctggctga ccgcccaacg accccgccc attgacgtca ataatgacgt atgttcccat   4980
agtaacgcca atagggactt tccattgacg tcaatgggtg gagtatttac ggtaaactgc   5040
ccacttggca gtacatcaag tgtatcatat gccaagtacg ccccctattg acgtcaatga   5100
cggtaaatgg cccgcctggc attatgccca gtacatgacc ttatgggact ttcctacttg   5160
gcagtacatc tacgtattag tcatcgctat taccatgctg atgcggtttt ggcagtacat   5220
caatgggcgt ggatagcggt ttgactcacg gggatttcca gtctccacc ccattgacgt   5280
caatgggagt ttgttttggc accaaaatca acgggacttt ccaaaatgtc gtaacaactc   5340
cgccccattg acgcaaatgg gcggtaggcg tgtacggtgg gaggtctata taagcagagc   5400
tggtttagtg aaccgtcaga tcagatcttt gtcgatccta ccatccactc gacacacccg   5460
ccagcggccg c                                                        5471
```

SEQ ID NO: 4           moltype = DNA   length = 7850
FEATURE                Location/Qualifiers
misc_feature           1..7850
                       note = synthetic
source                 1..7850
                       mol_type = other DNA
                       organism = synthetic construct
SEQUENCE: 4

```
accatgtttg tgttcctggt actcctaccg ctggtgagct cccaatgcgt caatctcacg    60
actaggacac aactcccacc cgcctacacg aactcttta  caaggggtgt atactaccct   120
gacaaggtgt tccgcagcag cgtgctacat agcactcaca atttgtttct gcccttcttc   180
tctaacgtaa catggttcca tgcgatacat gtatctggta ccaatggaac aaaacgtttt   240
gataacccag ttctccgtt  taatgatgga gtttactttg catccactga aaagtctaat   300
ataatacgcg gatggatttt cggcacaaca ctggatagta agaccagag  tctgcttatt   360
gtcaataacc ccactaacgt ggtgattaag gtgtgtgagt ttcaattctg taatgaccca   420
tttctcgggg tttactacca taagaacaat aagagctgga tggaatcaga atttagagtt   480
```

```
tatagcagcg caaacaattg cacatttgaa tacgtttctc aacccttttct gatggatctc    540
gaaggaaaac aagggaactt taagaacctc agggaatttg tcttcaagaa catagatggg    600
tacttcaaaa tttacagcaa gcatacacca attaacttgg ttagagacct gccccaggga    660
ttttctgcac ttgaacccttt ggttgacttg cctatcggca ttaatattac tcgatttcaa    720
actctgctcg ctttgcaccg cagctacctg acaccgggta actcctctag tggctggacc    780
gcaggagcag ctgcatatta tgtgggttat ctccaaccca gaacatttct gctaaagtac    840
aacgaaaatg ggacaatcac cgatgcggtc gactgcgcat ggatcccct atccgagact    900
aagtgtactt tgaagagctt taccgtggaa aaggggatct atcaaacttc caactttcgg    960
gtgcaaccga ccgaaagcat cgttagattt cccaatatca ccaacttgtg tcccttttggc   1020
gaagttttca acgctactcg ctttgcaagt gtctatgctt ggaatagaaa gaggataagc   1080
aactgcgtcg ctgactattc tgttctgtat aactctgcga gcttttcaac tttcaaatgc   1140
tatgggtgct ccccaaccaa gcttaatgac ttgtgcttca ctaacgttta tgcagatagc   1200
ttcgtcatac ggggcgatga agtgcggcaa atcgcgccag acaaacagg taagatcgcc   1260
gactacaact ataaactgcc agacgatttt acaggctggc tgatcgcttg gaactctaac   1320
aatcttgatt ctaaagttgg tgggaattat aactatctat atcgtctctt cagaaaatct   1380
aacctcaagc cctttgagcg ggatataagc acagaaatct atcaggctgg gtctactcct   1440
tgcaatggtg tcgaaggttt caattgctac ttttccactgc aatcctacgg ctttcaacct   1500
acaaatggtg tcggttatca accgtataga gttgttgtgc tctcctttga gttgctacac   1560
gctcctgcca cggtttgtgg acccaagaag tcaacgaatc tggtgaagaa taatgcgtc   1620
aatttttaatt ttaacggact tacggggact ggcgttctca ccgaatccaa taagaagttc   1680
cttccattcc agcaatttgg ccgcgatatc gccgatacaa cagacgctgt cagagatcca   1740
caaaccttgg agatcttgga tattacacca tgctcttttcg gcggggtatc agtaatcacg   1800
ccggggacaa atacatccaa tcaggttgcc gtattgtatc aggatgtgaa ctgcaccgag   1860
gtccctgttg ccatacatgc cgatcagttg actccgactt ggcgggtgta ttctacaggg   1920
tctaatgtat ttcaaaccag agcaggatgc ctcatcggtg ccgaacatgt taataattca   1980
tatgagtgtg atatcccat aggagcaggc atttgtgcat cctaccaaac tcagaccaac   2040
tcaccaagac gggcccggtc tgtgcgtcc cagtccataa ttgcctacac aatgagtctt   2100
ggagccgaaa actcagttgc ctattccaac aactccatcg ctatccccac gaattttaca   2160
atctcagtta ccactgaaat cctgcccgta tctatgacaa agacaagtgt tgattgcaca   2220
atgtatatct gcggggactc tactgagtgc tcaaatctgc tgctacagta cggtagcttt   2280
tgtactcagc taaatcgcgc actcaccggg attgctgtag aacaagacaa gaatacacaa   2340
gaggttttcg cccaagtgaa acaaatatac aaaacgcccc ctataaaaga cttcggtggt   2400
tttaacttta gccagatttt gccggatcca tccaaaccat ctaagcgctc tttcattgaa   2460
gatctcctgt tcaacaaagt tacattggcg gacgcaggtt tcattaagca atatggggat   2520
tgccttgggg atatcgcagc gcgggatctg atttgtgccc agaagttcaa tggtctgacg   2580
gttctgccac ccctactcac cgatgaaatg atcgcgcaat ataccagcgc tcttctggca   2640
ggtaccatca cttccggctg gacgttcgga gccggcgccg cacttcaaat cccctttcgcc   2700
atgcaaatgg catatagatt taatggcatc ggtgtcaccc aaaacgtatt gtatgagaac   2760
caaaagctga ttgccaatca atttaatagc gcaattggta aaatacaaga cagcctgagc   2820
agtacgggcaa gcgcactcgg gaagcttcaa gatgtagtta atcagaatgc tcaggctttg   2880
aatactcttg tgaaacaact ctcttccaat tttggcgcca tctcatcgt gctcaacgac   2940
attctttccc gactcgataa ggtggaagct gaagttcaaa tcgatcggct cattacaggc   3000
agactgcagt ctctccaaac ctacgtcacc cagcaactga ttaggggcgc agaaaattcga   3060
gcttctgcaa atcttgcagc cacaaagatg agcgagtgtg tcctgggcca atcaaagcgc   3120
gtcgactttt gcggaaaggg gtatcatctc atgagctttc cacaatcagc cccacatgga   3180
gttgtctttc tccatgtaac gtacgtccct gctcaggaaa agaatttcac cacagcccca   3240
gctatttgcc atgacggaaa ggctcacttc ccacgtgaag gcgtatttgt atcaaatggc   3300
acccactggt tcgtcaccca acgtaacttt tacgagcctc agattatcac cacggataac   3360
acgttcgtca gcgggaattg tgatgtagtc attggtattg tcaataatac cgtgtatgat   3420
cccctttcaac ccgaattgga ctcctttaaa gaagaactcg acaaatactt taagaaccat   3480
acgtccctg acgtggacct cggtgacatt tcaggcataa atgcctcagt ggtgaactta   3540
caaaaggaaa tcgataggct gaacgaagtg gccaagaatt tgaacgaaag tttgattgat   3600
ctccaagaac tggggaaata cgaacaatat ataaaatggg gtgcggaca ccatcatcat   3660
caccattaag ctagcttgac tgactgagat acagcgtacc ttcagctcac agacatgata   3720
agatacattg atgagtttgg acaaaccaca actagaatgc agtgaaaaaa atgcttatt   3780
tgtgaaattt gtgatgctat tgctttattt gtaaccatta taagctgcaa taaacaagtt   3840
aacaacaaca attgcattca ttttatgttt caggttcagg gggaggtgtg ggaggttttt   3900
taaagcaagt aaaacctcta caaatgtggt attggcccat ctctatcggt atcgtagcat   3960
aaccccttgg ggcctctaaa cgggtcttga ggggttttt tgtgccctcg ggcgcggattg   4020
ctatctaccg gcattggcgc agaaaaaaat gcctgatgcg acgctgcgcg tcttatactc   4080
ccacatatgc cagattcagc aacgcgatacg gcttccccaa cttgcccact tccatacgtg   4140
tcctccttac cagaaatttta tccttaaggt cgtcagctat cctgcaggcg atctctcgat   4200
ttcgatcaag acattccttt aatggtcttt tctggacacc actaggggtc agaagtagtt   4260
catcaaactt tcttccctcc ctaatctcat tggttaccctt gggctatcga aacttaatta   4320
accagtcaag tcagctactt ggcgagatcg acttgtctgg gtttcgacta cgctcagaat   4380
tgcgtcagtc aagttcgatc tggtccttgc tattgcaccc gttctccgat tacgagtttc   4440
atttaaatca tgtgagcaaa aggccagcaa aaggccagga accgtaaaaa ggccgcgttg   4500
ctggcgtttt tccataggct ccgccccct gacgagcatc acaaaaatcg acgctcaagt   4560
cagaggtggc gaaacccgac aggactataa agataccagg cgtttccccc tggaagctcc   4620
ctcgtgcgct ctcctgttcc gaccctgccg cttaccggat acctgtccgc ctttctccct   4680
tcgggaagcg tggcgctttc tcatagctca cgctgtaggt atctcagttc ggtgtaggtc   4740
gttcgctcca agctgggctg tgtgcacgaa ccccccgttc agcccgaccg ctgcgcctta   4800
tccggtaact atcgtcttga gtccaacccg gtaagacacg acttatcgcc actggcagca   4860
gccactggta acaggattag cagagcgagg tatgtaggcg gtgctacaga gttcttgaag   4920
tggtggccta actacggcta cactagaaga acagtatttg gtatctgcgc tctgctgaag   4980
ccagttacct tcggaaaaag agttggtagc tcttgatccg gcaaacaaac caccgctggt   5040
agcggtggtt ttttttgtttg caagcagcag attacgcgca gaaaaaaagg atctcaagaa   5100
gatccttttga tcttttctac ggggtctgac gctcagtgga acgaaaactc acgttaaggg   5160
attttggtca tgagattatc aaaaaggatc ttcacctaga tccttttaaa ttaaaaatga   5220
```

```
agtttttaaat caatctaaag tatatatgag taaacttggt ctgacagtta ccaatgctta  5280
atcagtgagg cacctatctc agcgatctgt ctatttcgtt catccatagt tgcatttaaa  5340
tttccgaact ctccaaggcc ctcgtcggaa aatcttcaaa cctttcgtcc gatccatctt  5400
gcaggctacc tctcgaacga actatcgcaa gtctcttggc cggccttgcg ccttggctat  5460
tgcttggcag cgcctatcgc caggtattac tccaatcccg aatatccgag atcgggatca  5520
cccgagagaa gttcaaccta catcctcaat cccgatctat ccgagatccg aggaatatcg  5580
aaatcggggc gcgcctggtg taccgagaac gatcctctca gtgcgagtct cgacgatcca  5640
tatcgttgct tggcagtcag ccagtcggaa tccagcttgg gacccaggaa gtccaatcgt  5700
cagatattgt actcaagcct ggtcacggca gcgtaccgat ctgttttaaac ctagatattg  5760
atagtctgat cggtcaacgt ataatcgagt cctagctttt gcaaacatct atcaagagac  5820
aggatcagca ggaggctttc gcatgagtat tcaacatttc cgtgtcgccc ttattccctt  5880
ttttgcggca ttttgccttc ctgttttttgc tcacccagaa acgctggtga agtaaaaga  5940
tgctgaagat cagttgggtg cgcgagtggg ttacatcgaa ctggatctca acagcggtaa  6000
gatccttgag agttttcgcc ccgaagaacg ctttccaatg atgagcactt ttaaagttct  6060
gctatgtggc gcggtattat cccgtattga cgccgggcaa gagcaactcg gtcgccgcat  6120
acactattct cagaatgact tggttgagta ttcaccagtc acagaaaagc atcttacgga  6180
tggcatgaca gtaagagaat tatgcagtgc tgccataacc atgagtgata acactgcggc  6240
caacttactt ctgacaacga ttggaggacc gaaggagcta accgcttttt tgcacaacat  6300
gggggatcat gtaactcgcc ttgatcgttg ggaaccggag ctgaatgaag ccataccaaa  6360
cgacgagcgt gacaccacga tgcctgtagc aatggcaaca accttgcgta aactattaac  6420
tggcgaacta cttactctag cttccgggca acagttgata gactggatgg aggcggataa  6480
agttgcagga ccacttctgc gctcggccct tccggctggc tggttttattg ctgataaatc  6540
tggagccggt gagcgtgggt ctcgcggtat cattgcagca ctggggccag atggtaagcc  6600
ctcccgtatc gtagttatct acacgacggg gagtcaggca actatggatg aacgaaatag  6660
acagatcgct gagataggtg cctcactgat taagcattgg taaccgattc taggtgcatt  6720
ggcgcagaaa aaaatgcctg atgcgacgct gcgcgtctta tactcccaca tatgccagat  6780
tcagcaacgg atacgccttc ccaacttgc ccacttccat acgtgtcctc cttaccagaa  6840
atttatcctt aagatcccga atcgtttaaa ctcgactctg gctctatcga atctccgtcg  6900
tttcgagctt acgcgaacag ccgtggcgct catttgctcg tcgggcatcg aatctcgtca  6960
gctatcgtca gcttacctttt tggcagcga tcgcggctcc cgacatcttg gaccattagc  7020
tccacaggta tcttcttccc tctagtggtc ataacagcag cttcagctac ctctcaattc  7080
aaaaaacccc tcaagacccg tttagaggcc caaggggtt atgctatcaa tcgttgcgtt  7140
acacacacaa aaaaccaaca cacatccatc ttcgatggat agcgatttta ttatctaact  7200
gctgatcgag tgtagccaga tctagtaatc aattacgggg tcattagttc atagcccata  7260
tatggagttc cgcgttacat aacttacggt aaatgccccg cctggctgac cgcccaacga  7320
ccccccgccca ttgacgtcaa taatgacgta tgttcccata gtaacgccaa tagggacttt  7380
ccattgacgt caatgggtgg agtatttacg gtaaactgcc cacttggcag tacatcaagt  7440
gtatcatatg ccaagtacgc cccctattga cgtcaatgac ggtaaatggc ccgcctggca  7500
ttatgcccag tacatgacct tatgggactt tcctacttgg cagtacatct acgtattagt  7560
catcgctatt accatgctga tgcggttttt gcagtacatc aatgggcgtg atagcggtt  7620
tgactcacgg ggatttccaa gtctccaccc cattgacgtc aatgggagtt tgttttggca  7680
ccaaaatcaa cgggactttc caaaatgtcg taacaactcc gccccattga cgcaaatggg  7740
cggtaggcgt gtacggtggg aggtctatat aagcagagct ggtttagtga accgtcagat  7800
cagatcttg tcgatcctac catccactcg acacacccgc cagcggccgc             7850
SEQ ID NO: 5               moltype = AA   length = 412
FEATURE                    Location/Qualifiers
source                     1..412
                           mol_type = protein
                           organism = Infectious Bronchitis Virus
SEQUENCE: 5
MASGKATGKT DAPAPVIKLG GPKPPKVGSS GNASWFQAIK AKKLNSHPPK FEGSGVPDNE    60
NLKTSQQHGY WRRQARFKPV KGGRKPVPDA WYFYYTGTGP AADLNWGDSQ DGIVWVAAKG   120
ADVKSRSHQG TRDPDKFDQY PLRFSDGGPD GNFRWDFIPL NRGRSGRSTA ASSAASSRAP   180
SRDGSRGRRS GSEDDLIARA AKIIQDQQKK GSRITKVKAD EMAHRRYCKR TIPPGYKVDQ   240
VFGPRTKGKE GNFGDDKMNE EGIKDGRVTA MLNLVPSSHA CLFGSRVTPK LQPDGLHLKF   300
EFTTVVPRDD PQFDNYVKIC DQCVDGVGTR PKDDEPRPKS RSSSRPATRT SSPAPRQQRP   360
KKEKKPKKQD DEVDKALTSN EERNNAQLEF DEEPKVINWG DAALGENELG GG           412

SEQ ID NO: 6               moltype = DNA   length = 1257
FEATURE                    Location/Qualifiers
misc_feature               1..1257
                           note = synthetic
source                     1..1257
                           mol_type = other DNA
                           organism = synthetic construct
SEQUENCE: 6
atggcaagcg gtaaagcaac tggaaagaca gacgccccag cgccagtcat caaaactagga    60
ggaccaaagc cacctaaagt tggttcttct ggaaatgcat cttggtttca agcaataaaa   120
gccaagaagc taaattcaca tccacctaag tttgaaggta gcggtgttcc tgataatgaa   180
aatcttaaaa caagtcagca acatggatac tggaggcgcc aagccaggtt taagccagtt   240
aaaggcggaa gaaaaccagt cccagatgct tggtacttct attatactgg aacaggacca   300
gccgctgacc tgaattgggg tgatagccaa gatggtatag tgtgggttgc tgcaaagggt   360
gctgatgtta aatctagatc tcaccagggt acaagggacc ctgacaagtt tgaccaatat   420
ccactacgat tctcggacgg aggacctgat ggtaatttcc gttggacttt cattcctctg   480
aatcgtggta ggagtggaag atcaacagca gcttcatcag cagcatctag tagagcaccg   540
tcgcgtgacg gctcgcgtgg tcgtagaagt ggttctgaag atgatcttat tgctcgtgca   600
gcaaagataa tccaggatca gcagaagaag ggttctcgca ttactaaggt taaggctgat   660
gaaatggctc accgccggta ttgcaagcgc actattccac ctggttataa ggttgatcaa   720
```

```
gtctttggcc  cccgtactaa  aggtaaggag  ggaaattttg  gtgatgacaa  gatgaatgag   780
gaaggtatta  aggatgggcg  tgttacagca  atgctcaacc  tagtccctag  cagccatgct   840
tgtcttttg   gaagtagagt  gacgcccaaa  ctacaaccag  atgggctgca  cttgaaattt   900
gaatttacta  ctgtggtccc  acgtgatgat  ccgcagtttg  ataattatgt  taaaatttgt   960
gatcagtgtg  ttgatggtgt  aggaacacgt  ccaaaagatg  atgaaccgag  accaaagtca  1020
cgctcaagtt  caagacctgc  tacaagaaca  agttctccgg  cgccaagaca  acaacgccca  1080
aagaaggaga  aaaagccaaa  gaagcaggat  gatgaagtag  ataaagcatt  gacctcaaat  1140
gaggagagga  acaatgcaca  gctggaattt  gatgaggaac  ccaaggtgat  taactggggg  1200
gatgcagctc  taggagagaa  tgaacttgga  ggaggtcatc  atcaccatca  ccactaa     1257

SEQ ID NO: 7           moltype = AA   length = 1098
FEATURE                Location/Qualifiers
source                 1..1098
                       mol_type = protein
                       organism = Infectious Bronchitis Virus
SEQUENCE: 7
MLVKSLFLVT ILFALCSANL YDNESFVYYY QSAFRPGHGW HLHGGAYAVV NVSSENNNAG   60
TAPSCTAGAI GYSKNFSAAS VAMTAPLSGM SWSASSFCTA HCNFTSYIVF VTHCFKSGSN  120
SCPLTGLIPS GYIRIAAMKH GSATPGHLFY NLTVSVTKYP KFRSLQCVNN HTSVYLNGDL  180
VFTSNYTEDV VAAGVHFKSG GPITYKVMRE VKALAYFVNG TAHDVILCDD TPRGLLACQY  240
NTGNFSDGFY PFTNTSIVKD KFIVYRESSV NTTLTLTNFT FSNESGAPPN TGGVDSFILY  300
QTQTAQSGYY NFNFSFLSSF VYRESNYMYG SYHPRCSFRP ETLNGLWFNS LSVSLTYGPI  360
QGGCKQSVFN GKATCCYAYS YGGPRACKGV YRGELTQHFE CGLLVYVTKS DGSRIQTATQ  420
PPVLTQNFYN NITLGKCVDY NVYGRTGQGF ITNVTDLATS HNYLADGGLA ILDTSGAIDI  480
FVVQGEYGPN YYKVNLCEDV NQQFVVSGGK LVGILTSRNE TGSQPLENQF YIKITNGTHR  540
SRRSVNENVT NCPYVSYGKF CIKPDGSVSP IVPKELEQEV APLLNVTENV LIPNSFNLTV  600
TDEYIQTHMD KIQINCLQYV CGNSLACRKL FQQYGPVCDN ILSVVNSVGQ KEDMELLSFY  660
SSTKPSGFNT PVFSNLSTGE FNISLLLTTP SSPRGRSFIE DLLFTSVESV GLPTDEAYKK  720
CTAGPLGFLK DLACAREYNG LLVLPPIITA EMQTLYTSSL VVSMAFGGIT SAGAIPFATQ  780
LQARINHLGI TQSLLLKNQE KIAASFNKAI GHMQEGFRST SLALQQIQDV VNKQSAILTE  840
TMLALNKNFG AISSVIQDIY QQLDDIQADA QVDRLITGRL SSLSVLASAK QSEYIRVSQQ  900
RELATQKINE CVKSQSIRYS FCGNGRHVLT IPQNAPNGIV FIHFTYTPES FINVTAVVGF  960
CVSPANASQY AIVPANGRGI FIQVNGSYYI TARDMYMPRD ITAGDIVTLT SCQANYVSVN 1020
KTVITTFVDN DDFDFDDELS KWWNETKHEL PDFDQFNYTI PVLNITYDID KIEEVIKGLN 1080
DSLIDLETLS ILKTYIKW                                               1098

SEQ ID NO: 8           moltype = DNA   length = 3296
FEATURE                Location/Qualifiers
misc_feature           1..3296
                       note = synthetic
source                 1..3296
                       mol_type = other DNA
                       organism = synthetic construct
SEQUENCE: 8
atgttggtga  agtcactgtt  tctagtgacc  attttgtttg  cactatgtag  tgctaattta    60
tatgacaacg  aatcttttgt  gtattactac  cagagtgctt  taggccagg   acatggttgg   120
catttacatg  gaggtgctta  tgcagtagtt  aatgtgtcta  gtgaaaataa  taatgcaggt   180
actgccccaa  gttgcactgc  tggtgctatt  ggctacagta  agaatttcag  tgcggcctca   240
gtagccatga  ctgcaccact  aagtggtatg  tcatggtctg  cctcatcttt  tgtacagct    300
cactgtaatt  ttacttctta  tatagtgttt  gttacacatt  gttttaagag  cggatctaat   360
agttgtcctt  tgacaggtct  tattccaagc  ggttatattc  gtattgctgc  tatgaaacat   420
ggaagtgcta  cgcctggtca  cttattttat  aacttaacag  tttctgtgac  taaatatcct   480
aagtttagat  cgctacaatg  tgttaataat  catacttctg  tatatttaaa  tggtgacctt   540
gttttcacat  ctaactatac  tgaagatgtt  gtagctgcag  gtgtccattt  taaaagtggt   600
ggacctataa  cttataaagt  tatgagagag  gttaaagcct  tggcttattt  tgtcaatggt   660
actgcacatg  atgtcattct  atgtgatgac  acacctagtg  gtttgttagc  atgccaatat   720
aatactggca  attttcaga   tggcttctat  ccttttacta  atactagtat  tgttaaggat   780
aagtttattg  tttatcgtga  aagtagtgtc  aatactactt  tgacattaac  taatttcacg   840
tttagtaatg  aaagtggtgc  ccctcctaat  acaggtggtg  ttgacagttt  tatttttatac  900
cagacacaaa  cagctcagag  tggttattat  aattttaatt  tttcatttct  gagtagtttt   960
gtttataggg  aaagtaatta  tatgtatgga  tcttaccatc  cacgttgtag  ttttagacct  1020
gaaacccta   atggtttgtg  gtttaattcc  ctttctgttt  cattaacata  cggtcccatt  1080
caaggtggtt  gtaagcaatc  tgtatttaat  ggtaaagcaa  cttgttgtta  tgcttattca  1140
tacggaggac  ctcgtgcttg  taaaggtgtc  tatagaggtg  agctaacaca  gcatttfgaa  1200
tgtgggtttgt  tagtttatgt  tactaagagc  gatggctccc  gtatacaaac  tgcaaacaca  1260
ccacctgtat  taacccaaaa  ttttttataat aacatcactt  taggtaagtg  tgttgattat  1320
aatgtttatg  gtagaactgg  acaaggtttt  attactaatg  taactgattt  agctacttct  1380
cataattact  tagcggatgg  aggattagct  attttagata  catctggtgc  catagacatc  1440
ttcgttgtac  aaggtgaata  tggccctaac  tactataagg  ttaatctatg  tgaagatgtt  1500
aaccaacagt  ttgtagtttc  tggtggtaaa  ttagtaggta  ttctcacttc  acgtaatgaa  1560
actggttctc  agcctcttga  aaaccagttt  tacattaaga  tcactaatgg  aacacatcgt  1620
tctagacgtt  ctgttaatga  aaatgttacg  aattgccctt  atgttagtta  tggcaagttt  1680
tgtataaaac  ctgatggttc  agtttctcct  atagtaccaa  agaacttga   acagtttgtg  1740
gcacctttac  ttaatgttac  tgaaaatgtg  ctcatccta   acagttttaa  cttaactgtt  1800
acagatgagt  acatacaaac  gcatatggat  aagatccaaa  ttaattgtct  gcagtatgtt  1860
tgtggcaact  ctttggcttg  tagaaagctg  tttcaacaat  atgggcctgt  ttgtgacaac  1920
atattgtctg  tagtaaatag  tgttggtcaa  aagaagata   tggaactttt  aagcttctat  1980
tcttctacta  aaccatctgg  ttttaataca  ccagttttta  gtaatcttag  cactggtgag  2040
tttaatatct  ctcttttgtt  aacaaccccct  agtagtccta  gagggcgttc  ttttattgaa  2100
```

```
gatctttat  ttacaagtgt  tgaatctgtt  ggattaccaa  cagatgaagc  ttataaaaag  2160
tgcactgcag  gacctttagg  cttcttaaa  gaccttgcat  gtgctcgtga  atataatggt  2220
ttgcttgtgt  tgcctcctat  tataacagca  gaaatgcaaa  cttgtatac  tagttctcta  2280
gtagtttcta  tggcttttgg  tggtattact  tcagctggtg  ctatacctt   tgccacacaa  2340
ctgcaggcta  gaattaatca  cttgggtatt  acccagtgac  ttttgttgaa  gaatcaagaa  2400
aaaattgctg  cttcctttaa  taaggccatt  ggtcatatgc  aggaaggttt  taggagtaca  2460
tctctagcat  tacaacaaat  tcaagatgtt  gttaataagc  agagtgctat  tcttactgag  2520
actatgttag  cacttaataa  aaattttggt  gctatttctt  ctgtgattca  agacatttac  2580
cagcaacttg  atgacataca  agcagatgct  caagtggatc  gactcataac  tggtagattg  2640
tcatcacttt  ctgtcttagc  atctgctaag  cagtcggagt  acattagagt  gtcacaacag  2700
cgtgagttag  ctactcagaa  aattaatgag  tgtgttaaat  cacagtctat  taggtattcc  2760
ttttgtggta  atggacgaca  tgttttaacc  ataccacaaa  atgcccctaa  tggtatagtg  2820
tttatacact  ttacttatac  accagagagc  tttattaatg  ttactgcagt  agtaggtttt  2880
tgtgtaagtc  ctgctaatgc  tagtcagtat  gcaatagtgc  ccgctaatgg  tagggtatt   2940
tttatacaag  ttaatggtag  ttactacatc  actgcacgtg  atatgtatat  gccaagagat  3000
attactgcag  gagatatagt  tacgcttact  tcttgtcaag  caaattatgt  aagtgtaaac  3060
aagaccgtca  ttactacatt  tgtagacaat  gatgattttg  attttgatga  cgagttatca  3120
aaatggtgga  atgaaactaa  gcacgagttg  ccagactttg  ccagtttaa   ttacaccatt  3180
cccgttttaa  atataactta  tgatattgac  aagattgagg  aagttattaa  gggacttaat  3240
gattccttga  ttgacctcga  aacattgtca  attctcaaaa  cttatattaa  gtggcc      3296

SEQ ID NO: 9           moltype = AA   length = 422
FEATURE                Location/Qualifiers
source                 1..422
                       mol_type = protein
                       organism = SARS-CoV-2
SEQUENCE: 9
MSDNGPQNQR NAPRITFGGP SDSTGSNQNG ERSGARSKQR RPQGLPNNTA SWFTALTQHG    60
KEDLKFPRGQ GVPINTNSSP DDQIGYYRRA TRRIRGGDGK MKDLSPRWYF YYLGTGPEAG   120
LPYGANKDGI IWVATEGALN TPKDHIGTRN PANNAAIVLQ LPQGTTLPKG FYAEGSRGGS   180
QASSRSSSRS RNSSRNSTPG SSRGTSPARM AGNGGDAALA LLLLDRLNQL ESKMSGKGQQ   240
QQGQTVTKKS AAEASKKPRQ KRTATKAYNV TQAFGRRGPE QTQGNFGDQE LIRQGTDYKH   300
WPQIAQFAPS ASAFFGMSRI GMEVTPSGTW LTYTGAIKLD DKDPNFKDQV ILLNKHIDAY   360
KTFPPTEPKK DKKKKADETQ ALPQRQKKQQ TVTLLPAADL DDFSKQLQQS MSSADSTQAG   420
GG                                                                 422

SEQ ID NO: 10          moltype = DNA   length = 1287
FEATURE                Location/Qualifiers
misc_feature           1..1287
                       note = synthetic
source                 1..1287
                       mol_type = other DNA
                       organism = synthetic construct
SEQUENCE: 10
atgagcgata  acggacccca  gaaccaacgt  aacgccctc   gcattacttt  tggcgggcct    60
tccgactcta  caggttctaa  tcaaaacggg  gagcgaagcg  gggcacgcag  caagcaacgc   120
aggcctcaag  gtctgccaaa  caacactgct  tcttggttca  ctgctctcac  tcaacatggc   180
aaagaggatc  tgaaattccc  ccgaggacaa  ggggtaccga  tcaatactaa  ctcctctccc   240
gatgatcaaa  ttggatacta  caggcgcgcc  acccggagaa  ttcgcggcgg  agacgggaaa   300
atgaaggacc  ttagtccaag  atggtactt   tattacttgg  ggaccggacc  ggaagctggc   360
ttgccctatg  gtgccaataa  ggacggaatt  atttgggtgg  cgacagaggg  cgctctgaat   420
actcccaagg  accacatagg  tactcggaat  cctgctaata  atgccgccat  cgtgttgcag   480
ctccccccaag  gcaccaccct  acccaagggc  tttatgccg   aggggtcccg  cggcgggagc   540
caggcttcat  ccaggagttc  tagtcgctct  cgcaactcat  cccgcaactc  cacccctggc   600
tctagtaggg  gtactagtcc  cgcccgaatg  gccggcaatg  gcggagacgc  tgccctagcg   660
ctgttgttgc  tggatagact  caatcagctc  gaaagtaaga  tgtccggcaa  aggacaacag   720
cagcaaggac  aaacggttac  caagaaaagc  gcagcagagg  caagtaagaa  acccaggcaa   780
aagcgcactc  caccaaaagc  ttacaacgtg  acacaggcct  tggtcgcag   aggacccgaa   840
caaacacaag  gcaatttgg   agatcaggaa  cttataaggc  aaggaacaga  ctataagcat   900
tggcccaaaa  ttgcacaatt  tgccccatcc  gcttctgcat  tcttcggtat  gagtaggatt   960
ggaatggaag  ttacacccag  tggcacctgg  ctcacatata  caggcgctat  caagcttgat  1020
gataaggatc  cgaattttaa  ggaccaggtg  atcctgttga  acaaacatat  agacgcttat  1080
aaaacctttc  ccccgactga  acctaagaaa  gacaagaaga  agaaagctga  tgaaactcaa  1140
gcgctgccgc  aaagacaaaa  gaaacaacaa  accgttacgc  tcctgccagc  agctgacctg  1200
gacgatttta  gtaaacaact  ccaacaaagc  atgtctagcc  ccgatagtac  tcaggctggc  1260
ggcgggcacc  accatcatca  tcactga                                       1287

SEQ ID NO: 11          moltype = AA   length = 1215
FEATURE                Location/Qualifiers
source                 1..1215
                       mol_type = protein
                       organism = SARS-CoV-2
SEQUENCE: 11
MFVFLVLLPL VSSQCVNLTT RTQLPPAYTN SFTRGVYYPD KVFRSSVLHS TQDLFLPFFS    60
NVTWFHAIHV SGTNGTKRFD NPVLPFNDGV YFASTEKSNI IRGWIFGTTL DSKTQSLLIV   120
NNATNVVIKV CEFQFCNDPF LGVYYHKNNK SWMESEFRVY SSANNCTFEY VSQPFLMDLE   180
GKQGNFKNLR EFVFKNIDGY FKIYSKHTPI NLVRDLPQGF SALEPLVDLP IGINITRFQT   240
LLALHRSYLT PGDSSSGWTA GAAAYYVGYL QPRTFLLKYN ENGTITDAVD CALDPLSETK   300
CTLKSFTVEK GIYQTSNFRV QPTESIVRFP NITNLCPFGE VFNATRFASV YAWNRKRISN   360
```

|  |  |  |  |  |  |
|---|---|---|---|---|---|
| CVADYSVLYN | SASFSTFKCY | GVSPTKLNDL | CFTNVYADSF | VIRGDEVRQI | APGQTGKIAD | 420 |
| YNYKLPDDFT | GCVIAWNSNN | LDSKVGGNYN | YLYRLFRKSN | LKPFERDIST | EIYQAGSTPC | 480 |
| NGVEGFNCYF | PLQSYGFQPT | NGVGYQPYRV | VVLSFELLHA | PATVCGPKKS | TNLVKNKCVN | 540 |
| FNFNGLTGTG | VLTESNKKFL | PFQQFGRDIA | DTTDAVRDPQ | TLEILDITPC | SFGGVSVITP | 600 |
| GTNTSNQVAV | LYQDVNCTEV | PVAIHADQLT | PTWRVYSTGS | NVFQTRAGCL | IGAEHVNNSY | 660 |
| ECDIPIGAGI | CASYQTQTNS | PRRARSVASQ | SIIAYTMSLG | AENSVAYSNN | SIAIPTNFTI | 720 |
| SVTTEILPVS | MTKTSVDCTM | YICGDSTECS | NLLLQYGSFC | TQLNRALTGI | AVEQDKNTQE | 780 |
| VFAQVKQIYK | TPPIKDFGGF | NFSQILPDPS | KPSKRSFIED | LLFNKVTLAD | AGFIKQYGDC | 840 |
| LGDIAARDLI | CAQKFNGLTV | LPPLLTDEMI | AQYTSALLAG | TITSGWTFGA | GAALQIPFAM | 900 |
| QMAYRFNGIG | VTQNVLYENQ | KLIANQFNSA | IGKIQDSLSS | TASALGKLQD | VVNQNAQALN | 960 |
| TLVKQLSSNF | GAISSVLNDI | LSRLDKVEAE | VQIDRLITGR | LQSLQTYVTQ | QLIRAAEIRA | 1020 |
| SANLAATKMS | ECVLGQSKRV | DFCGKGYHLM | SFPQSAPHGV | VFLHVTYVPA | QEKNFTTAPA | 1080 |
| ICHDGKAHFP | REGVFVSNGT | HWFVTQRNFY | EPQIITTDNT | FVSGNCDVVI | GIVNNTVYDP | 1140 |
| LQPELDSFKE | ELDKYFKNHT | SPDVDLGDIS | GINASVVNIQ | KEIDRLNEVA | KNLNESLIDL | 1200 |
| QELGKYEQYI | KWGGG |  |  |  |  | 1215 |

```
SEQ ID NO: 12           moltype = DNA   length = 3666
FEATURE                 Location/Qualifiers
misc_feature            1..3666
                        note = synthetic
source                  1..3666
                        mol_type = other DNA
                        organism = synthetic construct
SEQUENCE: 12
atgtttgtgt tcctggtact cctaccgctg gtgagctccc aatgcgtcaa tctcacgact   60
aggacaaac  tcccacccgc ctacacgaac tcttttacaa ggggtgtata ctaccctgac  120
aaggtgttcc gcagcagcgt gctacatagc actcaagatt tgtttctgcc cttcttctct  180
aacgtaacat ggttccatgc gatacatgta tctggtacca atggaacaaa acggtttgat  240
aacccagttc tcccgtttaa tgatggagtt tactttgcat ccactgaaaa gtctaatata  300
atacgcggat ggattttcgg cacaaactg  gatagtaaga cccagagtct gcttattgtc  360
aataacgcca ctaacgtggt gattaaggtg tgtgagtttc aattctgtaa tgaccctttt  420
ctcggggttt actaccataa gaacaataag agctggatgg aatcagaatt tagagtttat  480
agcagcgcaa acaattgcac atttgaatac gtttctcaac cctttctgat ggatctcgaa  540
ggaaaacaag ggaactttaa gaacctcagg gaatttgtct tcaagaacat agatgggtac  600
ttcaaaattt acagcaagca tacaccagtt aacttggtta gagacctgcc ccagggattt  660
tctgcacttg aaccccttgg tgacttgcct atcggcatta atattactcg atttcaaact  720
ctgctcgctt tgcaccgcag ctacctgaca ccggggagact cctctagtgg ctggaccgca  780
ggagcagctg catattatgt gggttatctc caacccagaa catttctgct aaagtacaac  840
gaaaatggga caatcaccga tgcggtcgac tgcgcattgg atccctatc cgagactaag  900
tgtactttga gagctttac cgtggaaaag gggatctatc aaacttccaa ctttcggtg   960
caaccgaccg aaagcatcgt tagatttccc aatatcacca acttgtgtcc ctttggcgaa 1020
gttttcaacg ctactcgctt tgcaagtgtc tatgcttgga atagaaagag gataagcaac 1080
tgcgtcgctg actattctgt tctgtataac tctgcgagct tttcaacttt caaatgctat 1140
ggggtctccc caaccaagct taatgacttg tgcttcacta acgtttatgc agatagcttc 1200
gtcatacggg gcgatgaagt gcggcaaatc gcgccaggac aaacaggtaa gatcgccgac 1260
tacaactata aactgccaga cgattttaca ggctgcgtga tcgcttggaa ctctaacaat 1320
cttgattcta aagttggtgg gaattataac tatctatatc gtctcttcag aaaatctaac 1380
ctcaagccct tgagcgggga tataagcaca gaaatctatc aggctgggtc tactccttgc 1440
aatggtgtcg aaggtttcaa ttgctacttt ccactgcaat cctacggctt caacctaca  1500
aatggtgtcg ttatcaacc  gtatagagtt gttgtgctct cctttgagtt gctacacgct 1560
cctgccacgg tttgtggacc caagaagtca acgaatctgg tgaagaataa atgcgtcaat 1620
tttaattta  acggacttac ggggactggc gttctcaccg aatccaataa gaagttcctt 1680
ccattccagc aatttggccg cgatatcgcc gatacaacag acgctgtcag agatccacaa 1740
accttggaga tcttggatat tacaccatgc tctttcggcg gggtatcagt aatcacgccg 1800
gggacaaata catccaatca ggttgccgta ttgtatcagg atgtgaactg caccgaggtc 1860
cctgttgcca tacatgccga tcagttgact ccgacttggc gggtgtattc tacagggtct 1920
aatgtatttc aaaccagagc aggatgcctc atcggtgccg aacatgttaa taattcatat 1980
gagtgtgata tccccatagg agcaggcatt tgtgcatcct accaaactca gaccaactca 2040
ccaagacggg cccggtctgt ggcgtcccag tccataattg cctacacaat gagtcttgga 2100
gccgaaaact cagttgccta ttccaacaac tccatcgcta tccccacgaa ttttacaatc 2160
tcagttacca ctgaaatcct gcccgtatct atgacaaaga caagtgttga ttgcacaatg 2220
tatatctgcg gggactctac tgagtgctca aatctgctgc tacagtacgg tagctttgt  2280
actcagctaa atcgcgcact caccgggatt gctgtagaac aagacaagaa tacacaagag 2340
gttttcgccc aagtgaaaca aatatacaaa acgcccccta caaagactt cggtggtttt 2400
aactttagcc agatttttgcc ggatccatcc aaaccatcta gcgctctttt cattgaagat 2460
ctcctgttca caaagttac attggcggac gcaggtttca ttaagcaata tggggattgc 2520
cttgggata  tcgcagcgcg ggatctgatt tgtgcccaga gttcaatgg tctgacggtt 2580
ctgccaccc  tactcaccga tgaaatgatc gcgcaatata ccagcgctct tctggcaggt 2640
accatcactt ccggctgac cttcggagcc ggcgccgcac ttcaaatccc tttcgccatg 2700
caaatggcat atagatttaa tggcatcggt gtcacccaaa acgtattgta tgagaaccaa 2760
aagctgattg ccaatcaatt taatagcgca attggtaaaa tacaagacag cctgagcagt 2820
acggcaagcg cactcgggaa gcttcaagat gtagttaatc agaatgctca ggctttgaat 2880
actcttgtga acaactctc  ttccaatttt ggcgccatct catctgtgct caacgacatt 2940
cttcccgac  tcgataaggt ggaagctgaa gttcaaatcg atcggctcat tacaggcaga 3000
ctgcagtctc tccaaaccta cgtcacccag caactgatta gggcggcaga aattcgcgct 3060
tctgcaaatc ttgcagccac aaagatgagc gagtgtgtcc tgggccaatc aaagcgcgtc 3120
gacttttgcg gaaaggggta tcatctcatg agctttccac aatcagcccc acatggagtt 3180
gtcttctctcc atgtaacgta cgtccctgct caggaaaaga attccaccac agccccagct 3240
atttgccatg acggaaaggc tcacttccca cgtgaaggca tatttgtatc aaatggcacc 3300
```

```
cactggttcg tcacccaacg taactttttac gagcctcaga ttatcaccac ggataacacg  3360
ttcgtcagcg ggaattgtga tgtagtcatt ggtattgtca ataataccgt gtatgatccc  3420
cttcaacccg aattggactc cttttaaagaa gaactcgaca aatactttaa gaaccatacg  3480
tcccctgacg tggacctcgg tgacatttca ggcataaatg cctcagtggt gaacattcaa  3540
aaggaaatcg ataggctgaa cgaagtggcc aagaatttga cgaaagtttt gattgatctc  3600
caagaactgg ggaaatacga acaatatata aaatggggtg cggacacca tcatcatcac  3660
cattaa                                                              3666

SEQ ID NO: 13          moltype = DNA   length = 34
FEATURE                Location/Qualifiers
misc_feature           1..34
                       note = Synthetic - forward primer N6xHis
source                 1..34
                       mol_type = other DNA
                       organism = synthetic construct
SEQUENCE: 13
atcactgaat tcaccatggc aagcggtaaa gcag                                34

SEQ ID NO: 14          moltype = DNA   length = 68
FEATURE                Location/Qualifiers
misc_feature           1..68
                       note = Synthetic- reverse primer N6xHis
source                 1..68
                       mol_type = other DNA
                       organism = synthetic construct
SEQUENCE: 14
atcactgcgg ccgcttagtg gtgatggtga tgatgacctc ctccaagttc attctctcct   60
agagctgc                                                            68

SEQ ID NO: 15          moltype = DNA   length = 42
FEATURE                Location/Qualifiers
misc_feature           1..42
                       note = Synthetic- forward primer S1 6xHis
source                 1..42
                       mol_type = other DNA
                       organism = synthetic construct
SEQUENCE: 15
atcactgaat tcaccatgtt ggtgaagtca ctgtttctag tg                       42

SEQ ID NO: 16          moltype = DNA   length = 89
FEATURE                Location/Qualifiers
misc_feature           1..89
                       note = Synthetic -reverse primer S1 6xHis
source                 1..89
                       mol_type = other DNA
                       organism = synthetic construct
SEQUENCE: 16
atcactgcgg ccgctcagtg gtgatggtga tgatgccctc cgccggagga tccagttcca   60
ttagtgatct taatgtaaaa ctggttttc                                      89

SEQ ID NO: 17          moltype = DNA   length = 22
FEATURE                Location/Qualifiers
misc_feature           1..22
                       note = Synthetic- forward primer IBV N gene
source                 1..22
                       mol_type = other DNA
                       organism = synthetic construct
SEQUENCE: 17
atgctcaacc tagtccctag ca                                             22

SEQ ID NO: 18          moltype = DNA   length = 21
FEATURE                Location/Qualifiers
misc_feature           1..21
                       note = Synthetic- reverse primer IBV N gene
source                 1..21
                       mol_type = other DNA
                       organism = synthetic construct
SEQUENCE: 18
tcaaactgcg gatcatcacg t                                              21

SEQ ID NO: 19          moltype = AA    length = 8
FEATURE                Location/Qualifiers
REGION                 1..8
                       note = Synthetic- OVA I
source                 1..8
                       mol_type = protein
                       organism = synthetic construct
SEQUENCE: 19
SIINFEKL                                                              8
```

```
SEQ ID NO: 20         moltype = AA  length = 17
FEATURE               Location/Qualifiers
REGION                1..17
                      note = Synthetic- OVA II
source                1..17
                      mol_type = protein
                      organism = synthetic construct
SEQUENCE: 20
ISQAVHAAHA EINEAGR                                                      17
```

ADJUVANT FOR ANIMAL AND HUMAN VACCINES

CROSS-REFERENCE TO RELATED APPLICATIONS

This application is divisional of U.S. application Ser. No. 16/900,070, filed Jun. 12, 2020, which application claims priority to U.S. Provisional Application No. 62/860,640, filed Jun. 12, 2019, which applications are incorporated herein by reference in their entireties.

STATEMENT REGARDING FEDERALLY SPONSORED RESEARCH

This invention was made with government support under 2016-67021-25042 awarded by the USDA/NIFA. The government has certain rights in the invention.

REFERENCE TO A SEQUENCE LISTING SUBMITTED VIA PATENT CENTER

The content of the xml file of the sequence listing named "960296_04450.xml" which is 64,839 bytes in size was created on Nov. 3, 2023 and electronically submitted via Patent Center is incorporated herein by reference in its entirety.

BACKGROUND

Vaccines have been hailed as one of the greatest achievements in public health during the past century. Vaccines have been a key factor for fighting infectious diseases that afflict humans and animals, with corresponding increases in human average life expectancy. The global eradication of Smallpox virus in humans and Rinderpest virus in animals, and the near eradication or successful prevention of other viral or bacterial infections, for example meningitis in children due to Hemophilus influenza Type B, offer compelling examples.

Adjuvants play a key role in the successful use of vaccines in human and animal medicines. However, only a handful of such adjuvants are approved for human and animal use. Needed in the art are additional vaccine adjuvant compositions for the improvement of human and animal medicines.

SUMMARY OF THE INVENTION

In a first aspect, provided herein is a composition comprising disaggregated spherical nanostructures comprising Quil-A and chitosan. The disaggregated spherical nanostructures may additionally comprising a payload molecule.

In some embodiments, the payload molecule is selected from the group consisting of a DNA molecule, an RNA molecule, a polynucleotide, a protein, a polypeptide, a virus, a microbe, an attenuated virus, an attenuated microbe, a small molecule, an antibody, or a mixture thereof. In some embodiments, the payload molecule is negatively charged. In some embodiments, the payload is functionalized. In some embodiments, the payload molecule is an antigen specific for *Mycobacterium avium* subspecies paratuberculosis, *Mycobacterium bovis, Mycobacterium tuberculosis*, or *Mycobacterium avium* subspecies *avium*.

In some embodiments, the chitosan is functionalized by treatment with 5-formyl-2-furan sulfonic acid and sodium borohydride such that the chitosan surface is negatively charged.

In some embodiments, the spherical nanostructures are between about 5 nm and about 100 nm in diameter in the absence of a payload molecule.

In a second aspect, provided herein is a vaccine formulation comprising an antigen, the disaggregated spherical nanostructures comprising Quil-A and chitosan described herein as an adjuvant, and a pharmaceutically acceptable carrier.

In a third aspect, provided herein is a vaccine formulation comprising an antigen specific for *Mycobacterium avium* subspecies paratuberculosis, *Mycobacterium bovis, Mycobacterium tuberculosis*, or *Mycobacterium avium* subspecies *avium* and the disaggregated spherical nanostructures comprising Quil-A and chitosan described herein.

In a forth aspect, provided herein is a method of forming a composition comprising Quil-A chitosan spherical nanostructures, comprising the steps of heating a first solution comprising Quil-A at about 55° C. for about 30 minutes; heating a second solution comprising chitosan at about 55° C. for about 30 minutes; mixing equal volumes of the first and second solution dropwise to form a combined solution; vortex mixing the combined solution for about 30 seconds to form a combined, vortexed solution; and incubating the combined vortexed solution whereby a composition comprising Quil-A chitosan spherical nanostructures is formed.

In some embodiments, the combined vortexed solution is incubated at room temperature for about 1 hour. In some embodiments, the first solution additionally comprises a DNA antigen. In some embodiments, the combined vortexed solution is incubated at about 37 C with shaking at about 110 rpm for about 1 hour. In some embodiments, the first solution additionally comprises a protein antigen.

In some embodiments, the first solution comprises about 0.002% Quil-A and the second solution comprises about 0.04% chitosan. In some embodiments, the first solution and the second solution each have a pH between 5.5 and 7.0.

In a fifth aspect, provided herein is a composition comprising Quil-A chitosan spherical nanostructures produced by the methods described herein. In some embodiments the composition additionally comprises an antigen payload molecule.

In a sixth aspect, provided herein is a method of immunizing a subject against an antigen comprising the step of administering to the subject a vaccine formulation comprising a composition comprising Quil-A chitosan spherical nanostructures produced by the methods described herein and an antigen payload molecule. In some embodiments, the subject is selected from the group consisting of a human, a mouse, a rat, a cow, a horse, a pig, a goat, a sheep, a cat, a dog, or a bird.

INCORPORATION BY REFERENCE

All publications, patents, and patent applications mentioned in this specification are herein incorporated by reference to the same extent as if each individual publication, patent, and patent application was specifically and individually indicated to be incorporated by reference.

BRIEF DESCRIPTION OF DRAWINGS

Figure 29:
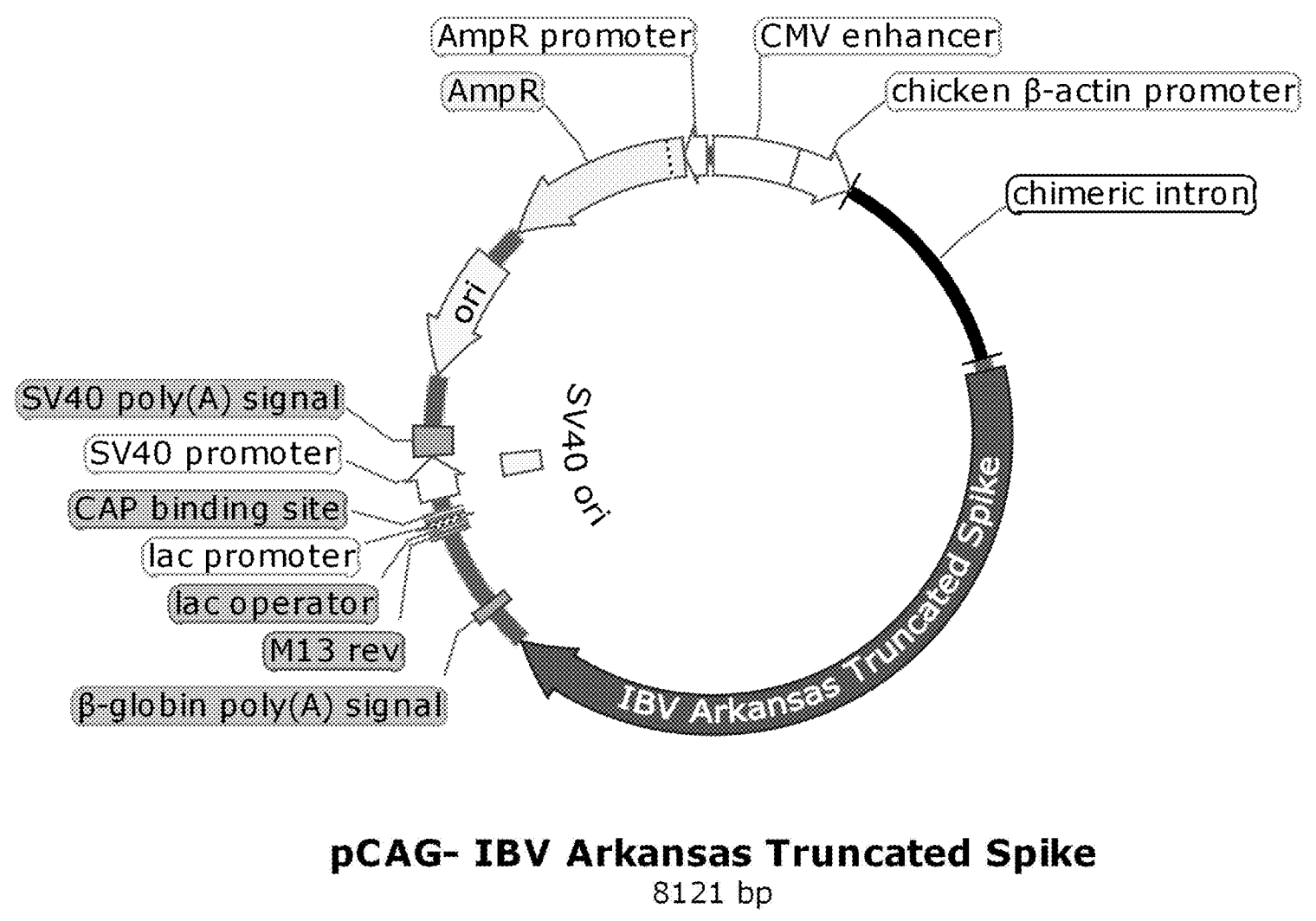

FIG. 29 shows a vector map of the pCAG-IBV Arkansas Truncated Spike plasmid (SEQ ID NO:2).

Figure 1:
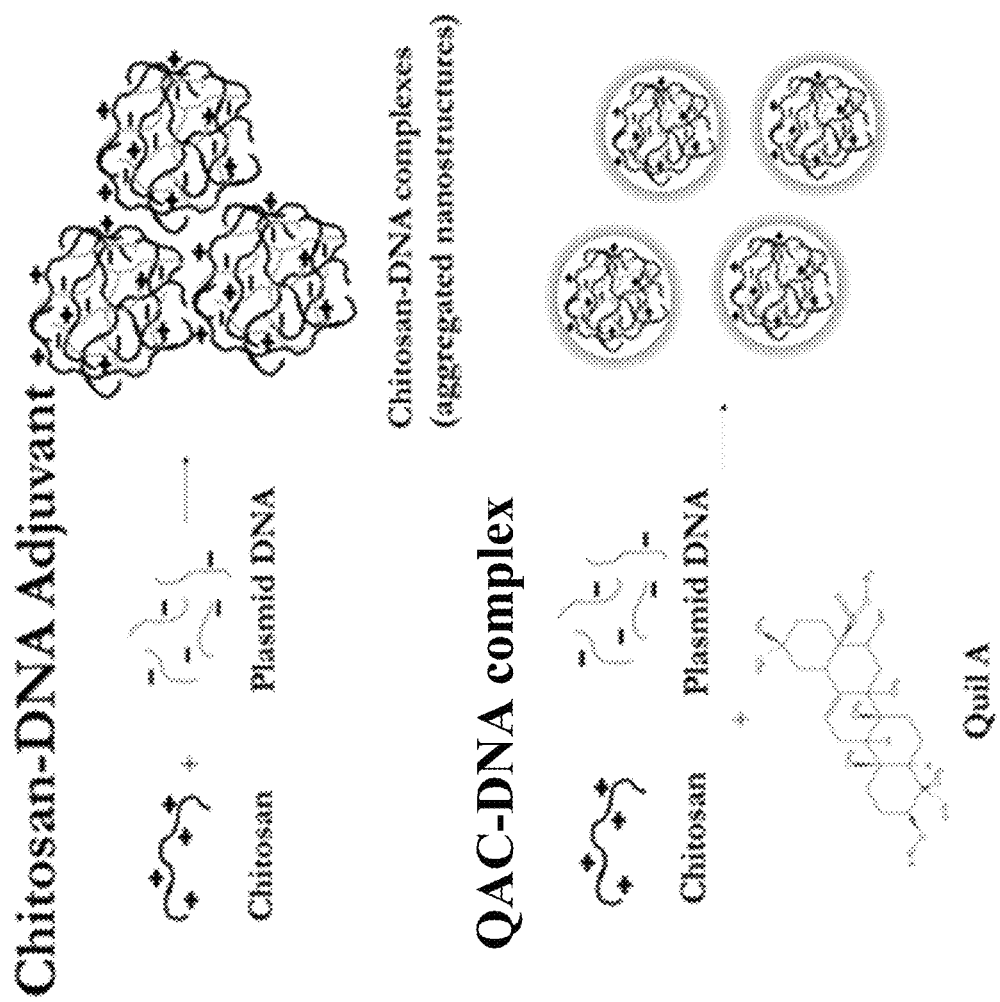
FIG. 1 shows the formation of adjuvant nanostructures using Quil-A and chitosan with a DNA immunogen.
Figure 2:
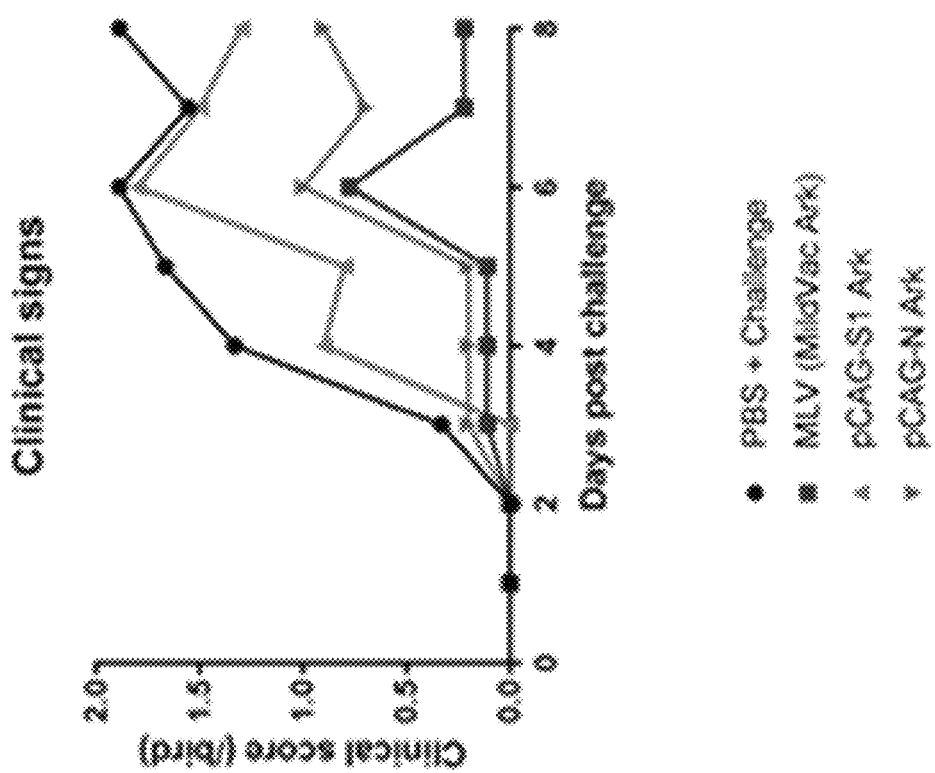
FIG. 2 shows parenteral immunization with naked DNA constructs. Partial protection was observed with naked DNA vaccines for parenteral administration. A partial reduction in viral burden and clinical signs of severity were observed with the naked IBV N vaccine construct, higher levels of circulating IBV specific IgY was observed in naked IBV N vaccinated groups vs spike subunit 1 glycoprotein (S1), and mucosal IgA was not detected.
Figure 2:
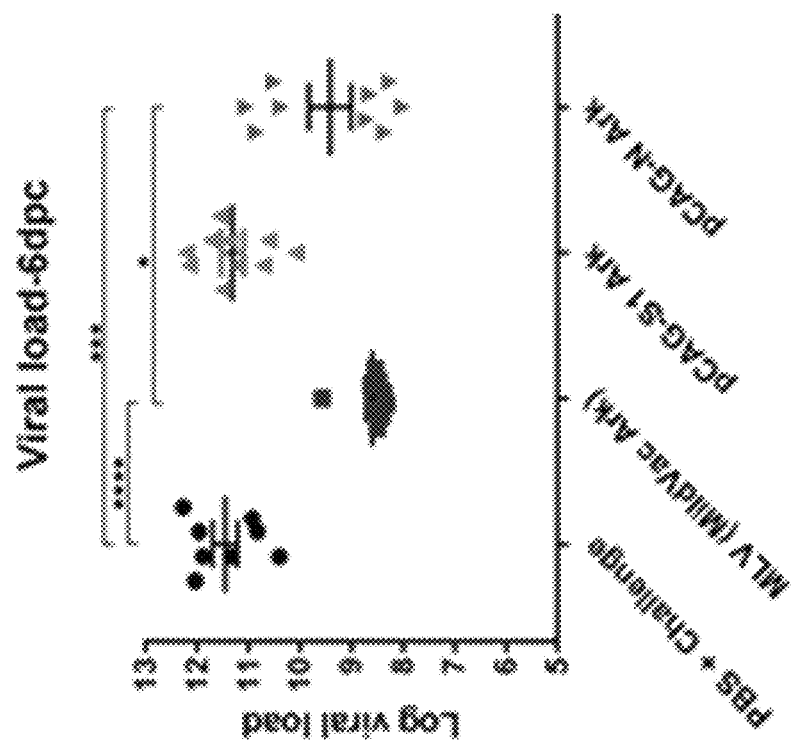
Figure 2:
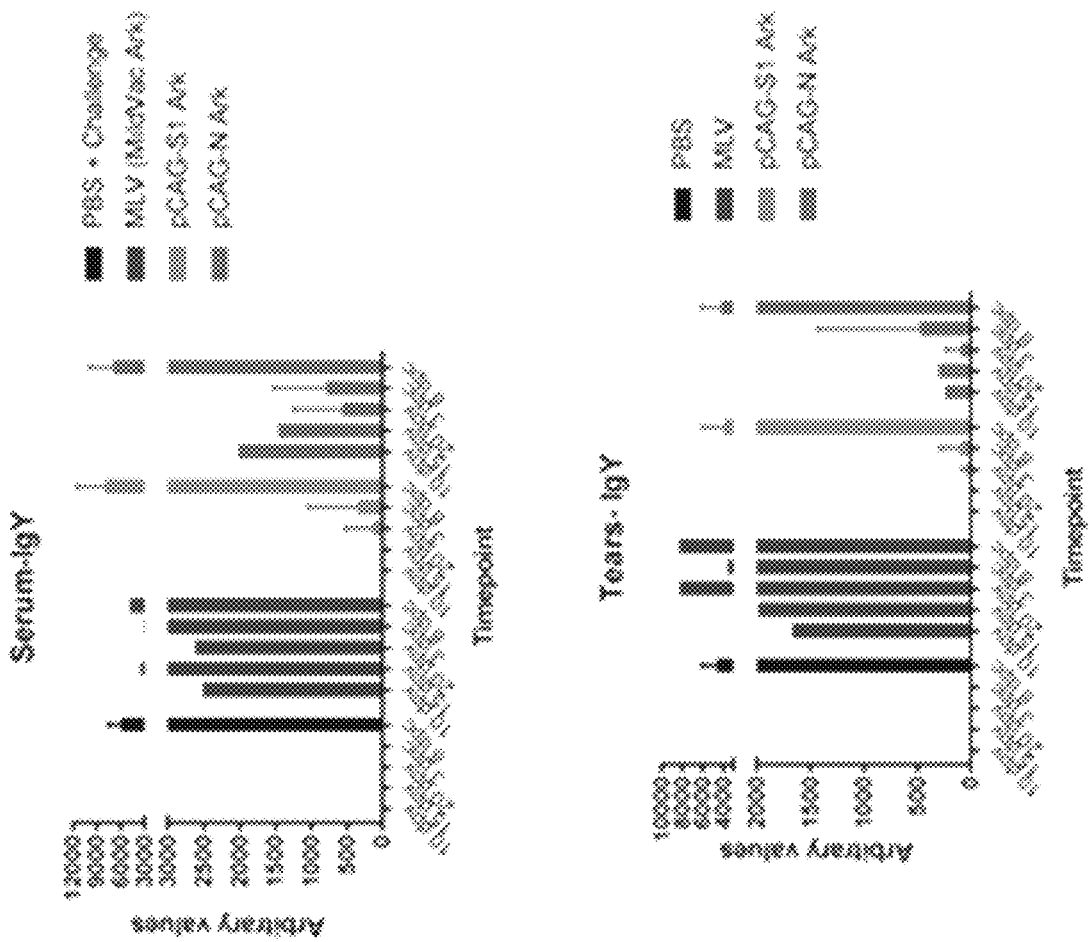
Figure 3:
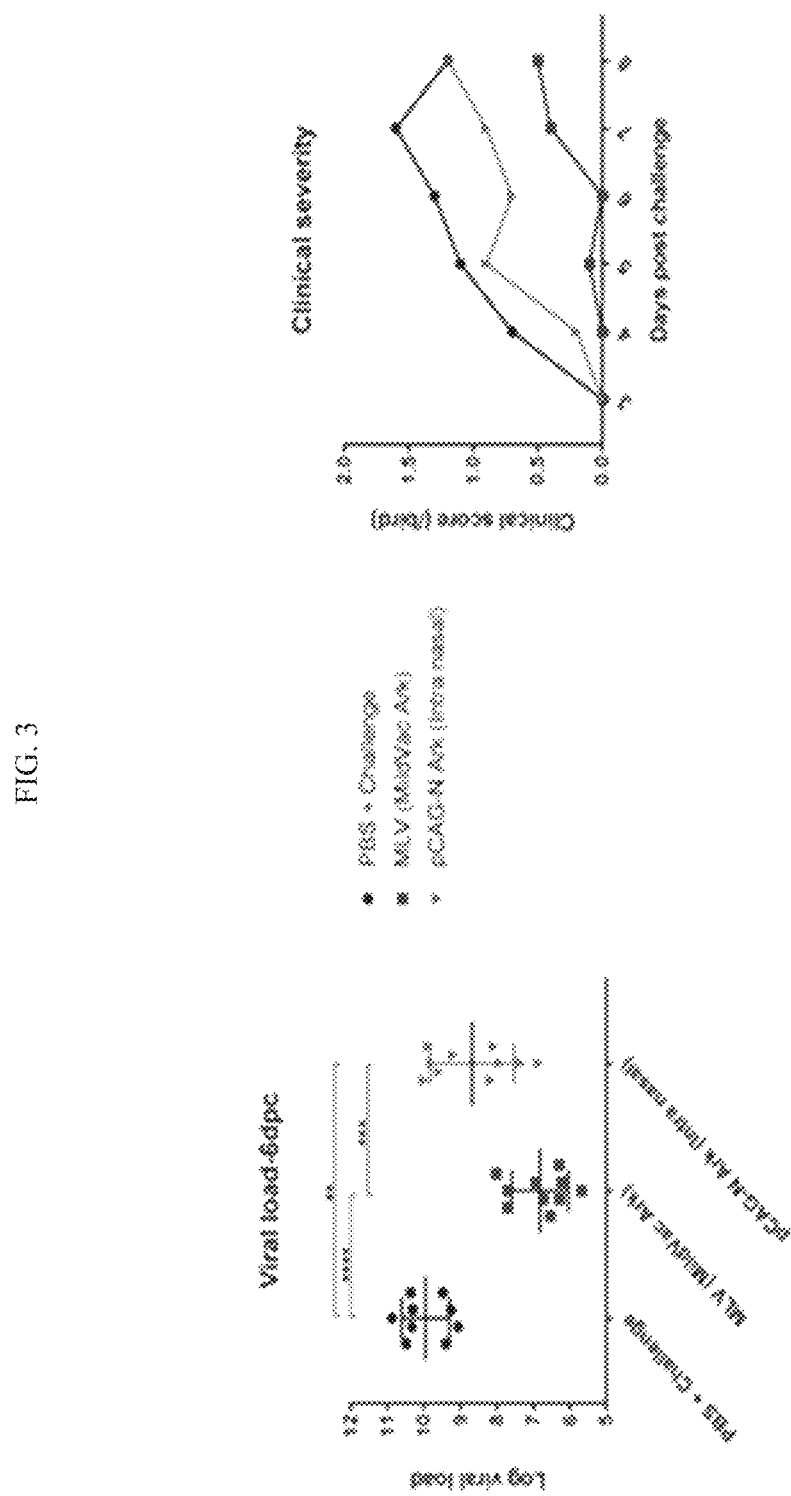
FIG. 3 shows intra nasal immunization with naked DNA constructs. Partial protection was observed with naked DNA vaccines for intra nasal administration. Partial reduction in viral burden and clinical signs of severity were observed with the naked IBV N vaccine construct, IBV specific mucosal IgA was detected in naked DNA vaccinated birds, and no appreciable circulating IgY responses were det
Figure 3:
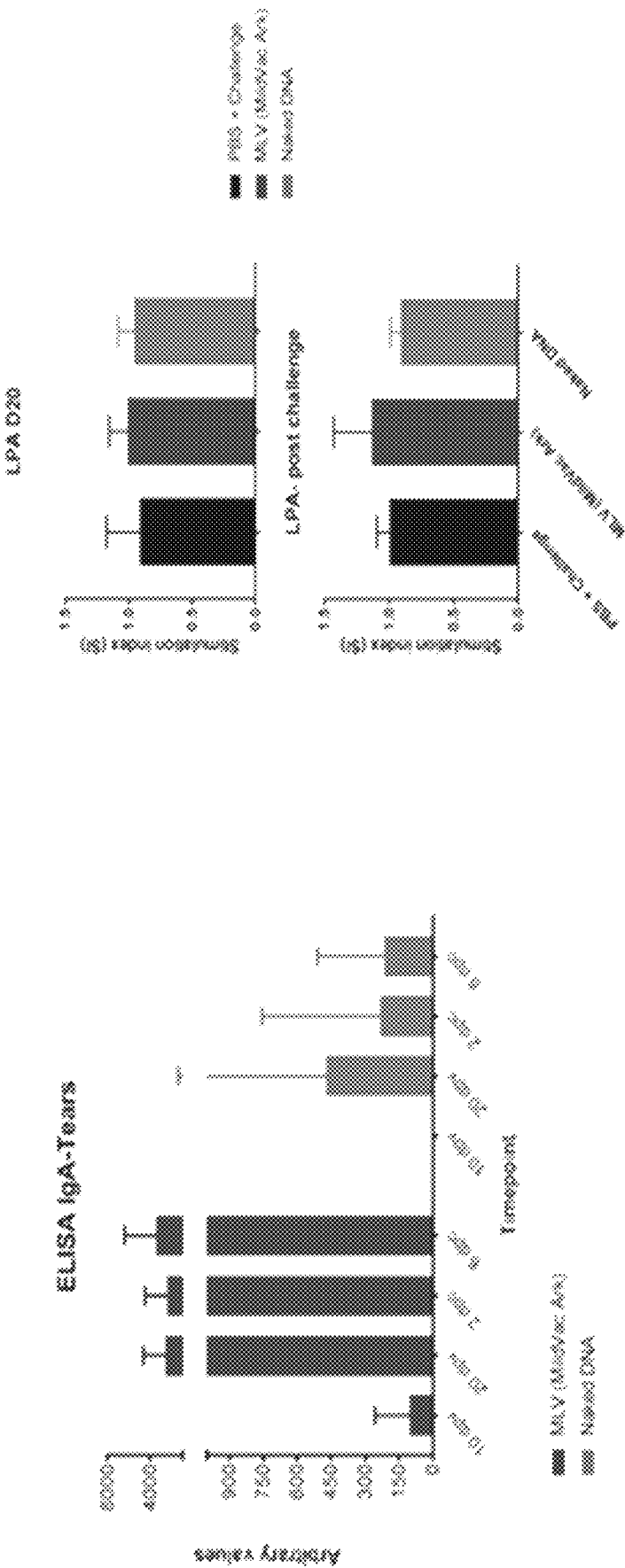
Figure 4:
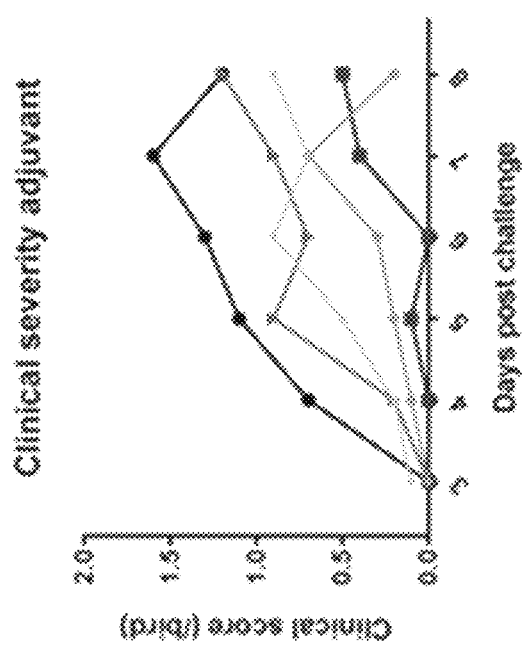
Figure 4:
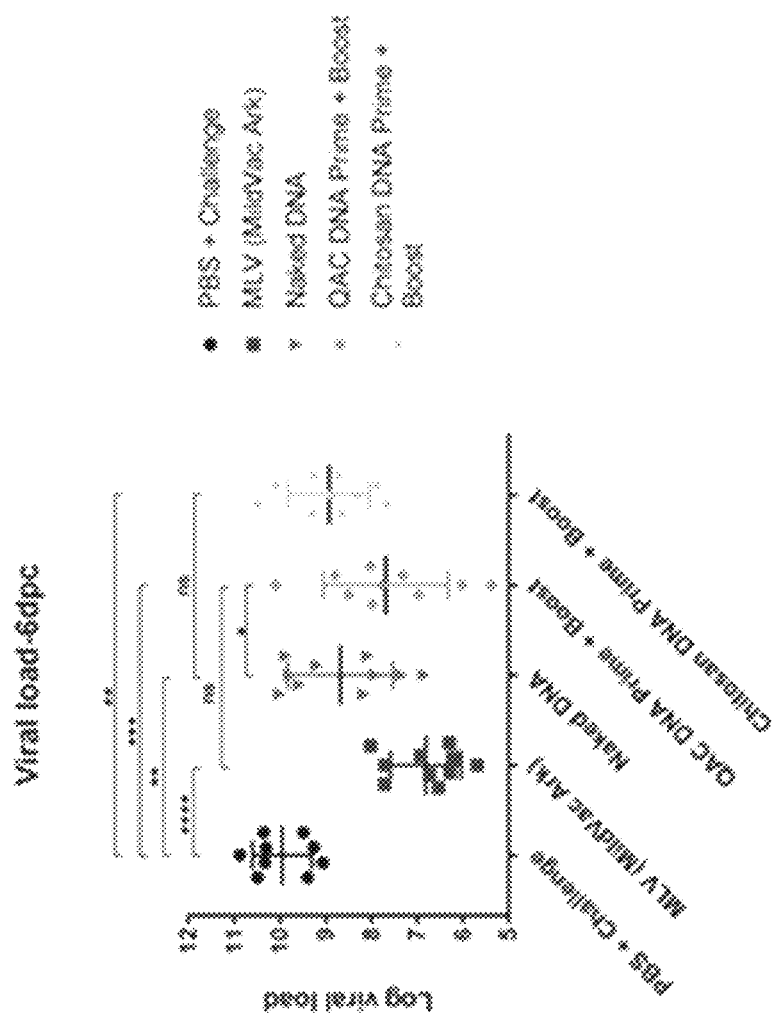
Figure 4:
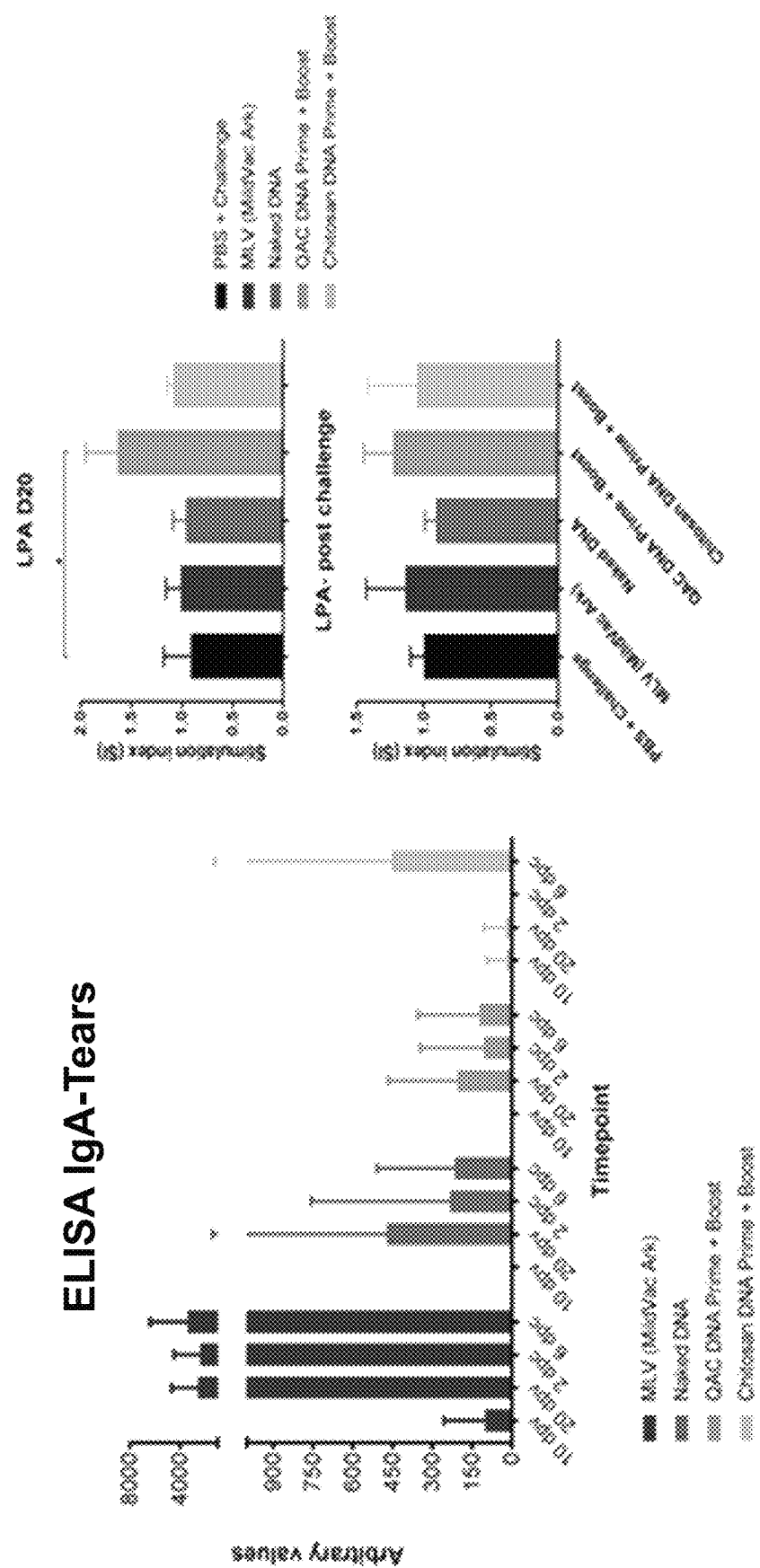
Figure 5:
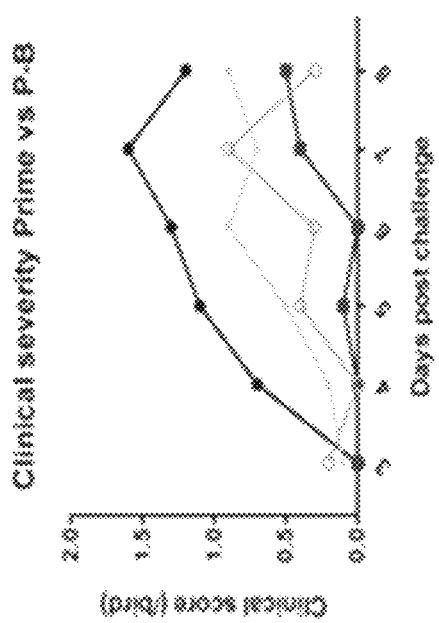
Figure 5:
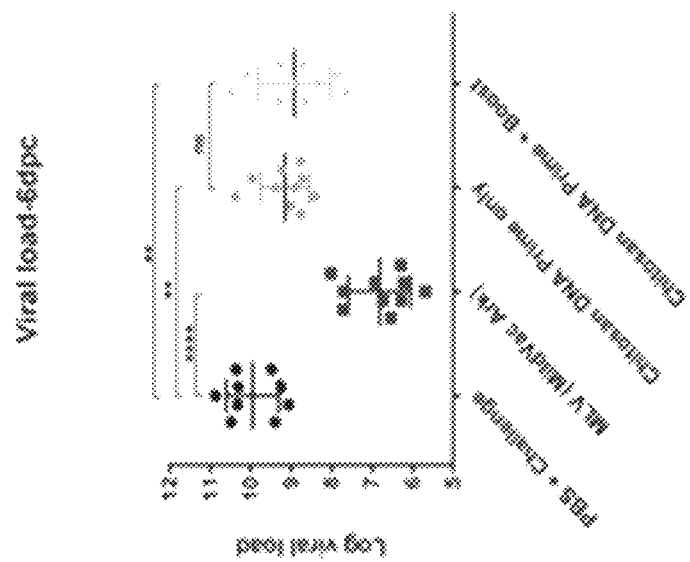
Figure 5:
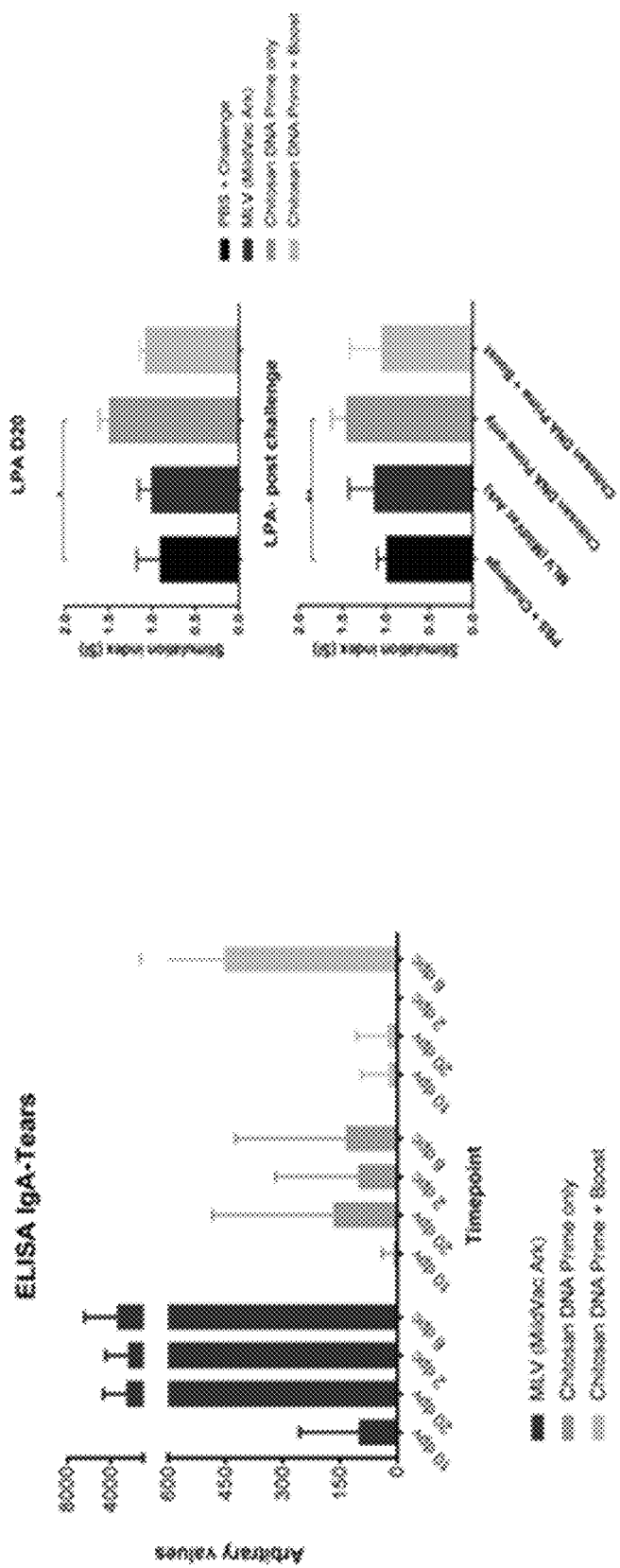
Figure 6:
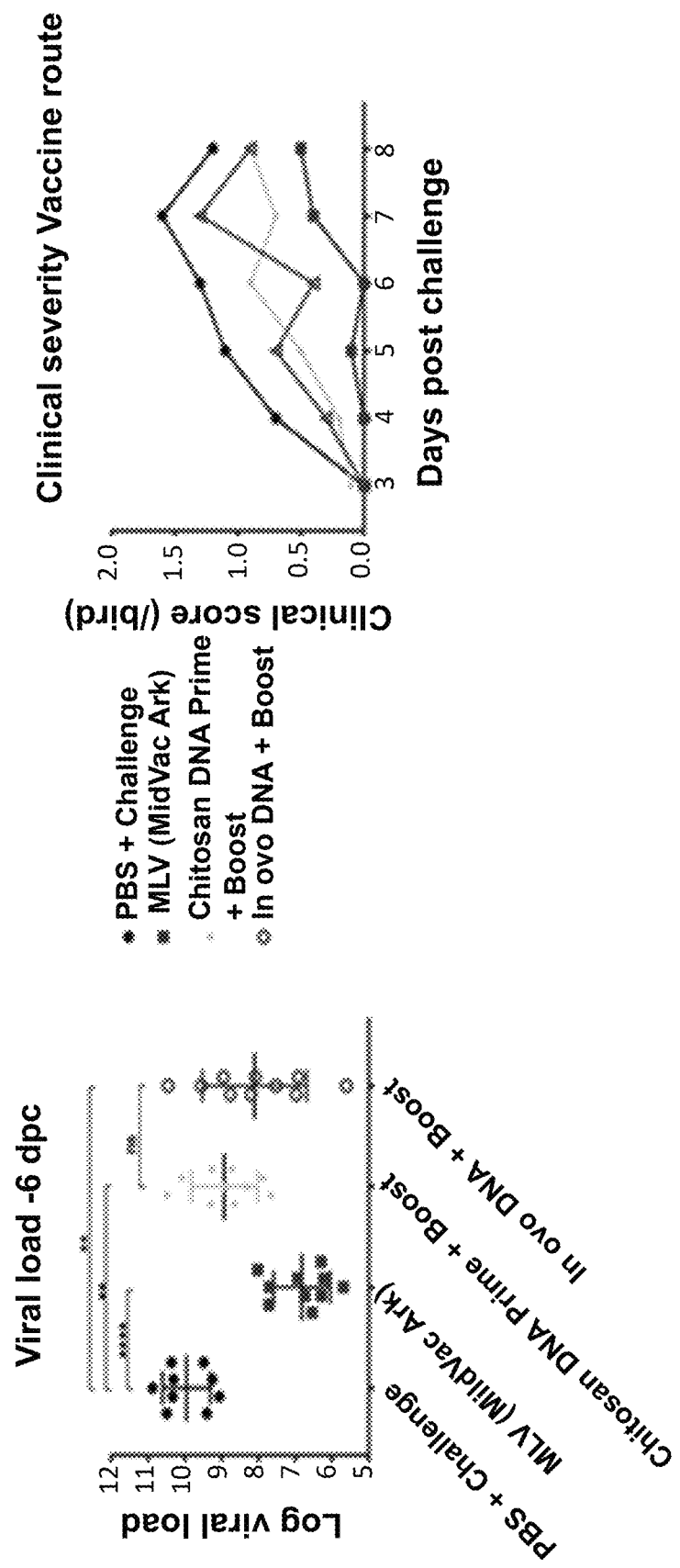
Figure 6:
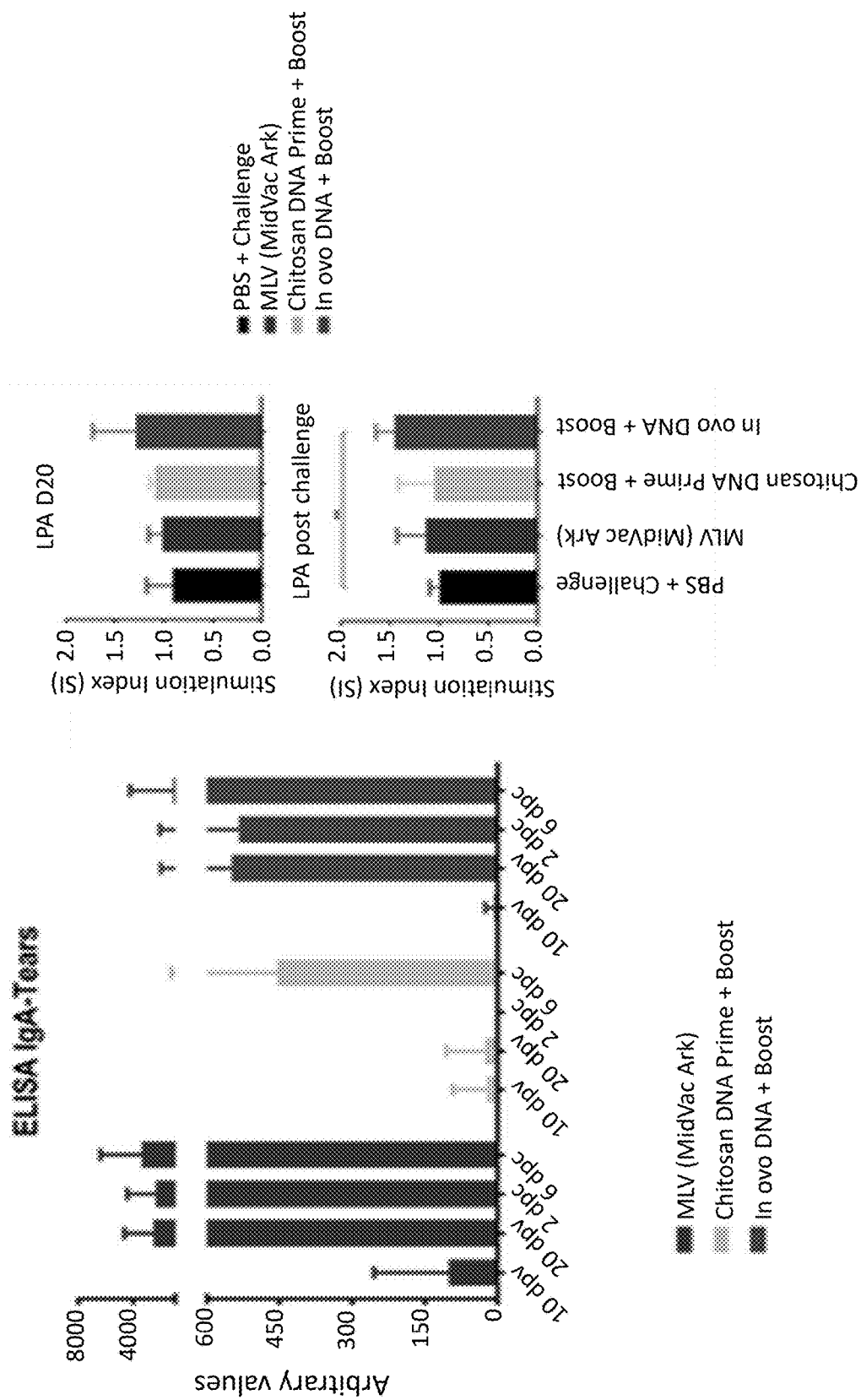
Figure 7:
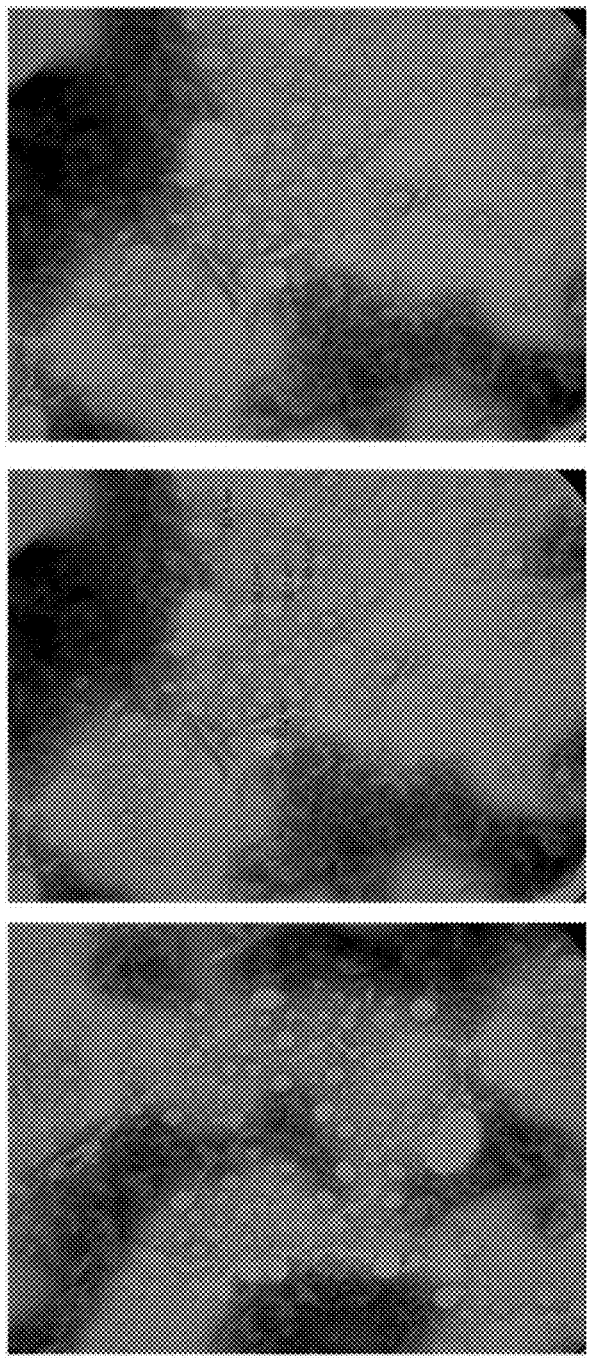
Figure 7:
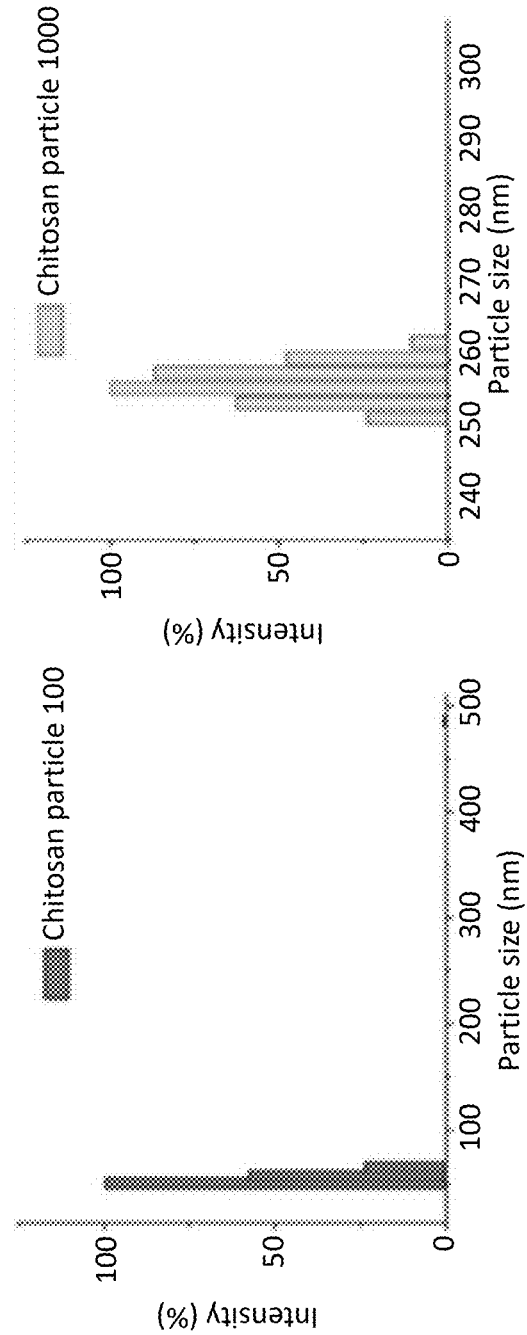
Figure 8:
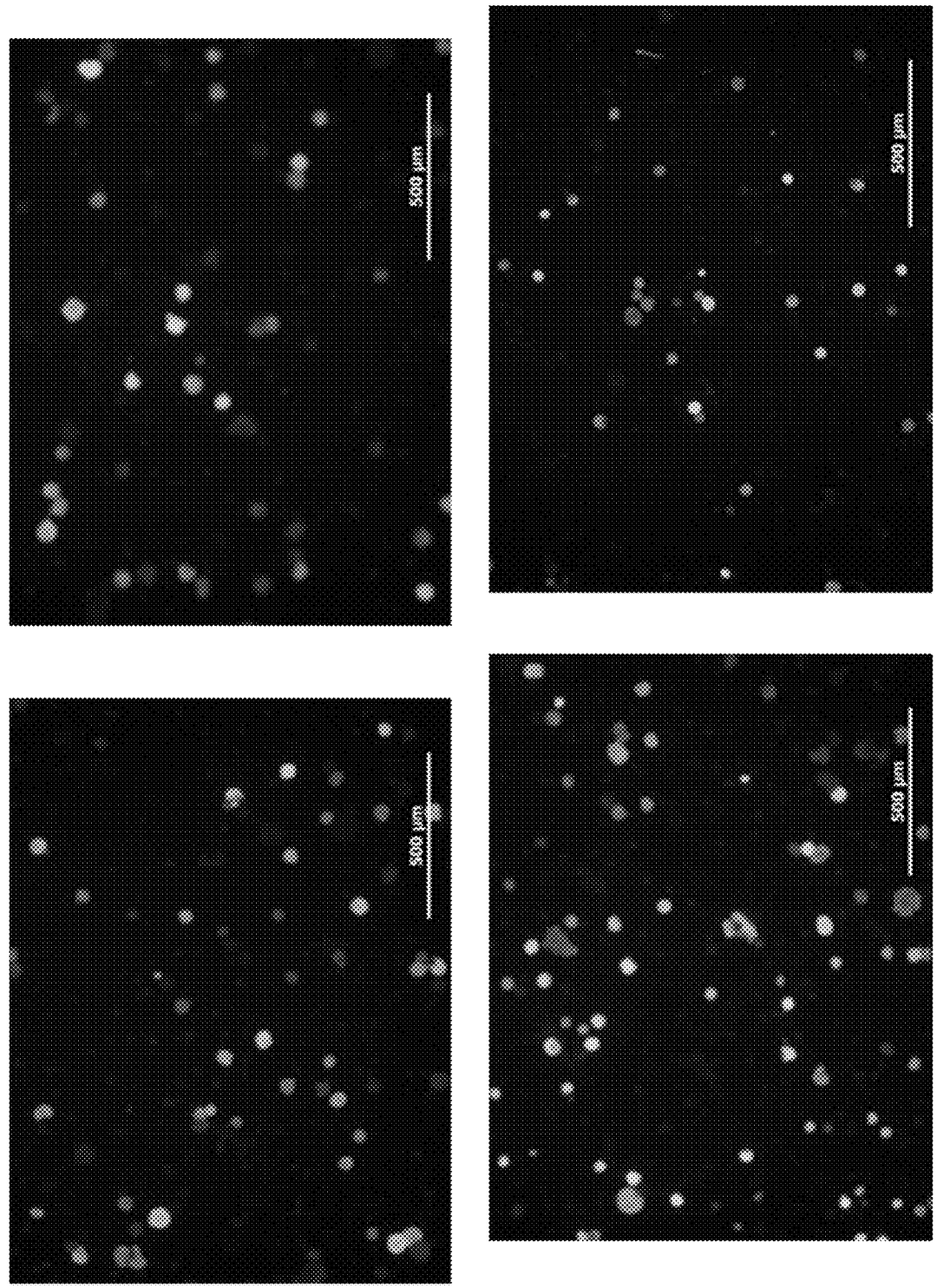
Figure 9:
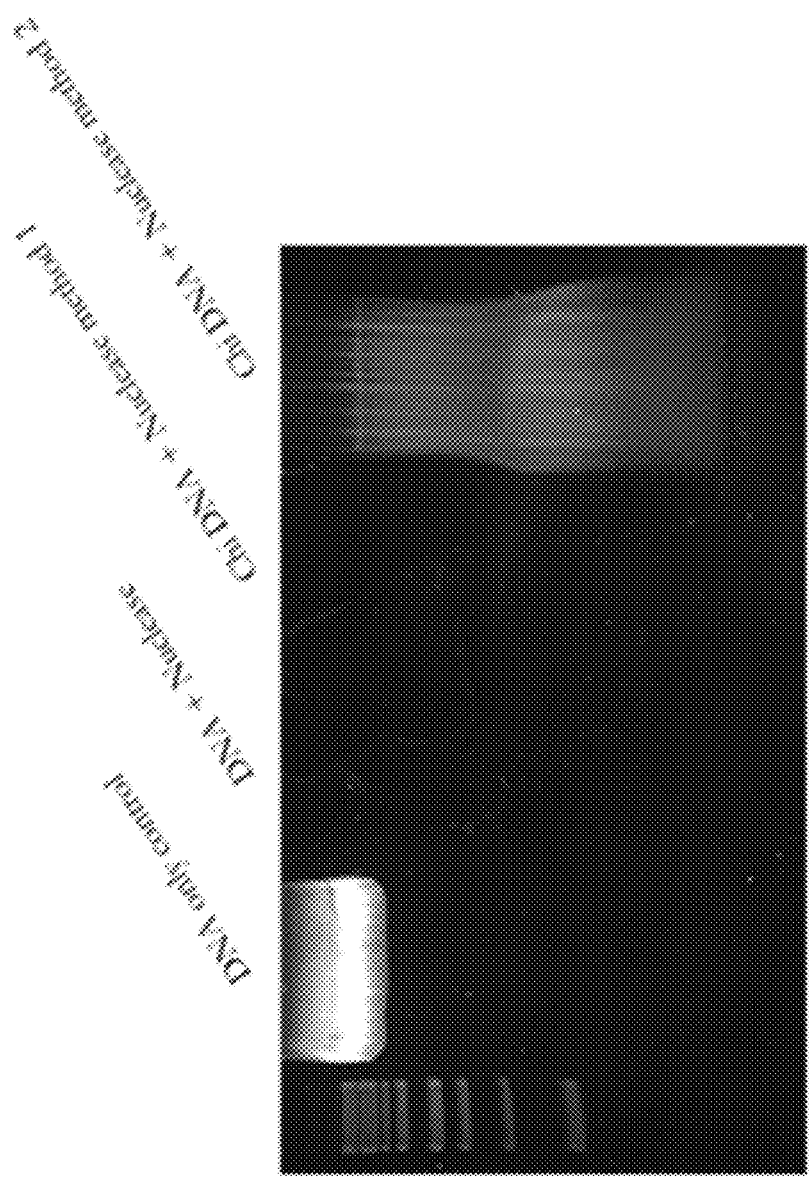
Figure 10:
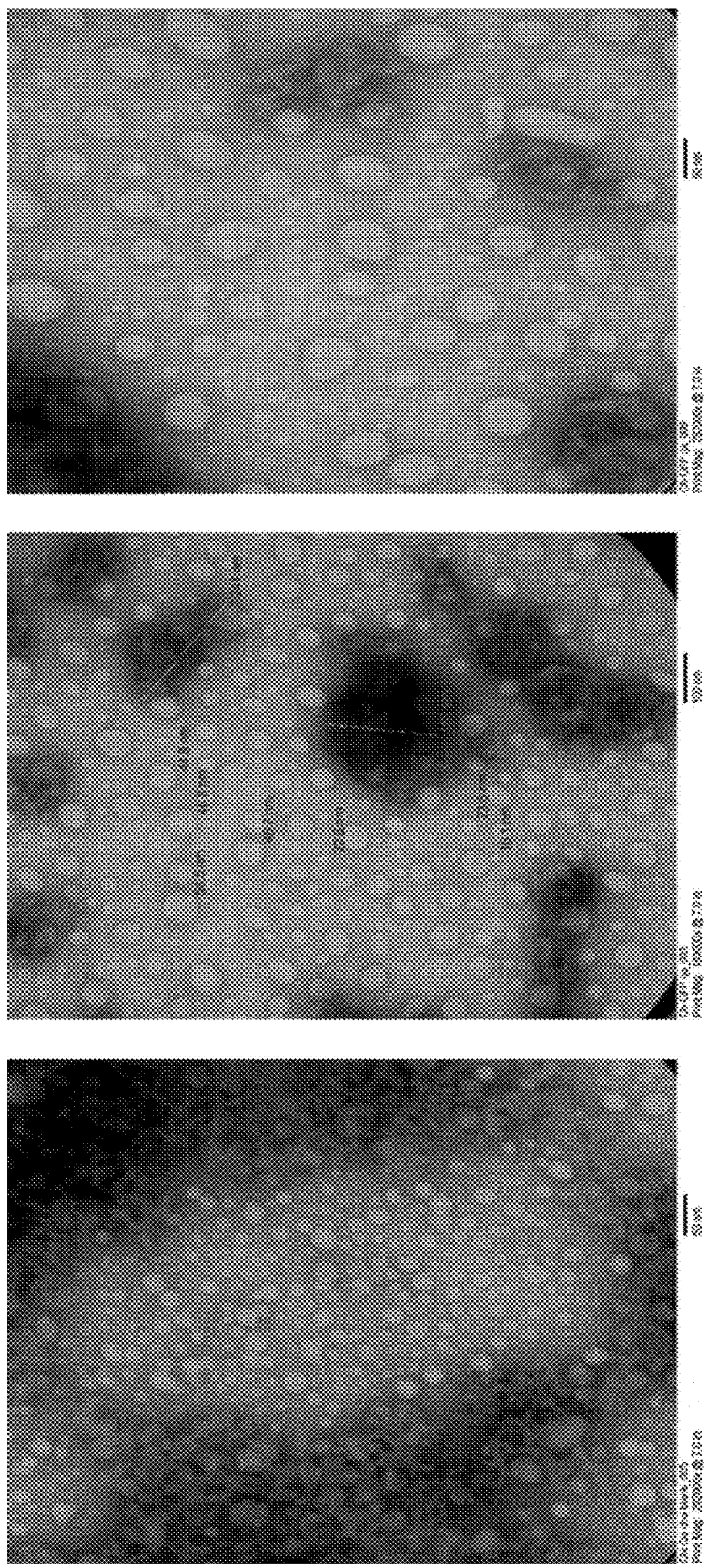
Figure 11:
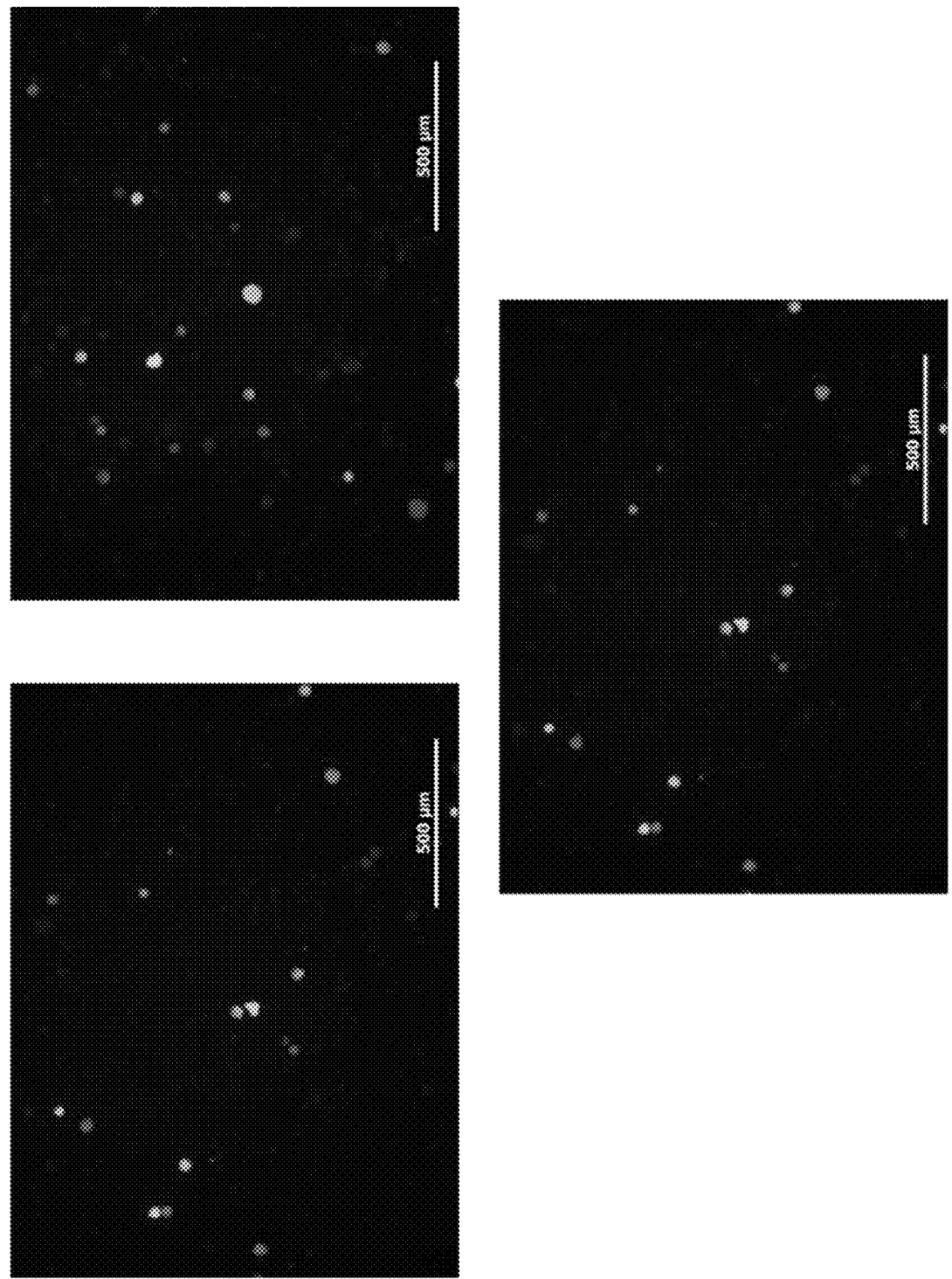

The term "protected," as used herein, refers to immunization of a patient against a disease. The immunization may be caused by administering a vaccine comprising an antigen. Specifically, in the present invention, the immunized patient is protected from a fungal, bacterial, or viral infection.

The term "vaccine," as used herein, refers to a composition that includes an antigen. Vaccine may also include a biological preparation that improves immunity to a particular disease. A vaccine may typically contain an agent, referred to as an antigen, that resembles a disease-causing microorganism, and the agent may often be made from weakened or killed forms of the microbe, its toxins or one of its surface proteins. The antigen may stimulate the body's immune system to recognize the agent as foreign, destroy it, and "remember" it, so that the immune system can more easily recognize and destroy any of these microorganisms that it later encounters.

Vaccines may be prophylactic, e.g., to prevent or ameliorate the effects of a future infection by any natural or "wild" pathogen, or therapeutic, e.g., to treat the disease. Administration of the vaccine to a subject results in an immune response, generally against one or more specific diseases. The amount of a vaccine that is therapeutically effective may vary depending on the particular virus used, or the condition of the patient, and may be determined by a physician. The vaccine may be introduced directly into the subject by the subcutaneous, oral, oronasal, or intranasal routes of administration.

A vaccine of the present invention will include a suitable antigen to stimulate an immune response in a subject or patient. It is envisioned that vaccines of the present invention are not limited to a specific antigen or disease target, except where specifically specified. In some embodiments, the vaccine of the present invention provides immunity against a fungus, a parasite, a bacteria, a microbe, or a virus.

In some embodiments, the vaccine of the present disclosure provides immunity against bacteria. In one embodiment of the invention, the vaccine comprises an antigen for a *Mycobacterium* species, such as, but not limited to, *Mycobacterium avium* subspecies paratuberculosis, *Mycobacterium bovis*, *Mycobacterium tuberculosis*, and *Mycobacterium avium* subspecies *avium*. A non-limiting example of an antigen of the present disclosure are the compositions described in U.S. Patent Publication No. 2018/0147272 ("Vaccine Candidates Against Johne's Disease"), U.S. Pat. No. 9,663,758 ("Global Gene Regulators (GGR) as vaccine candidates against paratuberculosis"), and U.S. Pat. No. 9,220,764 ("Immunogenic compositions against tuberculosis").

In some embodiments, the vaccine of the present disclosure provides immunity against a virus. In some embodiments, the vaccine comprises an antigen for infectious bronchitis virus. In some embodiments, the vaccine comprises an antigen for Severe Acute Respirator Syndrome Coronavirus 2 (SARS-CoV-2).

Vaccine Administration

The term "administration," as used herein, refers to the introduction of a substance, such as a vaccine, into a subject's body. The administration, e.g., parenteral administration, may include subcutaneous administration, intramuscular administration, transcutaneous administration, intradermal administration, intraperitoneal administration, intraocular administration, intranasal administration and intravenous administration.

The vaccine or the composition according to the invention may be administered to an individual according to methods known in the art. Such methods comprise application e.g. parenterally, such as through all routes of injection into or through the skin: e.g. intramuscular, intravenous, intraperitoneal, intradermal, mucosal, submucosal, or subcutaneous. Also, the vaccine may be applied by topical application as a drop, spray, gel or ointment to the mucosal epithelium of the eye, nose, mouth, anus, or vagina, or onto the epidermis of the outer skin at any part of the body.

Other possible routes of application are by spray, aerosol, or powder application through inhalation via the respiratory tract. In this last case, the particle size that is used will determine how deep the particles will penetrate into the respiratory tract.

Alternatively, application may be via the alimentary route, by combining with the food, feed or drinking water e.g. as a powder, a liquid, or tablet, or by administration directly into the mouth as a: liquid, a gel, a tablet, or a capsule, or to the anus as a suppository.

The term "immune status" or "immunocompetence," as used herein, refers to the ability of the body to produce a normal immune response following exposure to an antigen. Immunocompetence is the opposite of immunodeficiency or immuno-incompetent or immuno-compromised.

The present disclosure is generally applied to mammals, including but not limited to humans, cows, horses, sheep, pigs, goats, rabbits, dogs, cats, mice and rats. In some embodiments, the present disclosure can be applied to birds. In certain embodiments, non-human mammals, such as mice and rats, may also be used for the purpose of demonstration. One may use the present invention for veterinary purpose. For example, one may wish to treat commercially important farm animals, such as cows, horses, pigs, rabbits, goats, sheep, and birds, such as chickens. One may also wish to treat companion animals, such as cats and dogs.

Adjuvants

Figure 12:
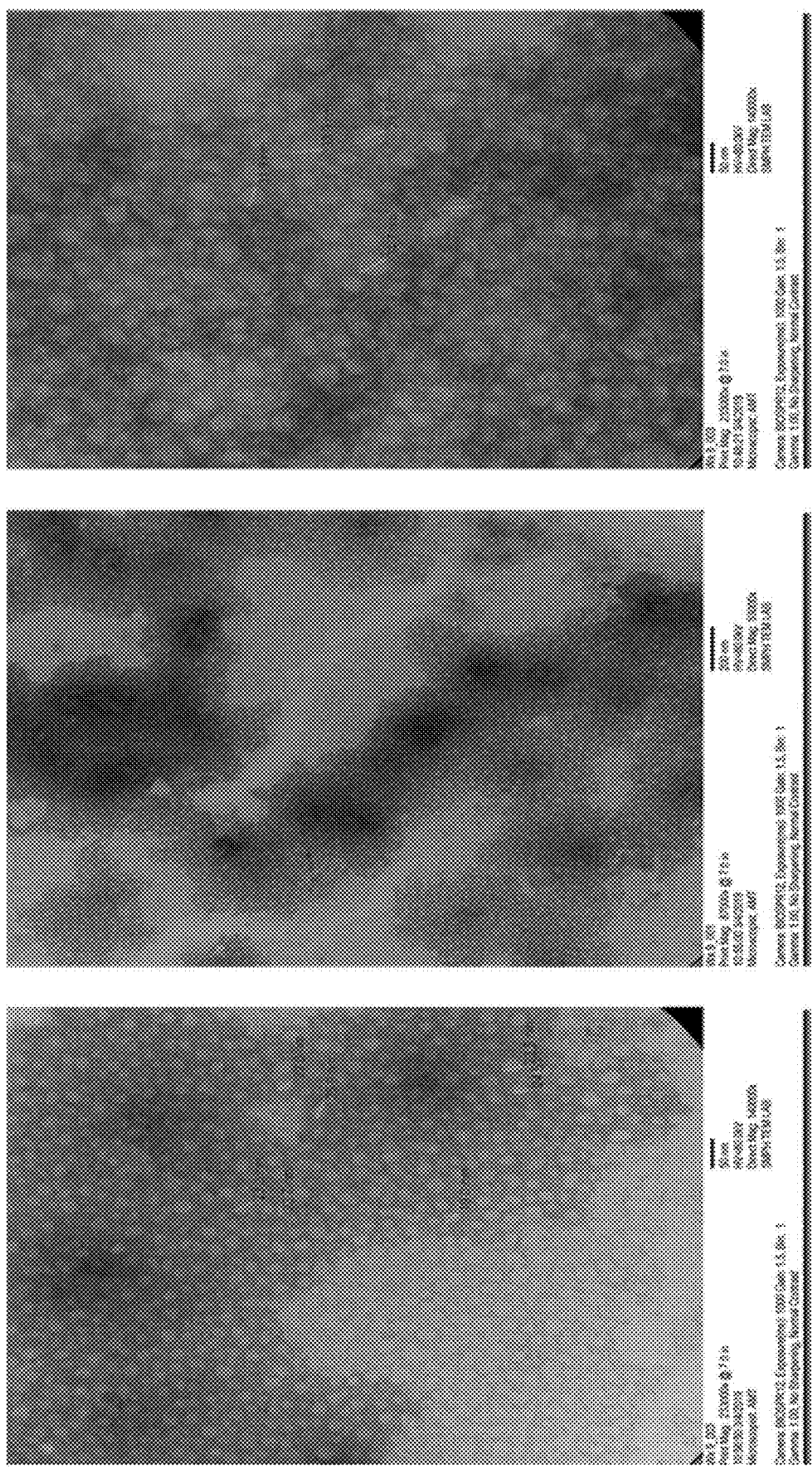
Figure 13:
Figure 13:
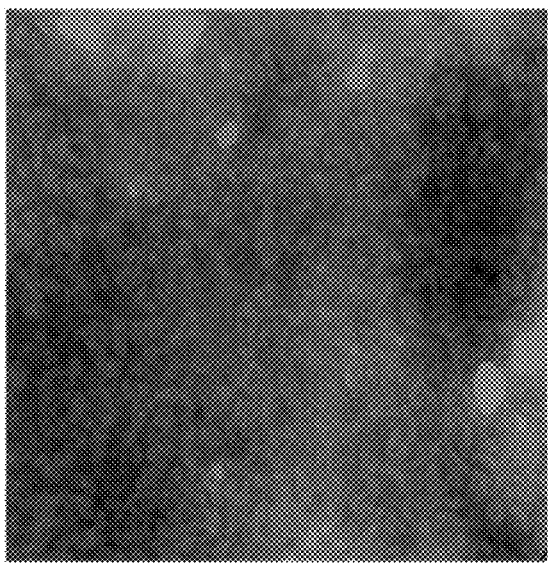
Figure 13:
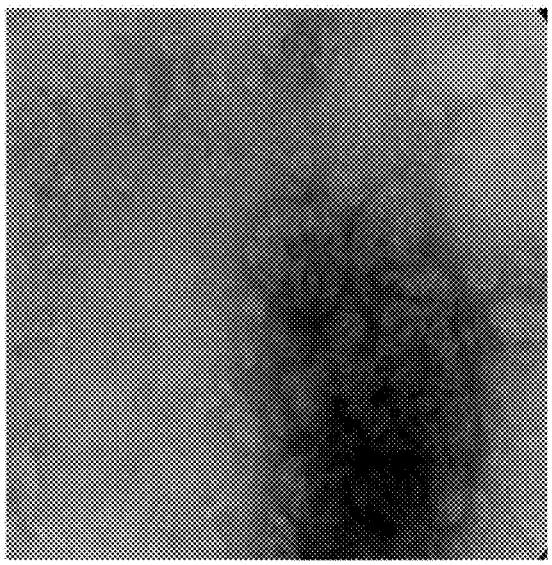
Figure 13:
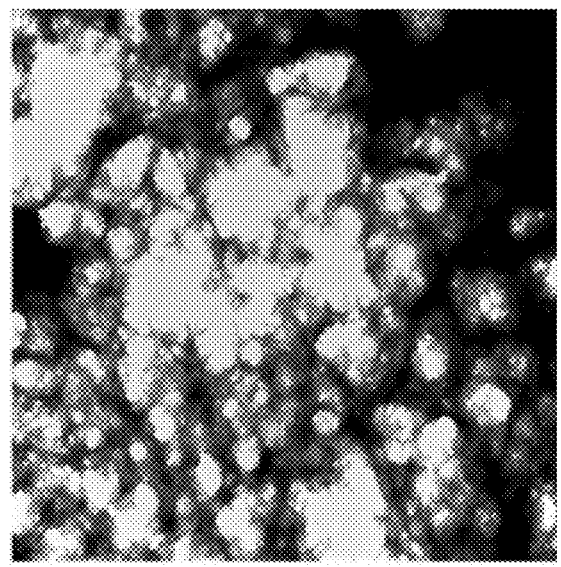
Figure 13:
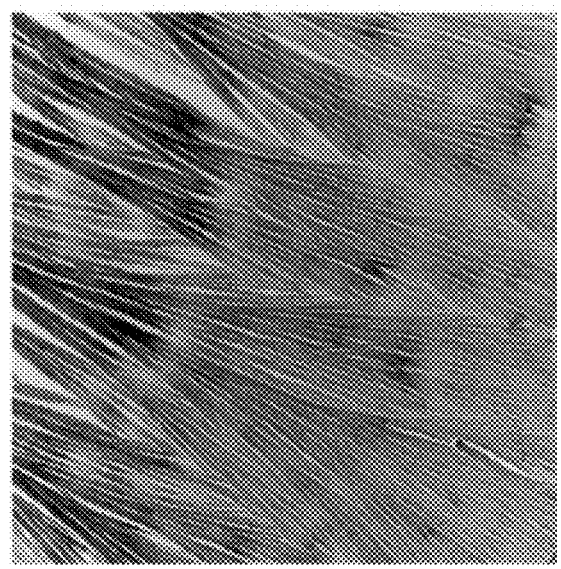
Figure 13:
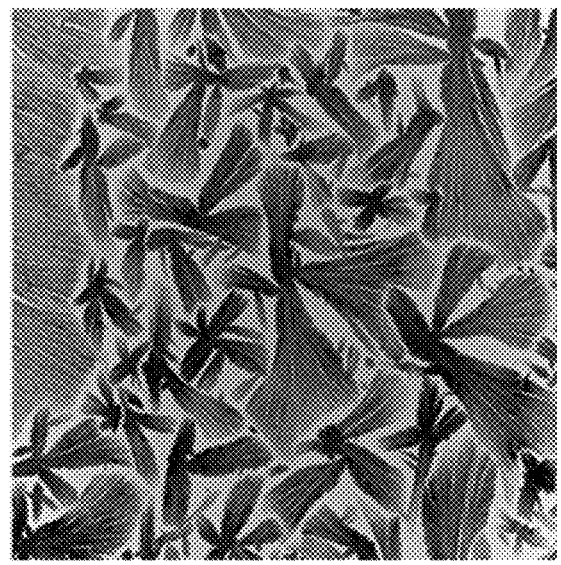
Figure 14:
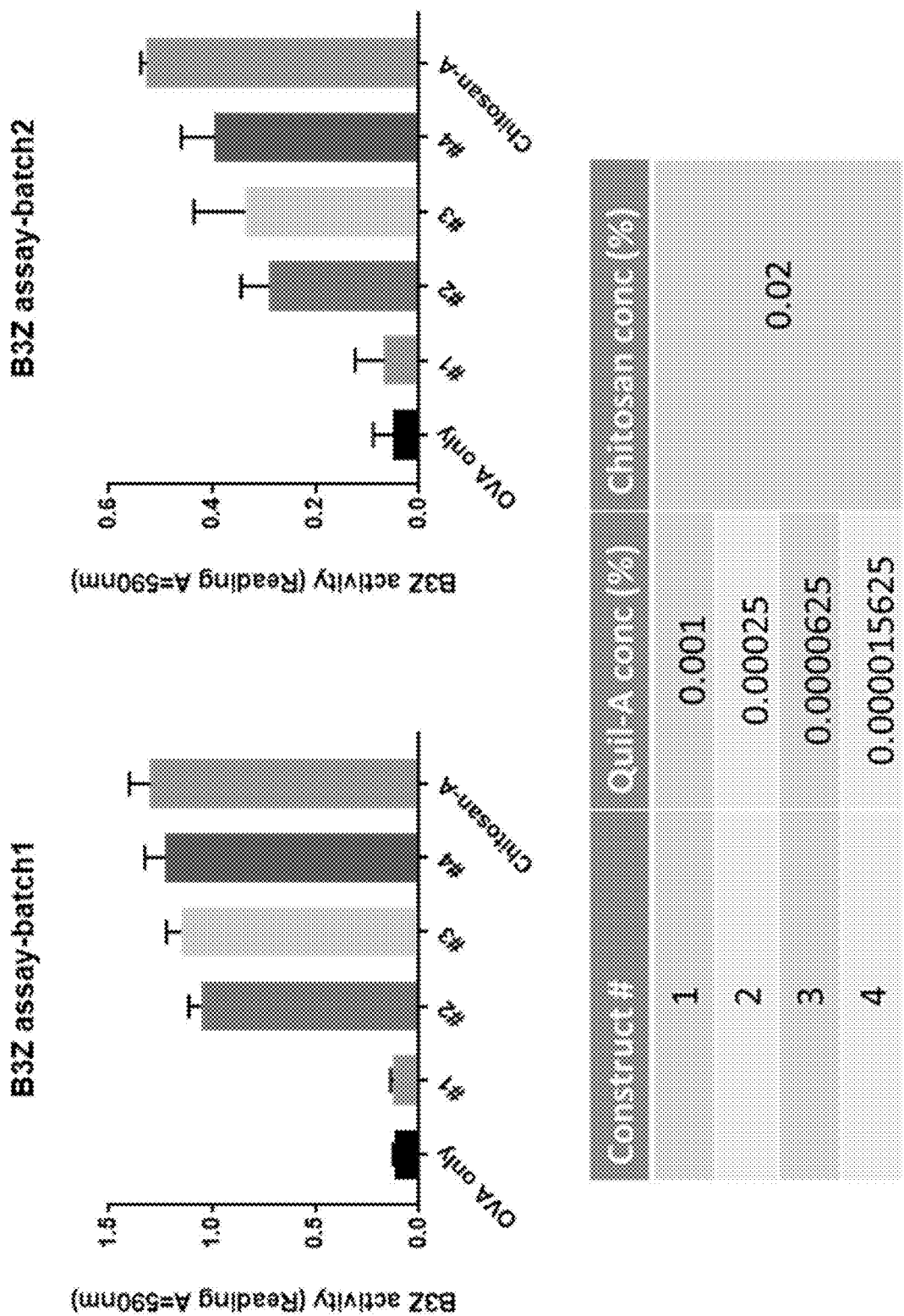

As used herein "Quil-A chitosan complex" or "QAC complex" refers to a composition of Quil-A and chitosan which forms distinct disaggregated spherical nanostructures. FIG. 12 shows an example of these disaggregated spherical nanostructures. As used herein, "disaggregated," refers to the formation of discrete observable particles as opposed to aggregated non-discrete assemblies with non-distinct boundaries. The QAC complex nanostructures are less 100 nm in diameter when measured in the absence of any payload molecules. For example, between about 5 nm and about 100 nm, between about 10 nm and about 95 nm, between about 15 nm an about 90 nm, between about 20 nm and about 90 nm, or between about 25 nm and about 85 nm. The QAC complex may be loaded with one or more payload molecules. The payload-QAC complex may be between about 20 nm and about 1000 nm in diameter. The specific size of the payload-QAC complex will vary depending on the size and amount of payload in the nanostructure.

In one embodiment, the QAC complex is formed by mixing a first solution of Quil-A into a second solution of chitosan to form a final mixed solution including the QAC complex. In the final mixed solution, the Quil-A and the chitosan are typically present at a ratio of between about 1:15 to about 1:100, between about 1:15 and about 1:75, between about 1:15 and about 1:50, between about 1:15 and about 1:25, between about 1:17 and about 1:25, or between about 1:18 and about 1:25. In some embodiments, the Quil-A and the chitosan are present at a ratio of about 1:20 (e.g., 1:15, 1:16, 1:17, 1:18, 1:19, 1:20, 1:21, 1:22, 1:23, 1:24, or 1:25) in the final mixed solution. In some embodiments, in the final solution Quil-A is at a concentration of 0.001% and chitosan is at a concentration of between about 0.02% and about 0.1%. In some embodiments, in the final solution Quil-A is at a concentration between about 0.00001% and about 0.5%. In some embodiments, in the final solution the chitosan is at a concertation between about 0.00015% and about 7.5%.

In some embodiments, the Quil-A solution and the chitosan solution are mixed drop-wise. In some embodiments, the Quil-A solution and the chitosan solution are mixed by vortex mixing for about 15-90 seconds (15 seconds, 20 seconds, 25 seconds, 30 seconds, 35 seconds, 40 seconds, 45 seconds, 50 seconds, 60 seconds, 70 seconds, 80 seconds or 90 seconds). In some embodiments, the Quil-A solution and the chitosan solution are mixed drop-wise followed by vortex mixing for about 15-90 seconds (15 seconds, 20 seconds, 25 seconds, 30 seconds, 35 seconds, 40 seconds, 45 seconds, 50 seconds, 60 seconds, 70 seconds, 80 seconds or 90 seconds).

The Quil-A solution and the chitosan solution may be heated prior to mixing. In some embodiments, the Quil-A solution and the chitosan solution are heated to a temperature between about 20° C. and about 60° C. (e.g., 20° C., 25° C., 30° C., 35° C., 40° C., 45° C., 50° C., 55° C., or 60° C.) for between about 20 to about 40 minutes (20 minutes, 25 minutes, 30 minutes, 35 minutes, or 40 minutes) prior to mixing. In some embodiments, after mixing the final solution is incubated at room temperature for about 1 hour to promote QAC complex formation. In some embodiments, after mixing the final solution is incubated for 1 hour at between about 20° C. and about 45° C. (e.g., 20° C., 21° C., 22° C., 23° C., 24° C., 25° C., 26° C., 27° C., 28° C., 29° C., 30° C., 31, 32° C., 33° C., 34° C., 35° C., 36° C., 37° C., 38° C., 39° C., 40° C., 41° C., 42° C., 43° C., 44° C., or 45° C.) with shaking at between about 90 rpm and about 150 rpm (e.g., 90 rpm, 95 rpm, 100 rpm, 105 rpm, 110 rpm, 115 rpm, 120 rpm, 125 rpm, 130 rpm, 135 rpm, 140 rpm, 145 rpm, or 150 rpm). The pH of the solutions may be between 5.5 and 7.0.

In some embodiments, the Quil-A solution is prepared by creating a stock solution of Quil-A in water and diluting the stock Quil-A solution with a buffered solution. The buffer may be any suitable buffer known in the art to buffer a solution at a pH between 5.5 and 7.0. In some embodiments the buffer is sodium sulfate buffer.

In some embodiments, the chitosan solution is prepared by creating a stock solution of chitosan in acetic acid and diluting the stock acetic acid solution with a buffered solution. The buffer may be any suitable buffer in the art to buffer a solution at a pH between 5.5 and 7.0. In some embodiments the buffer is sodium acetate buffer at pH 5.5.

In some embodiments, a first solution of about 0.002% Quil-A in 50 mM sodium sulfate buffer pH 5.5 and a second solution of about 0.04% chitosan in 5 mM sodium acetate buffer pH5.5 are each heated at 55° C. for about 30 min. Equal volumes of the first and second solution are mixed dropwise then vortex mixed for about 30 s followed by incubation at room temperature for about 1 hour for QAC complex formation.

As used herein "Quil-A" refers to the powdered saponin fraction isolated from extract of the bark of *Quillaja saponaria* trees. Quil-A is commercially available, for example from Desert King sold under the product name Vet-Sap™ (desertking.com/pharmaceutical-applications/#veterinary adjuvant).

In some embodiments, the Quil-A is replaced with a surfactant or mild detergent. Surfactants and mild detergents may include but are not limited to, polyoxyethylene (20) sorbitan monolaurate (Tween™ 20), polyethylene glycol sorbitan monostearate (Tween™ 60), polyoxyethylenesorbitan tristearate (Tween™ 65), polyoxyethylene (20) sorbitan monooleate (Tween™ 80), polyoxyethylenesorbitan trioleate (Tween™ 85), octyl oligooxyethelene (OPOE), N,N-dimethyldodecylamine (LDAO), and polyethylene glycol p-(1,1,3,3-tetramethylbutyl)-phenyl ether (Triton X-100). In general, when replacing Quil-A with a surfactant or mild detergent, the concentration of the surfactant or milk detergent will vary depending on the strength of the detergent or surfactant such that lower concentrations of stronger detergents and higher concentrations of weaker detergents are used.

As used herein "chitosan" refers to a linear polysaccharide composed of randomly distributed (3-linked D-glucosamine and N-acetyl-D-glucosamine. Chitosan can be obtained from the chitin shells of shrimp and other crustaceans by treatment of the shells with an alkaline substance. Chitosan is a non-toxic, naturally occurring cationic polymer that readily complexes with DNA and negatively charged proteins. Chitosan is biocompatible and biodegradable. Compositions incorporating chitosan have sustained release kinetics and are immunomodulary by enhancing the T-cell response. In some embodiments, chitosan is deacetylated chitosan, for example >75% deacetylated chitosan. Deacetylated chitosan (>75%) is available commercially from Sigma (C3646). Higher deacetylation percentages, for example about 90%, will mediate stronger binding with nucleic acids resulting in slower release kinetics from the nanoparticle structures of the Quil-A chitosan complex. In some embodiments, the chitosan is at least 70%, 75%, 80%, 85%, 90%, or 95% deacetylated. In some embodiments, the chitosan is between about 60% and about 90% deacetylated.

The QAC complex may be loaded with one or more payload molecules. The payload molecule may be an antigen of interest for use in a vaccine composition. The payload molecule may be an immunogen for use in a vaccine composition. The payload molecule may be, but is not limited to, a DNA molecule, an RNA molecule, a polynucleotide, a protein, a polypeptide, a virus, a microbe, an attenuated virus, an attenuated microbe, a small molecule, an antibody, or a mixture thereof.

In some embodiments, the payload is a live attenuated microbe. The pathogen of interested may be attenuated or reduced in virulence by any suitable means known in the art including but not limited to repeated passaging through a series of cell cultures, animal embryos (e.g., chicken embryos), or by genetic engineering to produce a mutated strain of the pathogen (e.g., mutant bacteria or mutant fungi).

In some embodiments, the payload is a recombinant protein. In some embodiments, the payload may be a subunit vaccine.

In some embodiments, the payload is an inactivated pathogen. The pathogen of interest may be inactivated by any suitable means known in the art including but not limited to, heat treatment, UV treatment, and chemical treatment (e.g., formaldehyde or glutaraldehyde).

In some embodiments, the payload is a recombinant viral vector. The recombinant viral vector may include, but is not limited to, an adeno viral vector or a poxvirus vector.

Recombinant viral vectors may be used to deliver vaccine antigens by encoding immunogenic agents from a pathogen of interest.

In some embodiments, the payload is a recombinant nucleic acid. Recombinant nucleic acids may encode an immunogenic agent from a pathogen of interest such as, but not limited to, bacterial genes and fungal genes. In some embodiments, the payload is a recombinant RNA or DNA molecule encoding an immunogenic or antigenic polypeptide.

As used herein, the terms "polynucleotide," "polynucleotide sequence," "nucleic acid" and "nucleic acid sequence" refer to a nucleotide, oligonucleotide, polynucleotide (which terms may be used interchangeably), or any fragment thereof. These phrases also refer to DNA or RNA of natural or synthetic origin (which may be single-stranded or double-stranded and may represent the sense or the antisense strand). The polynucleotides may be cDNA or genomic DNA. Polynucleotides homologous to the polynucleotides described herein are also provided. Those of skill in the art understand the degeneracy of the genetic code and that a variety of polynucleotides can encode the same polypeptide.

In some embodiments, the payload is a polynucleotide construct. As used herein, the term "construct" refers to recombinant polynucleotides including, without limitation, DNA and RNA, which may be single-stranded or double-stranded and may represent the sense or the antisense strand. Recombinant polynucleotides are polynucleotides formed by laboratory methods that include polynucleotide sequences derived from at least two different natural sources or they may be synthetic. Constructs thus may include new modifications to endogenous genes introduced by, for example, genome editing technologies. Constructs may also include recombinant polynucleotides created using, for example, recombinant DNA methodologies.

The payload constructs provided herein may be prepared by methods available to those of skill in the art. Notably each of the constructs described are recombinant molecules and as such do not occur in nature. Generally, the nomenclature used herein and the laboratory procedures utilized in the present invention include molecular, biochemical, and recombinant DNA techniques that are well known and commonly employed in the art. Standard techniques available to those skilled in the art may be used for cloning, DNA and RNA isolation, amplification and purification. Such techniques are thoroughly explained in the literature.

The constructs provided herein may include a promoter operably linked to any one of the polynucleotides described herein. The promoter may be a heterologous promoter or an endogenous promoter associated with the antigenic or immunogenic payload polypeptide.

As used herein, the terms "heterologous promoter," "promoter," "promoter region," or "promoter sequence" refer generally to transcriptional regulatory regions of a gene, which may be found at the 5' or 3' side of the polynucleotides described herein, or within the coding region of the polynucleotides, or within introns in the polynucleotides. Typically, a promoter is a DNA regulatory region capable of binding RNA polymerase in a cell and initiating transcription of a downstream (3' direction) coding sequence. The typical 5' promoter sequence is bounded at its 3' terminus by the transcription initiation site and extends upstream (5' direction) to include the minimum number of bases or elements necessary to initiate transcription at levels detectable above background. Within the promoter sequence is a transcription initiation site (conveniently defined by mapping with nuclease S1), as well as protein binding domains (consensus sequences) responsible for the binding of RNA polymerase.

As used herein, a polynucleotide is "operably connected" or "operably linked" when it is placed into a functional relationship with a second polynucleotide sequence. For instance, a promoter is operably linked to a polynucleotide if the promoter is connected to the polynucleotide such that it may effect transcription of the polynucleotide. In various embodiments, the polynucleotide may be operably linked to at least 1, at least 2, at least 3, at least 4, at least 5, or at least 10 promoters.

Heterologous promoters useful in the practice of the present invention include, but are not limited to, constitutive, inducible, temporally-regulated, developmentally regulated, chemically regulated, tissue-preferred and tissue-specific promoters. The heterologous promoter may be a plant, animal, bacterial, fungal, or synthetic promoter. Suitable promoters include, without limitation, promoters for Rous sarcoma virus (RSV), human immunodeficiency virus (HIV-1), AmpR promoter, SV40, cytomegalovirus (CMV), SV40 virus, chicken beta actin (CAG), and the like as well as the translational elongation factor EF-1α promoter or ubiquitin promoter. Those of skill in the art are familiar with a wide variety of additional promoters for use in various cell types.

Vectors including any of the constructs or polynucleotides described herein are provided. The term "vector" is intended to refer to a polynucleotide capable of transporting another polynucleotide to which it has been linked. In some embodiments, the vector may be a "plasmid," which refers to a circular double-stranded DNA loop into which additional DNA segments may be ligated. Certain vectors are capable of autonomous replication in a host cell into which they are introduced (e.g., bacterial vectors having a bacterial origin of replication and episomal mammalian vectors). Other vectors can be integrated into the genome of a host cell upon introduction into the host cell, and thereby are replicated along with the host genome, such as some viral vectors or transposons. Vectors may carry genetic elements, such as those that confer resistance to certain drugs or chemicals. In some embodiments, the payload is a vector as described herein.

In some embodiments, the payload is polypeptide antigen specific for Infectious Bronchitis Virus (IBV) or a polynucleotide encoding a polypeptide antigen specific for IBV. IBV is a member of the genus gammacoronavirus, family Coronaviridae, order Nidovirales with a 27.6 Kb single stranded positive sense RNA genome encoding major structural proteins, spike glycoprotein (S), envelope (E), membrane (M) and nucleocapsid (N). In some embodiments, the payload is selected form the group consisting of the IBV S, E, M, and N proteins and fragments thereof. In some embodiments, the payload is a polynucleotide encoding the IBV S, E, M, or N proteins or fragments thereof. In some embodiments, the payload a polypeptide at least 80%, at least 85%, at least 90%, at least 95%, at least 98%, or at least 99% to the IBV nucleocapsid protein of SEQ ID NO:5. In some embodiments, the payload is the IBV nucleocapsid protein of SEQ ID NO:5. In some embodiments, the payload is a polynucleotide encoding a polypeptide at least 80%, at least 85%, at least 90%, at least 95%, at least 98%, or at least 99% to the IBV nucleocapsid protein of SEQ ID NO:5. In some embodiments, the payload is a polynucleotide encoding the IBV nucleocapsid protein of SEQ ID NO:5. In some embodiments, the payload comprises the polynucleotide of SEQ ID NO:6 or a sequence at least 90% identical thereto.

In some embodiments, the payload a polypeptide at least 80%, at least 85%, at least 90%, at least 95%, at least 98%, or at least 99% to the IBV truncated spike protein of SEQ ID NO:7. In some embodiments, the payload is the IBV truncated spike protein of SEQ ID NO:7. In some embodiments, the payload is a polynucleotide encoding a polypeptide at least 80%, at least 85%, at least 90%, at least 95%, at least 98%, or at least 99% to the IBV truncated spike protein of SEQ ID NO:7. In some embodiments, the payload is a polynucleotide encoding the IBV nucleocapsid protein of SEQ ID NO:7. In some embodiments, the payload comprises the polynucleotide of SEQ ID NO:8 or a sequence at least 90% identical thereto.

In some embodiments, the payload is a polypeptide antigen specific for Severe Acute Respiratory Syndrome Coronavirus 2 (SARS-CoV-2). SARS-CoV-2 includes the major structural proteins spike (S), envelope (E), membrane (M), and nucleocapsid (N). In some embodiments, the payload is selected from the group consisting of the SARS-CoV-2 S, E, M, and N proteins and fragments thereof. In some embodiments, the payload is a polynucleotide encoding the SARS-CoV-2 S, E, M, or N protein or fragments thereof. In some embodiments, the payload is a polypeptide at least 80%, at least 85%, at least 90%, at least 95%, at least 98%, or at least 99% to the SARS-CoV-2 nucleocapsid protein of SEQ ID NO:9. In some embodiments, the payload is the SARS-CoV-2 nucleocapsid protein of SEQ ID NO:9. In some embodiments, the payload is a polynucleotide encoding a polypeptide at least 80%, at least 85%, at least 90%, at least 95%, at least 98%, or at least 99% to the SARS-CoV-2 nucleocapsid protein of SEQ ID NO:9. In some embodiments, the payload is polynucleotide encoding the SARS-CoV-2 nucleocapsid protein of SEQ ID NO:9. In some embodiments, the payload comprises the polynucleotide of SEQ ID NO:10 or a sequence at least 90% identical thereto.

In some embodiments, the payload is a polypeptide at least 80%, at least 85%, at least 90%, at least 95%, at least 98%, or at least 99% to the SARS-CoV-2 truncated spike protein of SEQ ID NO:11. In some embodiments, the payload is the SARS-CoV-2 truncated spike protein of SEQ ID NO:11. In some embodiments, the payload is a polynucleotide encoding a polypeptide at least 80%, at least 85%, at least 90%, at least 95%, at least 98%, or at least 99% to the SARS-CoV-2 truncated spike protein of SEQ ID NO:11. In some embodiments, the payload is polynucleotide encoding the SARS-CoV-2 truncated spike protein of SEQ ID NO:11. In some embodiments, the payload comprises the polynucleotide of SEQ ID NO:12 or a sequence at least 90% identical thereto.

In some embodiments, the payload is functionalized prior to loading into the QAC complex. Proteins, DNA molecules, and RNA molecules that are negatively charged at neutral pH are generally readily taken up by QAC particles due to the electrostatic interactions between the negatively charged payload and the positively charged QAC particles. To improve the loading capacity of neutral and positively charged payloads, the payload may be functionalized to alter the surface charge of the payload. For example, chemical modifications such as amination of protein molecules can introduce negatively charged amino groups. Chemical modifications such as carboxylation of protein molecules can increase the number of free carboxylic acid groups on the protein surface to enhance loading of the protein into the QAC complex. The isoelectric point of the protein molecule can be reduced by protein surface modification with malonic acid moieties to increase interaction with the chitosan component of the QAC complex.

In some embodiments, the chitosan is functionalized. Chitosan may be functionalized with negatively charged sulfonate groups by reaction of the amino group of chitosan with 5-formyl-2-furan sulfonic acid (FFSA) followed by treatment using sodium borohydride to form a negatively charged chitosan surface. Use of the negatively charged chitosan in the formation of the QAC complex will generally be favorable for loading of positively charged payload molecules.

In some embodiments, the QAC complex is loaded with a DNA molecule payload. The QAC-DNA loaded complex is formed by mixing a solution of Quil-A and DNA into a solution of chitosan to form a final mixed solution including the QAC-DNA complex. In the final mixed solution, the Quil-A and the chitosan are present at a ratio of between 1:15 to 1:100. In some embodiments, the Quil-A and the chitosan are present at a ratio of about 1:20 (e.g., 1:15, 1:16, 1:17, 1:18, 1:19, 1:20, 1:21, 1:22, 1:23, 1:24, or 1:25) in the final mixed solution. In some embodiments, in the final solution Quil-A is at a concentration of 0.001% and chitosan is at a concentration between about 0.02% and about 0.1%. In some embodiments, the DNA payload in the DNA Quil-A solution is at a concentration between about 10 µg/ml and about 1000 µg/ml.

In some embodiments, the Quil-A DNA solution and the chitosan solution are mixed drop-wise. In some embodiments, the Quil-A DNA solution and the chitosan solution are mixed by vortex mixing for about 15-90 seconds (15 seconds, 20 seconds, 25 seconds, 30 seconds, 35 seconds, 40 seconds, 45 seconds, 50 seconds, 60 seconds, 70 seconds, 80 seconds or 90 seconds). In some embodiments, the Quil-A DNA solution and the chitosan solution are mixed drop-wise followed by vortex mixing for about 15-90 seconds (15 seconds, 20 seconds, 25 seconds, 30 seconds, 35 seconds, 40 seconds, 45 seconds, 50 seconds, 60 seconds, 70 seconds, 80 seconds or 90 seconds). The Quil-A DNA solution and the chitosan solution may be heated prior to mixing. In some embodiments, the Quil-A DNA solution and the chitosan solution are heated to a temperature between about 20° C. and about 60° C. (e.g., 20° C., 25° C., 30° C., 35° C., 40° C., 45° C., 50° C., 55° C., or 60° C.) for between about 20 to about 40 minutes (20 minutes, 25 minutes, 30 minutes, 35 minutes, or 40 minutes) prior to mixing. In some embodiments, after mixing the final solution is incubated at room temperature for about 1 hour to promote QAC complex formation. In some embodiments, after mixing the final solution is incubated for 1 hour at between about 20° C. and about 45° C. (e.g., 20° C., 21° C., 22° C., 23° C., 24° C., 25° C., 26° C., 27° C., 28° C., 29° C., 30° C., 31, 32° C., 33° C., 34° C., 35° C., 36° C., 37° C., 38° C., 39° C., 40° C., 41° C., 42° C., 43° C., 44° C., or 45° C.) with shaking at between about 90 rpm and about 150 rpm (e.g., 90 rpm, 95 rpm, 100 rpm, 105 rpm, 110 rpm, 115 rpm, 120 rpm, 125 rpm, 130 rpm, 135 rpm, 140 rpm, 145 rpm, or 150 rpm). The pH of the solutions may be between 5.5 and 7.0.

In some embodiments, a first solution of about 0.002% Quil-A and between about 1 µg/ml and about 5,000 µg/m DNA in 50 mM sodium sulfate buffer and a second solution of about 0.04% chitosan in 5 mM sodium acetate buffer pH5.5 are each heated at 55° C. for about 30 min. Equal volumes of the first and second solution are mixed dropwise then vortex mixed for about 30 s followed by incubation at room temperature for about 1 hour to form the QAC DNA loaded complex.

In some embodiments, the QAC complex is loaded with a protein molecule payload. The QAC-protein loaded complex is formed by mixing a solution of Quil-A and protein into a solution of chitosan to form a final mixed solution including the QAC-protein complex. In the final mixed solution, the Quil-A and the chitosan are present at a ratio of between 1:15 to 1:100. In some embodiments, the Quil-A and the chitosan are present at a ratio of about 1:20 (e.g., 1:15, 1:16, 1:17, 1:18, 1:19, 1:20, 1:21, 1:22, 1:23, 1:24, or 1:25) in the final mixed solution. In some embodiments, in the final solution Quil-A is at a concentration of 0.001% and chitosan is at a concentration between about 0.02% and about 0.1%. In some embodiments, the protein payload in the protein Quil-A solution is at a concentration between about 10 μg/ml and about 1000 μg/ml.

In some embodiments, the Quil-A protein solution and the chitosan solution are mixed drop-wise. In some embodiments, the Quil-A protein solution and the chitosan solution are mixed by vortex mixing for about 15-90 seconds (15 seconds, 20 seconds, 25 seconds, 30 seconds, 35 seconds, 40 seconds, 45 seconds, 50 seconds, 60 seconds, 70 seconds, 80 seconds or 90 seconds). In some embodiments, the Quil-A protein solution and the chitosan solution are mixed drop-wise followed by vortex mixing for about 15-90 seconds (15 seconds, 20 seconds, 25 seconds, 30 seconds, 35 seconds, 40 seconds, 45 seconds, 50 seconds, 60 seconds, 70 seconds, 80 seconds or 90 seconds). The Quil-A protein solution and the chitosan solution may be heated prior to mixing. In some embodiments, the Quil-A protein solution and the chitosan solution are heated to a temperature between about 20° C. and about 60° C. (e.g., 20° C., 25° C., 30° C., 35° C., 40° C., 45° C., 50° C., 55° C., or 60° C.) for between about 20 to about 40 minutes (20 minutes, 25 minutes, 30 minutes, 35 minutes, or 40 minutes) prior to mixing. In some embodiments, after mixing the final solution is incubated at room temperature for about 1 hour to promote QAC complex formation. In some embodiments, after mixing the final solution is incubated for 1 hour at between about 20° C. and about 45° C. (e.g., 20° C., 21° C., 22° C., 23° C., 24° C., 25° C., 26° C., 27° C., 28° C., 29° C., 30° C., 31, 32° C., 33° C., 34° C., 35° C., 36° C., 37° C., 38° C., 39° C., 40° C., 41° C., 42° C., 43° C., 44° C., or 45° C.) with shaking at between about 90 rpm and about 150 rpm (e.g., 90 rpm, 95 rpm, 100 rpm, 105 rpm, 110 rpm, 115 rpm, 120 rpm, 125 rpm, 130 rpm, 135 rpm, 140 rpm, 145 rpm, or 150 rpm). The pH of the solutions may be between 5.5 and 7.0.

In some embodiments, a first solution of about 0.002% Quil-A and between about 1 μg/ml and about 5,000 μg/ml protein in 50 mM sodium sulfate buffer and a second solution of about 0.04% chitosan in 5 mM sodium acetate buffer pH5.5 are each heated at 55° C. for about 30 min. Equal volumes of the first and second solution are mixed dropwise then vortex mixed for about 30 s followed by incubation at about 37° C. for about 1 hour with shaking at about 110 rpm to form the QAC protein loaded complex.

A vaccine comprising a QAC complex adjuvant as described herein may also comprise other suitable agents or ingredients. Suitable agents may include a suitable carrier or vehicle for delivery. As used herein, the term "carrier" refers to a pharmaceutically acceptable solid or liquid filler, diluent or encapsulating material. A water-containing liquid carrier can contain pharmaceutically acceptable additives such as acidifying agents, alkalizing agents, antimicrobial preservatives, antioxidants, buffering agents, chelating agents, complexing agents, solubilizing agents, humectants, solvents, suspending and/or viscosity-increasing agents, tonicity agents, wetting agents or other biocompatible materials. A tabulation of ingredients listed by the above categories, may be found in the *U.S. Pharmacopeia National Formulary*, 1857-1859, (1990).

Some examples of the materials which can serve as pharmaceutically acceptable carriers are sugars, such as lactose, glucose and sucrose; starches such as corn starch and potato starch; cellulose and its derivatives such as sodium carboxymethyl cellulose, ethyl cellulose and cellulose acetate; powdered tragacanth; malt; gelatin; talc; excipients such as cocoa butter and suppository waxes; oils such as peanut oil, cottonseed oil, safflower oil, sesame oil, olive oil, corn oil and soybean oil; glycols, such as propylene glycol; polyols such as glycerin, sorbitol, mannitol and polyethylene glycol; esters such as ethyl oleate and ethyl laurate; agar; buffering agents such as magnesium hydroxide and aluminum hydroxide; alginic acid; pyrogen free water; isotonic saline; Ringer's solution, ethyl alcohol and phosphate buffer solutions, as well as other nontoxic compatible substances used in pharmaceutical formulations. Wetting agents, emulsifiers and lubricants such as sodium lauryl sulfate and magnesium stearate, as well as coloring agents, release agents, coating agents, sweetening, flavoring and perfuming agents, preservatives and antioxidants can also be present in the compositions, according to the desires of the formulator.

Examples of pharmaceutically acceptable antioxidants include water soluble antioxidants such as ascorbic acid, cysteine hydrochloride, sodium bisulfite, sodium metabisulfite, sodium sulfite and the like; oil-soluble antioxidants such as ascorbyl palmitate, butylated hydroxyanisole (BHA), butylated hydroxytoluene (BHT), lecithin, propyl gallate, alpha-tocopherol and the like; and metal-chelating agents such as citric acid, ethylenediamine tetraacetic acid (EDTA), sorbitol, tartaric acid, phosphoric acid and the like.

In another embodiment, the present formulation may also comprise other suitable agents such as a stabilizing delivery vehicle, carrier, support or complex-forming species. The coordinate administration methods and combinatorial formulations of the instant invention may optionally incorporate effective carriers, processing agents, or delivery vehicles, to provide improved formulations for delivery of the QAC complex and other biologically active agents and antigens of the composition.

The vaccine formulation may additionally include a biologically acceptable buffer to maintain a pH close to neutral (7.0-7.3). Such buffers preferably used are typically phosphates, carboxylates, and bicarbonates. More preferred buffering agents are sodium phosphate, potassium phosphate, sodium citrate, calcium lactate, sodium succinate, sodium glutamate, sodium bicarbonate, and potassium bicarbonate. The buffer may comprise about 0.0001-5% (w/v) of the vaccine formulation, more preferably about 0.001-1% (w/v). Other excipients, if desired, may be included as part of the final vaccine formulation.

The remainder of the vaccine formulation may be an acceptable diluent, to 100%, including water. The vaccine formulation may also be formulated as part of a water-in-oil, or oil-in-water emulsion.

The vaccine formulation may be separated into vials or other suitable containers. The vaccine formulation herein described may then be packaged in individual or multi-dose ampoules, or be subsequently lyophilized (freeze-dried) before packaging in individual or multi-dose ampoules. The vaccine formulation herein contemplated also includes the lyophilized version. The lyophilized vaccine formulation may be stored for extended periods of time without loss of viability at ambient temperatures. The lyophilized vaccine may be reconstituted by the end user, and administered to a patient.

The term "lyophilization" or "lyophilized," as used herein, refers to freezing of a material at low temperature followed by dehydration by sublimation, usually under a high vacuum. Lyophilization is also known as freeze drying. Many techniques of freezing are known in the art of lyophilization such as tray-freezing, shelf-freezing, spray-freezing, shell-freezing and liquid nitrogen immersion. Each technique will result in a different rate of freezing. Shell-freezing may be automated or manual. For example, flasks can be automatically rotated by motor driven rollers in a refrigerated bath containing alcohol, acetone, liquid nitrogen, or any other appropriate fluid. A thin coating of product is evenly frozen around the inside "shell" of a flask, permitting a greater volume of material to be safely processed during each freeze drying run. Tray-freezing may be performed by, for example, placing the samples in lyophilizer, equilibrating 1 hr at a shelf temperature of 0° C., then cooling the shelves at 0.5° C./min to −40° C. Spray-freezing, for example, may be performed by spray-freezing into liquid, dropping by ~20 µl droplets into liquid N2, spray-freezing into vapor over liquid, or by other techniques known in the art.

The vaccine of the present invention may be either in a solid form or in a liquid form. Preferably, the vaccine of the present invention may be in a liquid form. The liquid form of the vaccine may have a concentration of about 0.5-20 µg/ml Quil-A and about 100-250 µg/ml chitosan. In some embodiments, the liquid form of the vaccine includes 10 µg/ml Quil-A and 200 µg/ml chitosan. The liquid form of the vaccine may have a concentration of about 10-1000 µg/ml DNA payload or 5-500 µg/ml RNA payload.

To vaccinate a patient, a therapeutically effective amount of vaccine comprising the QAC complex adjuvant or a QAC complex loaded with a payload antigen or immunogen may be administered to a patient. The therapeutically effective amount of vaccine may typically be one or more doses, preferably in the range of about 0.01-10 mL, most preferably 0.1-1 mL, containing 1-200 micrograms, most preferably 1-100 micrograms of vaccine formulation/dose. The therapeutically effective amount may also depend on the vaccination species. For example, for smaller animals such as mice, a preferred dosage may be about 0.01-1 mL of a 1-50 microgram solution of antigen. For a human patient, a preferred dosage may be about 0.1-1 mL of a 1-50 microgram solution of antigen. The therapeutically effective amount may also depend on other conditions including characteristics of the patient (age, body weight, gender, health condition, etc.), characteristics of the antigen or pathogen of interest, and others. In one embodiment the vaccine formulation of the present invention comprises the QAC complex adjuvant or a QAC complex loaded with a payload antigen or immunogen with Quil-A at a concentration of 10 µg/ml and chitosan at a concentration of 200 µg/ml.

A vaccine of the present invention may be administered by using any suitable means as disclosed above. Preferably, a vaccine of the present invention may be administered by intranasal delivery, transmucosal administration, subcutaneous or intramuscular administration, e.g., needle injection. In some embodiments, vaccine compositions for protection against a viral infection are formulated for transmucosal delivery. In some embodiments, vaccine compositions for protection against a bacterial infection are formulated for subcutaneous administration.

After vaccination using a vaccine of the present invention comprising the QAC complex adjuvant, a patient may be immunized against at least one type of fungi, bacteria, or virus. In one specific embodiment, a patient after vaccination may be immunized against at least one species of bacteria. In one preferred embodiment, a patient after vaccination may be immunized from *Mycobacterium avium* subspecies paratuberculosis, *Mycobacterium bovis*, *Mycobacterium tuberculosis*, and *Mycobacterium avium* sub species *avium*.

The instant invention may also include kits, packages and multicontainer units containing the above described pharmaceutical compositions, active ingredients, and/or means for administering the same for use in the prevention and treatment of diseases and other conditions in mammalian subjects. Briefly, these kits include a container or formulation that contains the QAC complex adjuvant or a QAC complex loaded with a payload antigen or immunogen with mucosal or subcutaneous delivery enhancing agents disclosed herein formulated in a pharmaceutical preparation for delivery. In some embodiments, the kit includes a Quil-A solution as described herein and a chitosan solution as described herein for the preparation of QAC complex using a user supplied payload molecule.

As used herein, the term "pharmaceutically acceptable carrier" refers to any and all solvents, dispersion media, coatings, antibacterial and antifungal agents, isotonic and absorption delaying agents, and the like that are physiologically compatible. Preferably, the carrier is suitable for intravenous, intramuscular, subcutaneous, parenteral, spinal or epidermal administration (e.g., by injection or infusion).

A "pharmaceutically acceptable salt" refers to a salt that retains the desired biological activity of the parent compound and does not impart any undesired toxicological effects (see e.g., Berge, S. M., et al. (1977) *J. Pharm. Sci.* 66:1-19). Examples of such salts include acid addition salts and base addition salts. Acid addition salts include those derived from nontoxic inorganic acids, such as hydrochloric, nitric, phosphoric, sulfuric, hydrobromic, hydroiodic, phosphorous and the like, as well as from nontoxic organic acids such as aliphatic mono- and dicarboxylic acids, phenyl-substituted alkanoic acids, hydroxy alkanoic acids, aromatic acids, aliphatic and aromatic sulfonic acids and the like. Base addition salts include those derived from alkaline earth metals, such as sodium, potassium, magnesium, calcium and the like, as well as from nontoxic organic amines, such as N,N'-dibenzylethylenediamine, N-methylglucamine, chloroprocaine, choline, diethanolamine, ethylenediamine, procaine and the like.

In one embodiment, the composition may also comprise suitable stabilizing delivery vehicle, carrier, support or complex-forming species, such as those as discussed above. For example, the composition may additionally comprise at least one of a stabilizer, a buffer, or an adjuvant.

The present invention has been described in terms of one or more preferred embodiments, and it should be appreciated that many equivalents, alternatives, variations, and modifications, aside from those expressly stated, are possible and within the scope of the invention.

Example 1

The embodiment described here demonstrates the preparation of loaded Quil-A chitosan complexes.

Infectious Bronchitis (IB) is an acute respiratory illness of domestic fowl caused by Infectious Bronchitis Virus (IBV) (1). IBV is a member of the genus gammacoronavirus, family Coronaviridae, order Nidovirales with a 27.6 Kb single stranded positive sense RNA genome encoding major structural proteins, spike glycoprotein (S), envelope (E), membrane (M) and nucleocapsid (N) (2). D3 associated clinical signs include tracheal rales, frequent sneezing with nasal exudate, lethargy, labored breathing, etc. Uncomplicated IB infections are not lethal and virus with associated symptoms are cleared within 10 days (3). Apart from replicating and causing pathology in the upper respiratory tract, IBV can also affect the oviducts and kidneys depending on the strain of the virus. IBV control is of great economic importance to the poultry industry, infected broilers are subjected to increased condemnation at the slaughterhouses and layers are plagued with a drop in egg quality and production (4-6). High antigenic variation in the spike glycoprotein (S) is a hallmark of different IBV serotypes (6-8). Multiple serotypes co-circulate in birds, which complicates diagnosis and control of IBV. Current commercial modified live virus (MLV) vaccines confer homologous protection but fail to cross-protect against multiple and newly emerging serotypes. Sequence difference even as little as 4% in the S1 subunit of S protein can lead to vaccine failure (9, 10). Unfortunately, MLVs have been shown to persist and transmit in vaccinated birds potentially mediating recombination with virulent circulating serotypes leading to the emergence of new serotypes (11-13). With the emergence of new serotypes like GA98 linked to the excessive use of MLV (14), there is an urgent need to develop a safe and effective vaccine against IBV, the focus of the current study.

The use of plasmid DNA as potential immunogens was described almost 30 years ago (15), however, only 5 DNA-based vaccines have been licensed for veterinary use (16). Nucleic acid based vaccines have significant advantages over MLV as they have a superior safety profile, invoke robust cell mediated immunity (CMI) with potent adjuvants, cost less to produce and are thermostable obviating the need for cold chain (17). DNA-based vaccines encoding IBV S1, M and N genes administered in ovo and intramuscularly have been studied with variable protection levels against IBV (18-26). The use of plasmid DNA vaccines in the field despite having practical advantages and being safe has been limited owing to poor immunogenicity and cellular availability. Nanocarriers increase bioavailability of antigen cargo generating an immediate uptake by immune cells and hence, are potent adjuvants(27). Nanocarriers can protect plasmid DNA and antigen cargo from degradation in vivo facilitating delivery in vaccine hostile mucosal surfaces (28, 29). To provide a safer alternative to current MLVs, we detail the development of nano carriers composed of natural adjuvants, Quil-A and chitosan (QAC) for the delivery of IBV plasmid DNA immunogen. Natural adjuvants (such as Quil-A and chitosan) are inexpensive to produce, making them ideal candidates for animal vaccines. Chitosan is a nontoxic, biodegradable, biocompatible natural polysaccharide. Chitosan is cationic in nature and can readily complex with negatively charged nucleic acids and proteins through electrostatic interactions (30). Chitosan is immunomodulatory, forms stable DNA/protein complexes and has mucoadhesive properties because of which they are widely applied for mucosal routes of administration(31). Quil-A is a potent adjuvant with mild surfactant properties (32) produced from the plant *Quillaja saponaria*, which can form nanoparticle compounds like ISCOMs and those formed with chitosan (QAC) as we detail below.

The sequence similarity of IBV Nucleocapsid (N) protein between diverse serotypes is greater than 90%, for this reason IBV N protein is an ideal immunogen candidate in an effort to develop a cross-protective vaccine. Immunization with N protein elicited a robust cytotoxic T-lymphocyte (CTL) response, an important correlate of protection against IBV (20, 33, 34). Adoptively transferred IBV reactive CD8+ T-cells protect against IBV challenge in naïve chickens (35, 36). In the present study, we evaluated the ability of a stable plasmid DNA construct expressing the IBV N protein complexed with the QAC adjuvant system given intra nasally to protect immunized birds against challenge with virulent strain of IBV. Our results indicate that pQAC-N vaccine elicits a CD8+ T-cell response which protect vaccinated birds against IBV challenge. Levels of protection in pQAC-N vaccinated birds were higher when compared to unadjuvanted or chitosan complexed plasmid DNA vaccine. Our data demonstrate that intra nasal immunization with pQAC-N induced a strong cell mediated immune response that protect vaccinated birds with a significant reduction in clinical signs and viral load to levels seen with commercial MLV vaccinated birds.

Results

Figure 18A:
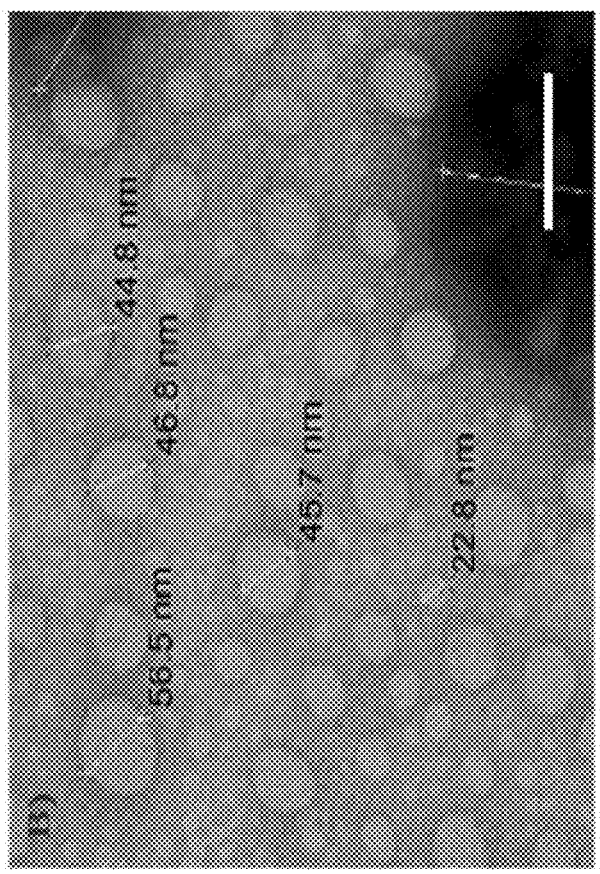
Figure 18B:
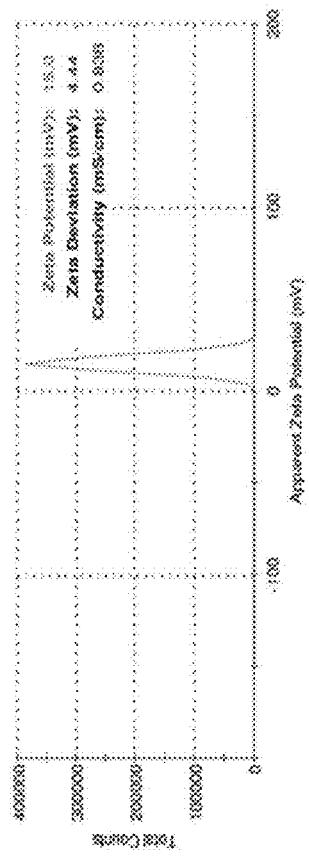
Figure 18C:
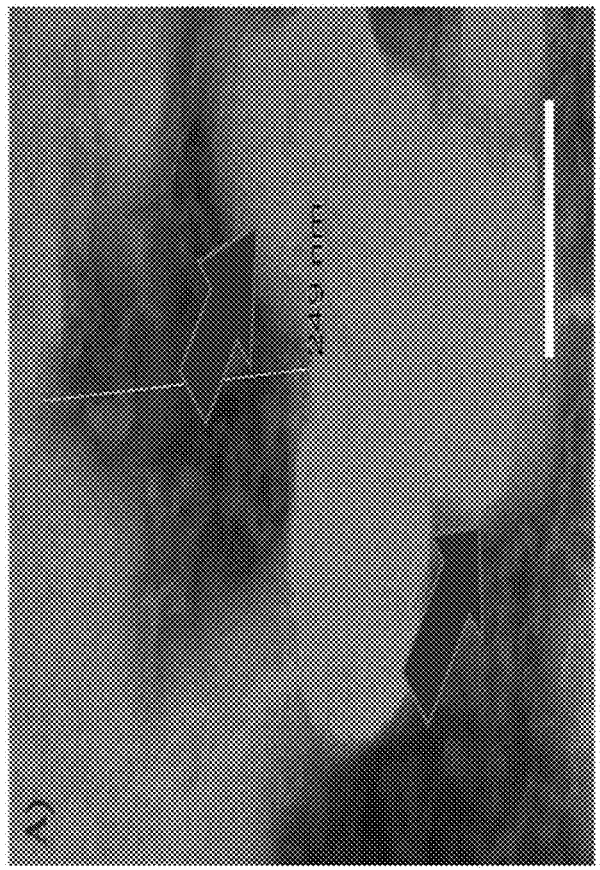
Figure 18D:
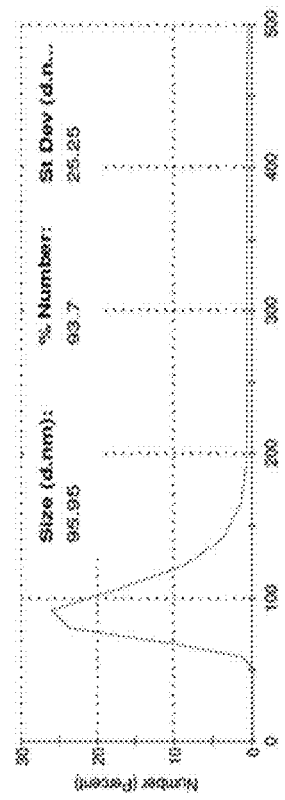

Synthesis and characterization of pQAC-N nanovaccine. The green fluorescent protein (GFP) gene was inserted into the pCAG plasmid and was used as a DNA pay load for nanoparticle (NP) characterization. Transmission electron microscopy (TEM) analysis of chitosan-plasmid DNA complexes indicated presence of aggregated structures (FIG. 18A). However, when Quil-A was added to chitosan-DNA complex, defined particles were formed with the disaggregation of chitosan-DNA complexes (FIG. 18B). Size estimations using TEM analysis indicated that QAC-DNA nanoparticles were <100 nm (FIG. 18B). Dynamic light scattering (DLS) was also used to measure the hydrodynamic size and zeta potential of QAC-pDNA particles. As expected, particles were 95±25 nm in size (94%) with a net positive zeta potential of 15±4.44 mV (FIGS. 18C-18D).

The ability of QAC adjuvant system to deliver plasmid DNA payload was evaluated in vitro to examine its potential for immunization programs. The QAC nanoparticles encapsulating total 5 ug pCAG-GFP construct were added to a suspension of Expi293F cells. After 72 hrs post addition, presence of fluorescent cells was observed using fluorescence microscopy (FIG. 19A), indicating the delivery and expression of the GFP from the construct. The release kinetics of the GFP protein from the pCAG-GFP construct was evaluated in phosphate buffered saline (PBS) at pH 7.4 by quantifying the amount of starting and released plasmid DNA in buffer using spectrophotometry. The analysis showed that almost 42% of plasmid DNA within the nanoparticles was released within 15 days, the end point for our analysis. Overall, a biphasic release kinetics was observed with sustained release of DNA cargo for the first 10 days followed by a plateau over the next 5 days (FIG. 19B). The encapsulation efficiency of DNA (percentage of encapsulated DNA relative to the starting DNA) in QAC nanoparticles ranged from 70-90%.

Figure 20A:
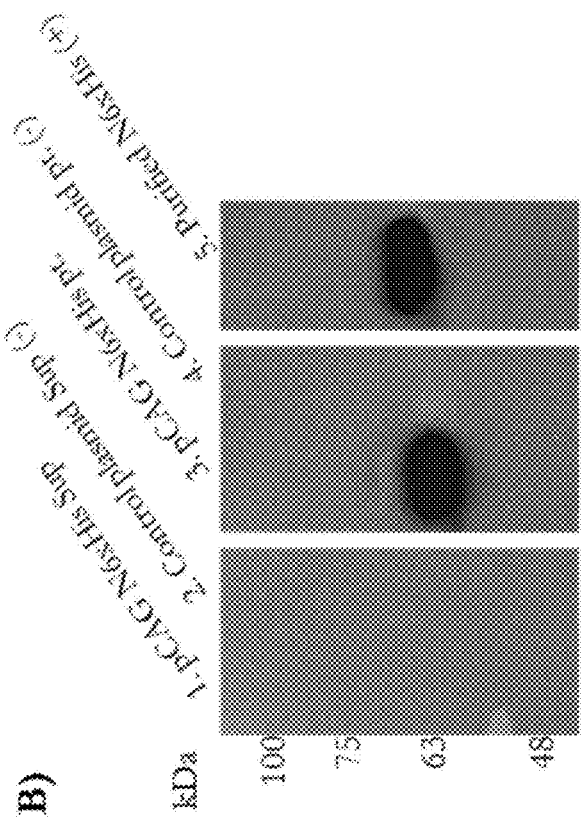
Figure 20B:
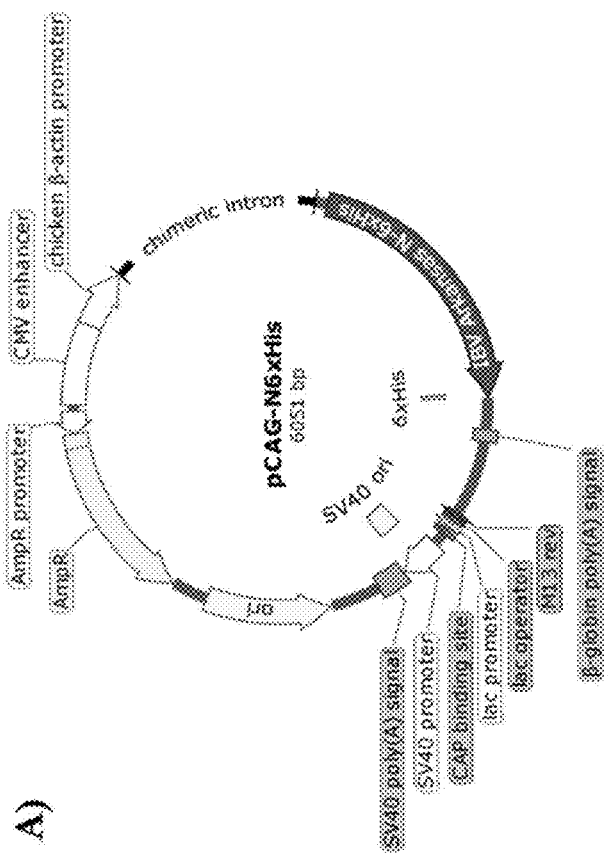

Finally, following successful encapsulation and sustained release of plasmid DNA with QAC, we used the same nanocarrier (QAC) to encapsulate plasmid DNA encoding N protein from IBV-Arkansas strain with a C-terminal 6×His tag, henceforth referred to as pQAC-N. The expression of antigen was confirmed using western blot analysis with an anti-6×His antibody (FIGS. 20A-20B).

QAC-based nanovaccine is well tolerated by chickens—In ovo and spray vaccinations (intranasal) are two strategies used in the field for mass vaccinations of poultry flocks. The safety of pQAC-N in chicken hosts was evaluated through two routes of administration, In ovo and intranasal, a proxy for field spray vaccinations. Embryo development and hatch rate of pQAC-N (100 ug) inoculated specific pathogen free (SPF) embryonated chicken eggs (ECE) was similar to ECEs inoculated with PBS (100%, FIG. 21A). In addition, 1-day-old SPF chicks were immunized with pQAC-N construct intra nasally and monitored for general or respiratory distress, depression or in appetence and weight gain over the course of 30 days post vaccination. No signs for respiratory distress were observed in chicks immunized at 1 day of age and weight gain over 30 days was not statistically different from chicks inoculated with PBS (FIG. 21B). Overall, our analysis in chickens and chicken embryos indicated that pQAC-N is well-tolerated.

Figures 22A, 22B:
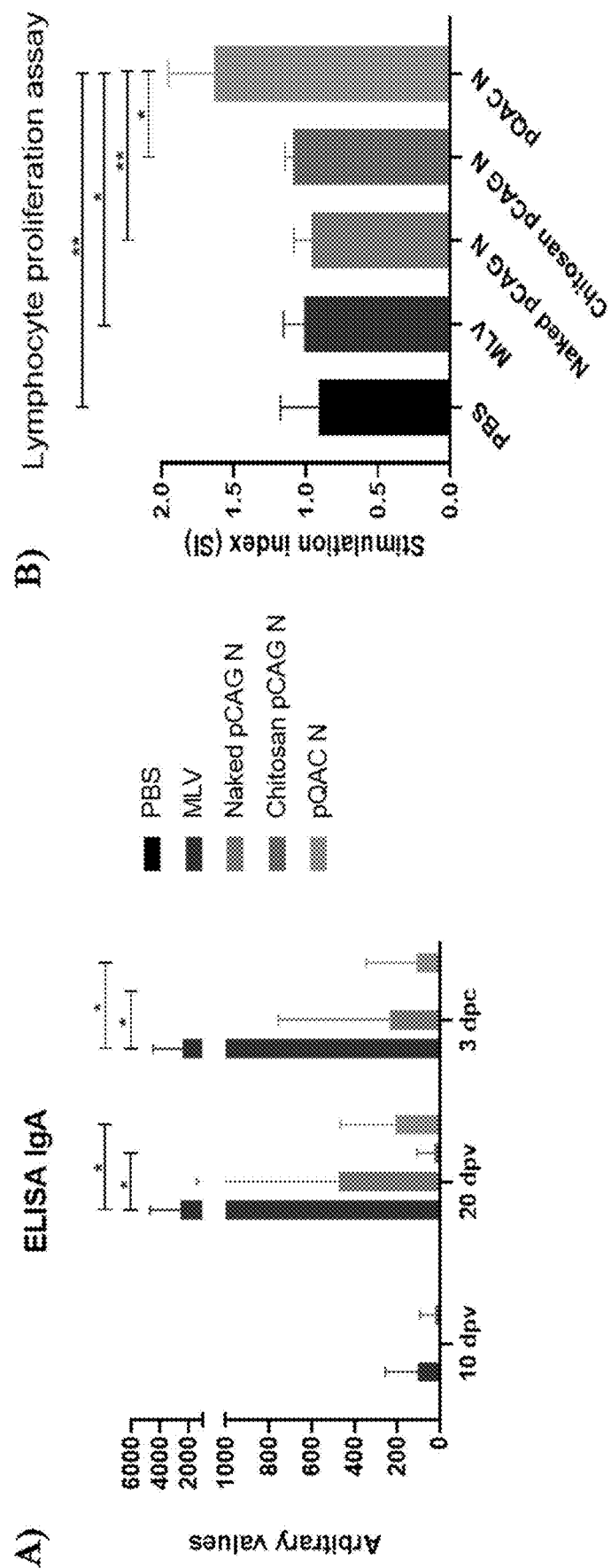

Immunization with pQAC-N induces a robust immune response—Harderian glands play a critical role in the control of IBV infection in the upper respiratory tract by secreting IBV specific IgA antibodies into the lachrymal fluid (tears) (34). Accordingly, we examined the ability of pQAC-N vaccine to elicit IBV specific immune responses in birds following intranasal delivery. Lachrymal fluid samples collected at different time points, 10, 20 days post vaccination (DPV, pre-challenge) and 3 days post challenge (DPC) were examined using ELISA plates coated with IBV Arkansas 51 and N proteins. IBV specific IgA titers were detectable in pQAC-N immunized birds at 20 DPV at levels higher than seen in chitosan pCAG-N immunized birds (FIG. 22A). Albeit detectable, IgA levels were not significantly higher than levels seen in other groups, naked (unadjuvanted) and chitosan complexed pCAG-N. IgA levels were 10 folds higher in birds immunized with commercial MLV when compared to other experimental vaccine groups (FIG. 22A), most likely because of the IgA against 51 which was not included in the pQAC-N but present in MLV.

To assess the effect of IBV specific cellular immune responses induced by pQAC-N, we measured the ability of PBMCs from immunized chickens to respond to IBV antigen stimulation. PBMCs were harvested from vaccinated birds at 20 DPV (pre-challenge time point) and processed for antigen specific cell proliferation assay (MTT assay). The stimulation of PBMCs from chickens vaccinated with pQAC-N resulted in significantly higher proliferation ($p<0.05$) than that of PBMCs from other groups including MLV (FIG. 22B), suggesting a better cellular immunity following pQAC-N immunization.

Figures 23A, 23B:
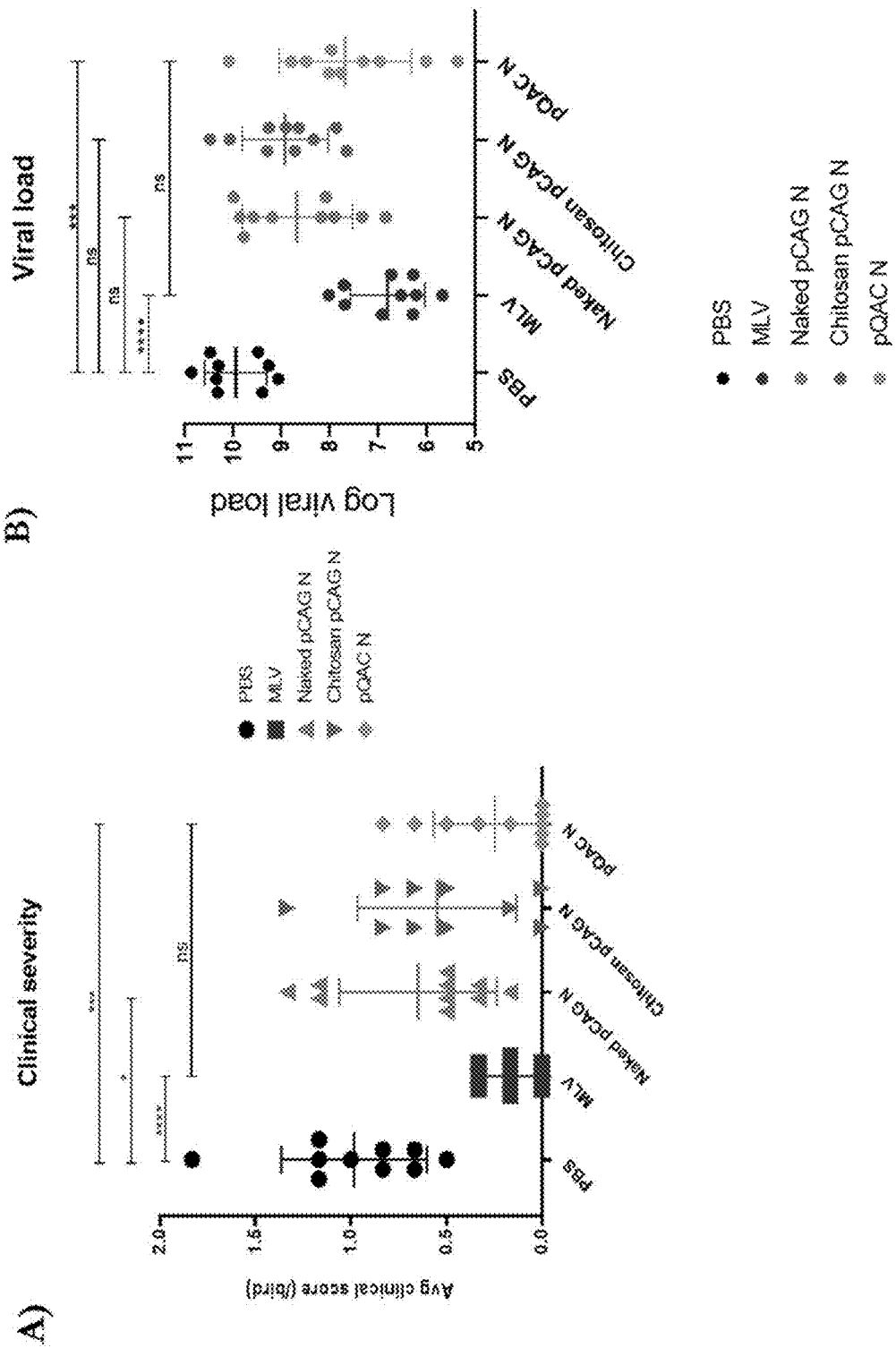
FIGS. 23A-23B show protective efficacy of pQAC-N vaccine. Groups of white leghorn SPF chicks were either unvaccinated (PBS) or immunized with MLV (day-1) or naked pCAG-N or Chitosan pCAG-N or pQAC-N vaccine (100 ug) at day-1 and day-14. (A) Clinical sign severity represented as average score/bird over 8 days post challenge in each group (B) IBV log viral load/10 ul lachrymal fluid at 6 days post challenge. Significance (*, P<0.05; , P<0.01; *, P<0.001; ****, P<0.0001) or non-significance (ns) was determined by one-way ANOVA with multiple comparisons. Data show means±SD.

Reduced clinical severity and viral burden in immunized birds—To investigate the protective efficacy of pQAC-N vaccine, all immunized birds were challenged with virulent IBV Arkansas-DPI serotype at 3 weeks post first vaccination (21 DPV) and the clinical severity of bird groups was scored up to 8 DPC (FIG. 23A). Vaccination with naked pCAG-N (unadjuvanted) and chitosan complexed pCAG-N conferred partial protection against clinical signs associated with IBV. On the other hand, pQAC-N and commercial MLV immunized bird groups were relatively asymptomatic with a significant reduction in clinical severity when compared to unvaccinated birds (FIG. 23A).

In addition, we used RT-qPCR to assess the level of viral RNA in lachrymal fluid of all birds at 6 DPC. A significant reduction in viral load (~2.5 logs) was found in the pQAC-N immunized birds when compared to control birds at levels comparable to commercial MLV vaccinated birds (FIG. 23B). A partial reduction in viral load was also observed in naked pCAG-N and chitosan pCAG-N administered birds (FIG. 23B). Overall, reduction in viral load was higher in the pQAC-N than other DNA-based vaccine constructs suggesting an important role played by Quil-A in the induced immunity in chickens.

Figure 24A:
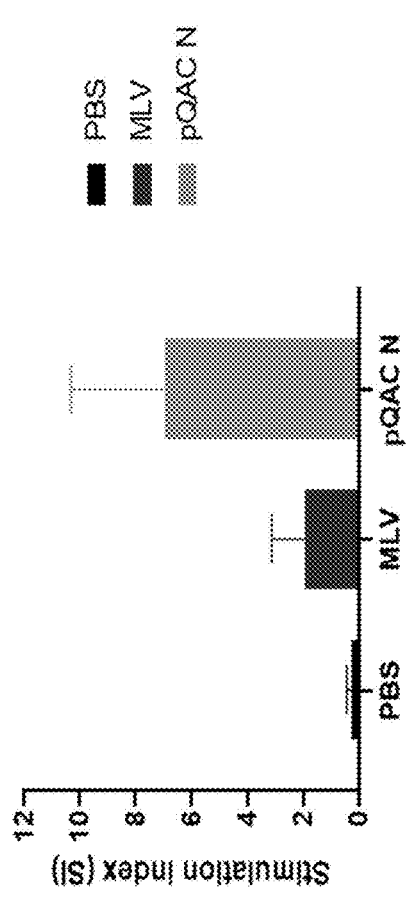
FIGS. 24A-24D show pQAC-N induces a robust T-cell response. (A) Lung cell proliferative capacity measured by CellTrace Violet dye dilution in unvaccinated, MLV and pQAC N vaccinated chickens. Proliferation was measured in (A) total lung cells, (B) CD8α+, (C) CD4+ and (D) TCRγδ+ lung T cells after 4 days in culture post antigen stimulation.
Figure 24B:
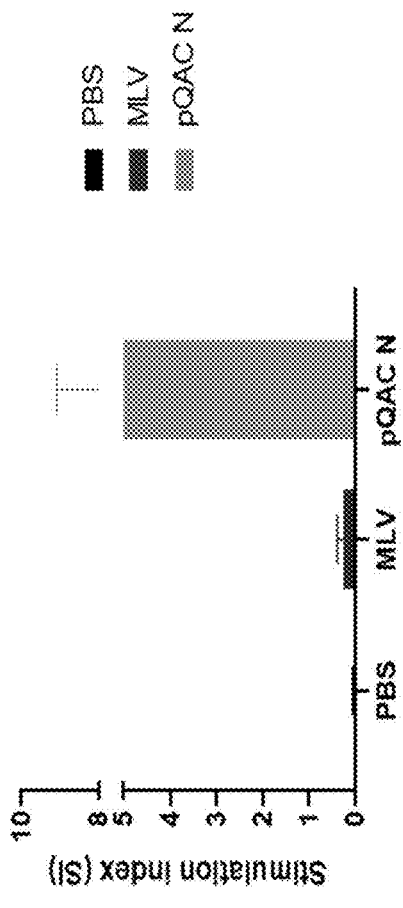
Figure 24C:
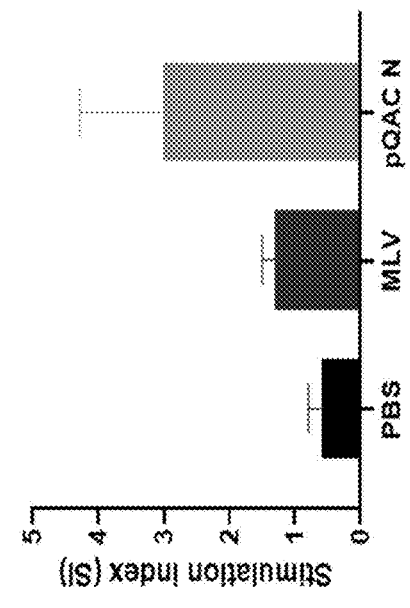
Figure 24D:
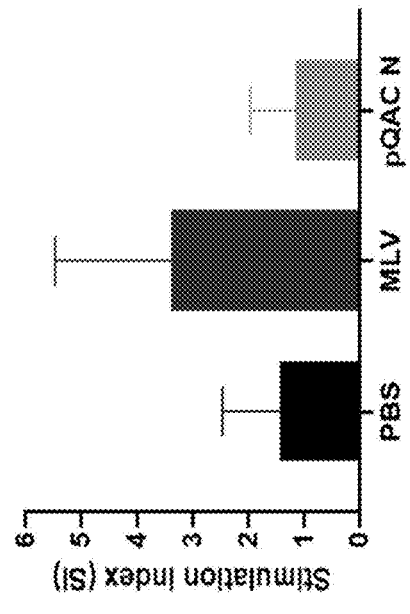

Localized IBV-specific cellular responses in immunized birds—Induction of robust T-cell responses has been identified as relevant correlates of protection against IBV infection in previous studies (34). An antigen specific T cell proliferation assay based on CellTrace™ Violet Cell dye staining of lung cells to trace proliferating T cells was developed. Different T-cell subsets responding to antigen stimulation was identified using flow cytometry assisted T-cell assay. Twenty days after first vaccination, the IBV Ark N protein specific proliferation was measured. The stimulation index (SI), which is the fold increase in stimulated to unstimulated cells calculated. Lung cells from pQAC-N vaccinated birds responded well to antigen stimulation which was higher when compared to negative and MLV control groups (FIG. 24A). An increase in the stimulation of proliferating CD8+ and TCRγδ+ T cells was observed in pQAC-N vaccinated birds in comparison to control birds (FIGS. 24B & 24D), suggesting a potential role for $CD8^+$ and $TCR\gamma\delta^+$ cell in pQAC-N immunity. On the other hand, the CD4+ T-cell proliferation was higher in MLV vaccinated birds (FIG. 24C).

Figures 25A, 25B, 25C:
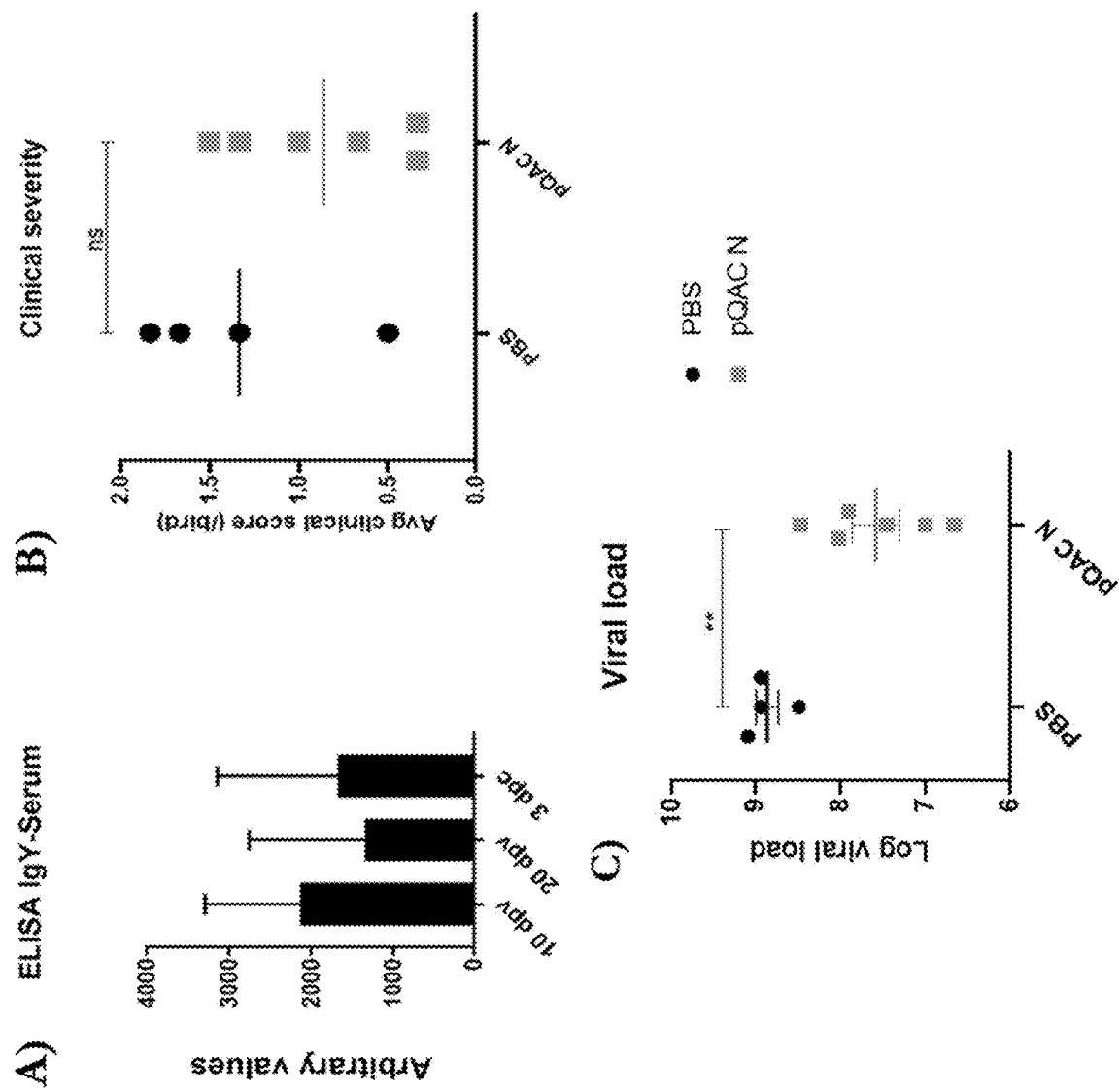
FIGS. 25A-25C show protective efficacy of pQAC-N vaccine in commercial birds. Groups of commercial white leghorn chicks were either unvaccinated (PBS) or immunized with pQAC N vaccine (100 ug) at day-1 and day-14. (A) Serum IgY ELISA titres indicating presence of high levels of MDA (B) Clinical sign severity represented as average score/bird over 8 days post challenge in each group (C) IBV log viral load/10 ul lachrymal fluid at 6 days post challenge. Significance (*, P<0.05; **, P<0.01) or non-significance (ns) was determined by unpaired t test. Data show means±SD.

Protective efficacy of pQAC-N in the presence of maternally derived antibodies—Maternally derived antibodies (MDA), mainly IgY are transferred from vaccinated hens to progeny via the yolk. Presence of IBV specific MDA has shown to protect against IBV challenge in SPF chickens (37-39). Although effective against IBV infections, MDA can interfere with MLV vaccination and dampen development of active immunity (39). In this pilot study, we investigated the ability of pQAC-N to mediate protection in the presence of interfering MDA. Commercial white leghorn chicks with high levels of circulating IBV specific IgY which persisted till about day-24 of age was used (FIG. 25A). As seen with the SPF chick, pQAC-N immunized commercial birds were also protected against IBV Arkansas DPI challenge with a significant reduction in viral load (FIG. 25C) and clinical severity scores (FIG. 25B) compared to unvaccinated birds, suggesting the ability of the pQAC-N to protect birds without interference by MDA.

Figures 26A, 26B:
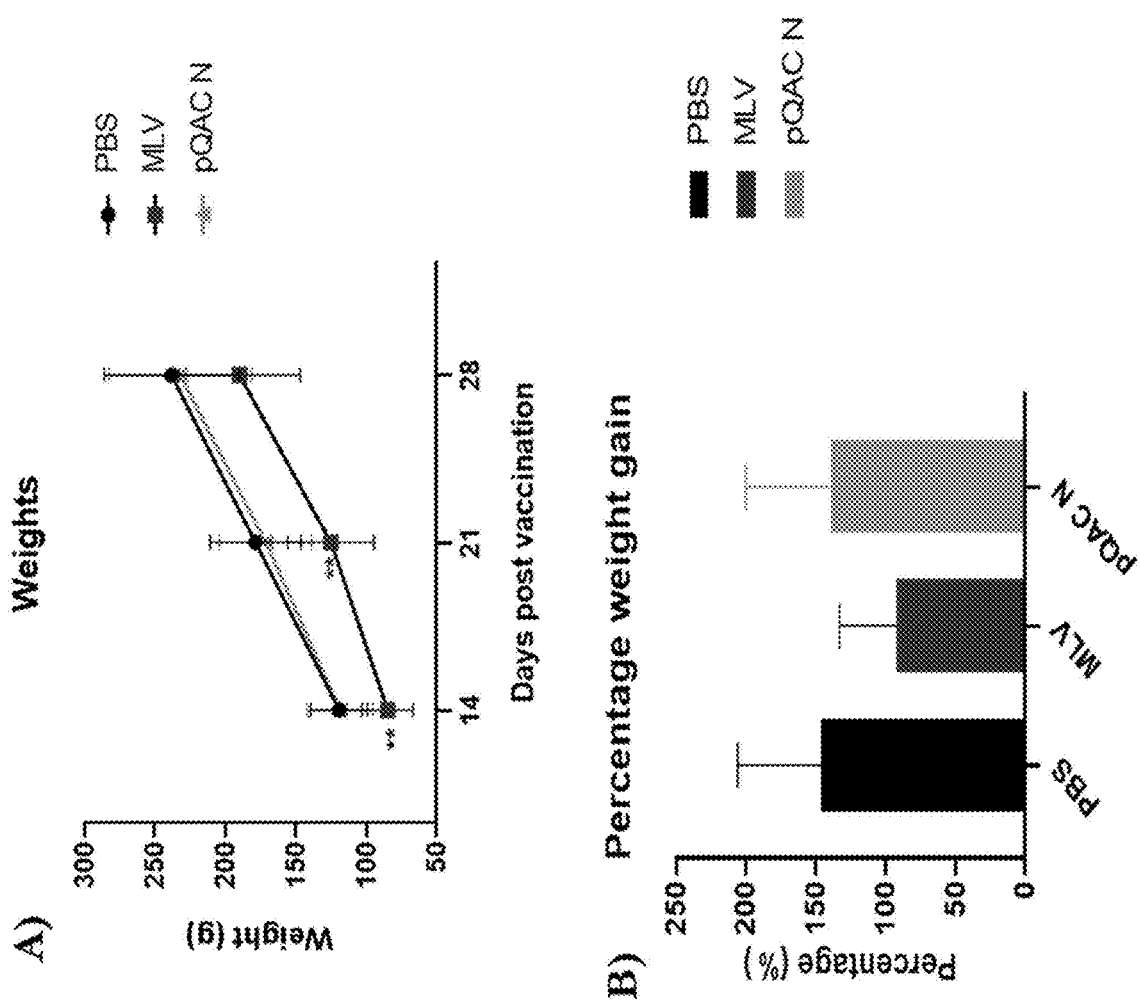
FIGS. 26A-26B show reduced weight gain in MLV vaccinated commercial birds. Groups of commercial white leghorn chicks were either unvaccinated (PBS) or immunized with MLV (day-1) or pQAC N vaccine (100 ug) at day-1 and day-14. (A) Absolute weight of birds in grams at 14, 21 and 28 dpv, significance (**, P<0.01) was determined by two-way ANOVA and compared with both PBS and pQAC N groups (B) Percentage weight gain of birds between 14 and 28 dpv. Data show means±SD.
Figures 27A, 27B, 27C, 27D:
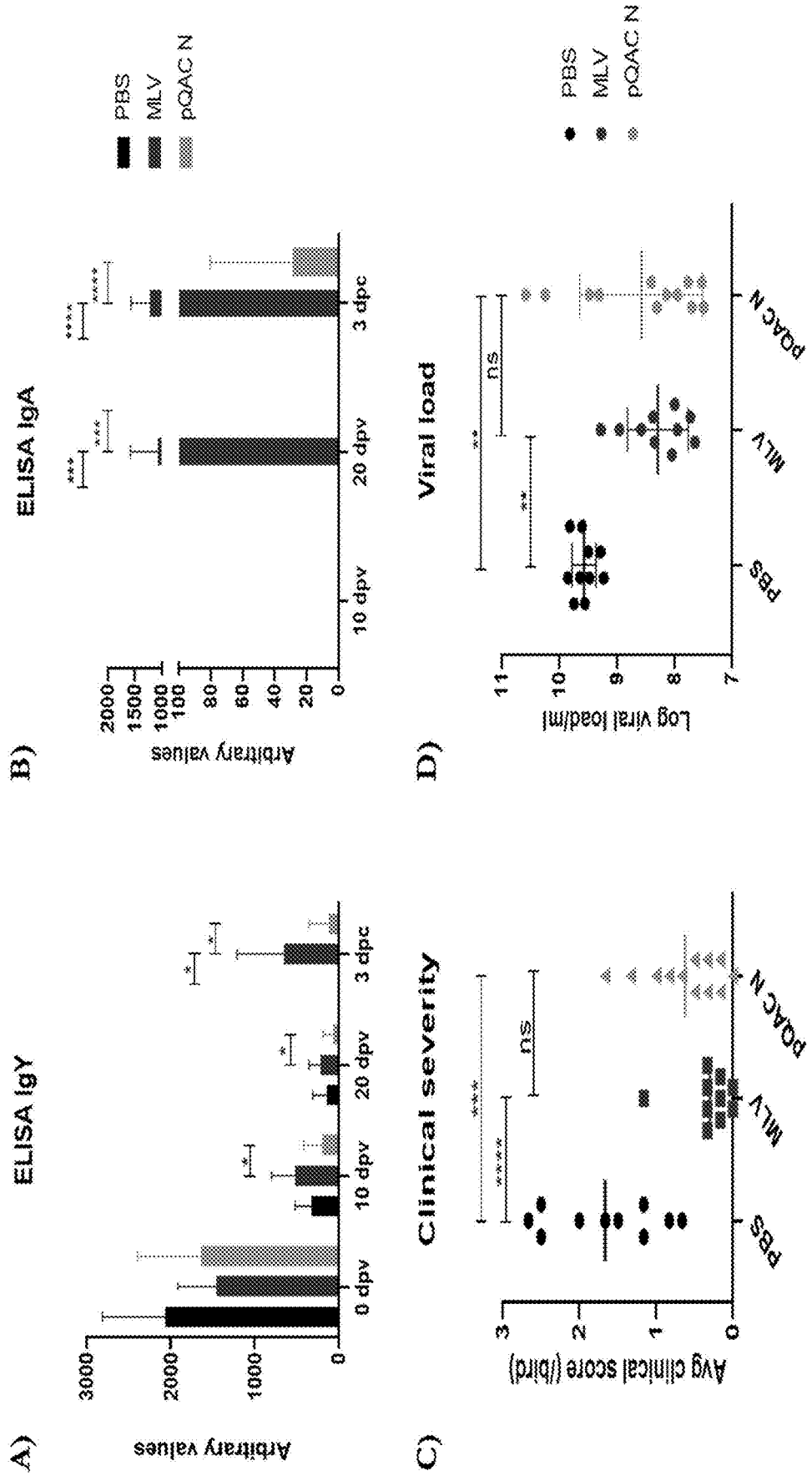
FIGS. 27A-27D show Reduced tracheal viral shedding in pQAC-N vaccinated commercial birds. Groups of commercial white leghorn chicks were either unvaccinated (PBS) or immunized with MLV (day-1) or pQAC N vaccine (100 ug) at day-1 and day-14. IBV specific IgY in serum (A) and IgA in lachrymal fluid (B) significance (*, P<0.05; , P<0.01; *, P<0.001; **, P<0.0001) was determined by two-way ANOVA (C) Clinical sign severity represented as average score/bird over 8 days post challenge in each group (D) IBV viral load in tracheal swabs at 6 days post challenge. Significance (*, P<0.001; ****, P<0.0001) or non-significance (ns) was determined by one-way ANOVA with multiple comparisons. Data show means±SD.
Figure 28:
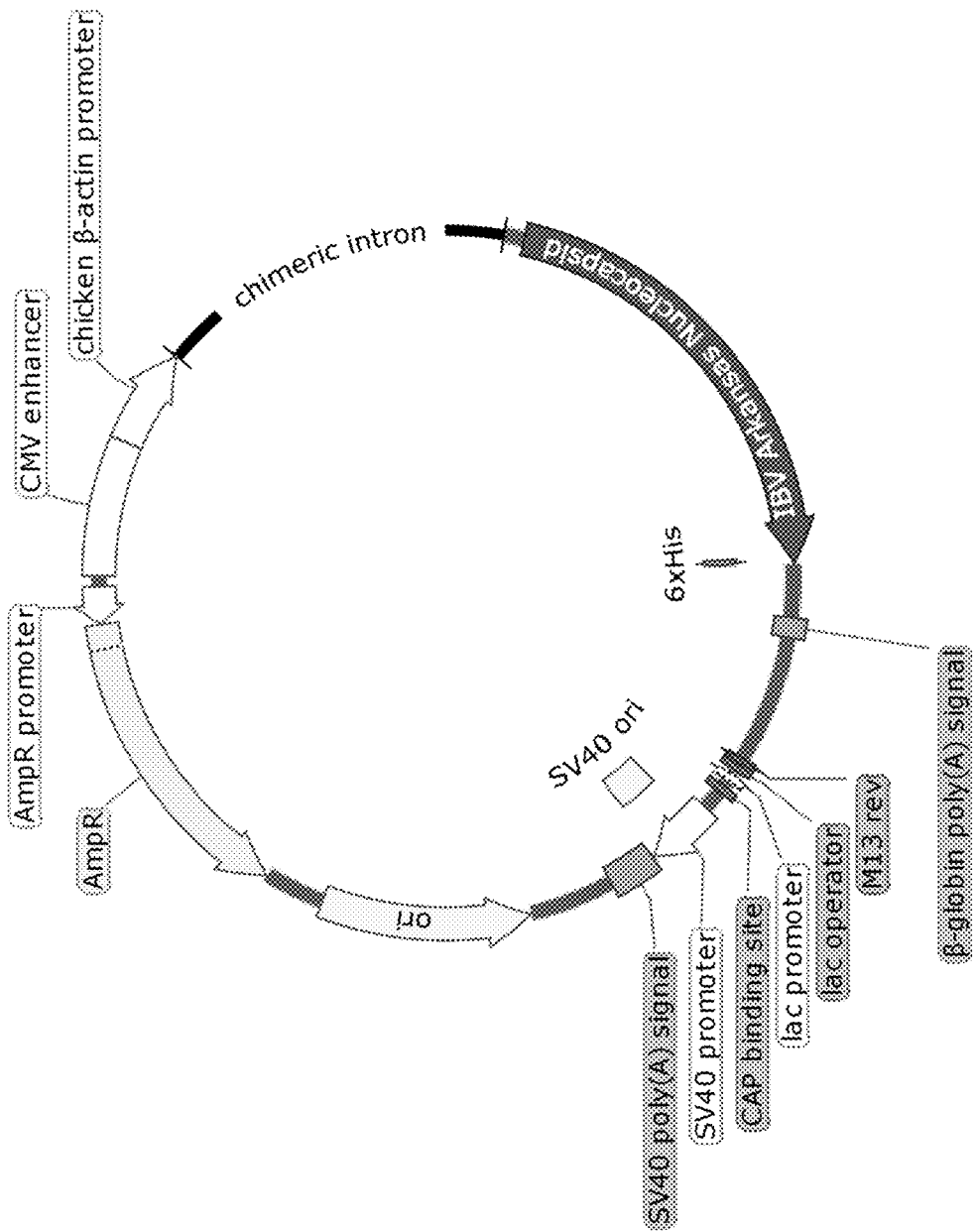
FIG. 28 shows a vector map of the pCAG-IBV Arkansas nucleocapsid plasmid (SEQ ID NO:1).
Figure 30:
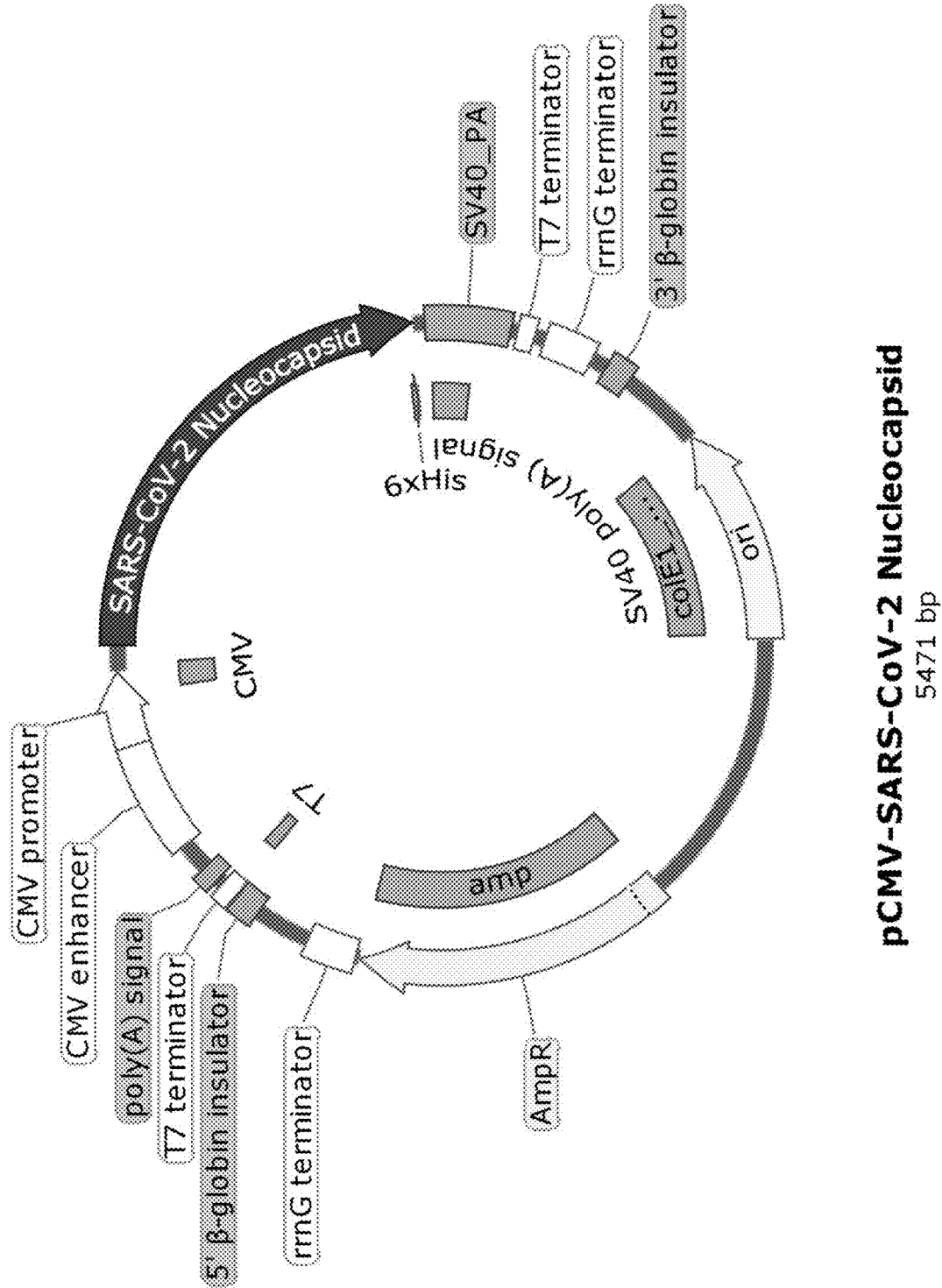
FIG. 30 shows a vector map of amount of a vaccine that is therapeutically effective may vary depending on the particular virus used, or the condition of the subject, and may be determined by a physician.
Figure 31:
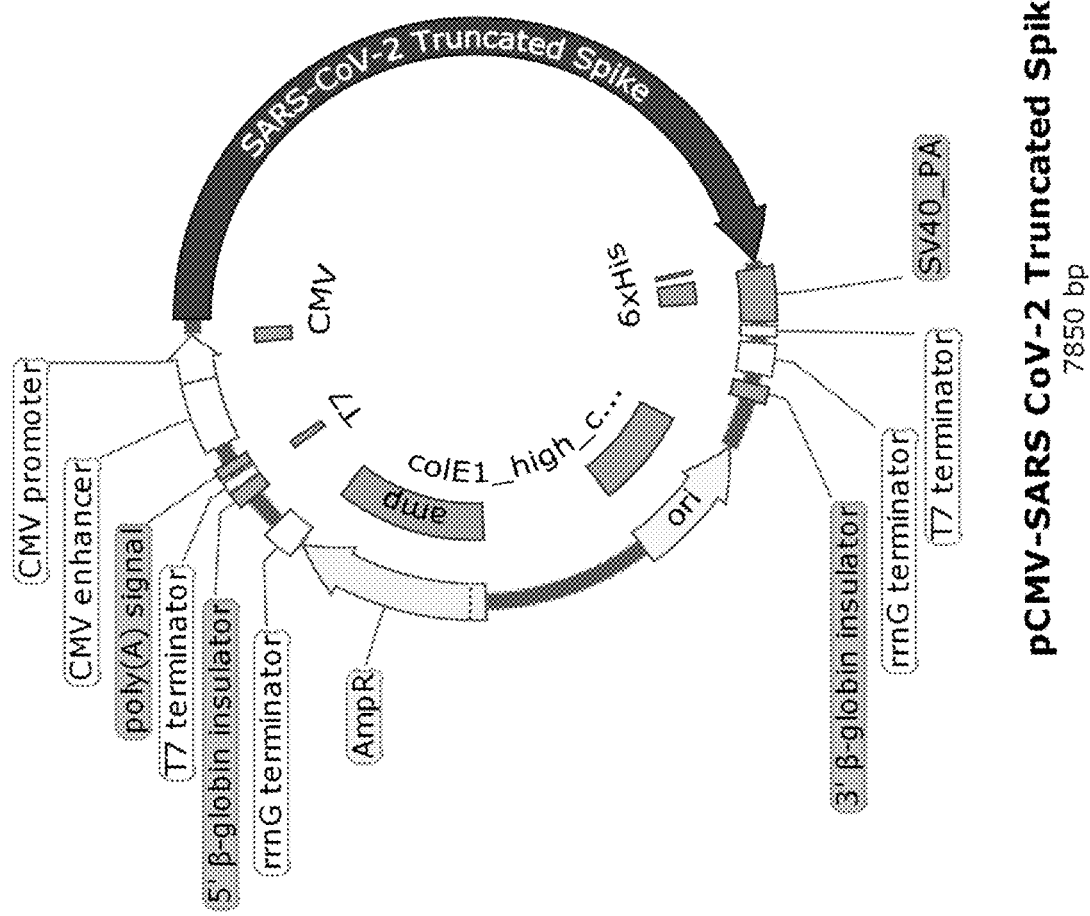

After the pilot study, the ability of pQAC-N to reduce viral shedding in trachea was evaluated in comparison to MLV vaccinated birds. Similar to the previous trials, pQAC-N vaccinated birds had significantly reduced viral shedding in tracheal swabs and clinical severity post challenge on par with MLV vaccinated birds (FIGS. 27C & 27D). Interestingly, MLV vaccinated birds showed signs of respiratory distress as late as 15 dpv, with one bird dying at 10 dpv which was not observed in the other groups and with SPF birds in the previous trial. Diagnostic analysis including necropsy with bacteriology and virology analysis was performed by the Wisconsin Veterinary Diagnostic Laboratory on the dead bird and on a euthanized control bird. Investigation revealed the presence of *Staphylococcus aureus* and *Escherichia coli* superinfection in the dead MLV vaccinated bird which was not detected in the euthanized control bird. Severe locally extensive pulmonary edema was reported in the lungs of the MLV vaccinated bird which was a result of bacteremia/sepsis, the likely cause of death. MLV vaccinated birds were significantly lighter in weight (FIG. 26A) and had reduced weight gain between 14-28 dpv (FIG. 26B), a potential consequence of bacterial superinfection.

Discussion

Many experimental subunit and plasmid DNA vaccines against IBV have been developed and its efficacy detailed in previous studies. Intra muscularly (I.M) and in ovo administered experimental vaccines without adjuvants or complemented with natural and molecular adjuvants like IL-2 and GM-CSF have been shown to reduce viral shedding, clinical signs and improve protection rates against IBV (18-26). Alternative routes such as in ovo administration of 51 plasmid DNA vaccine has also been shown to elicit a modest immune response (19). Compared to 51 protein, higher protection rates against IBV challenge and increased total T-cells were shown with I.M immunization with plasmid encoding N protein (20, 23, 25). In this study, we detail the development of a safe mucosal vaccine adjuvant (QAC) for intranasal immunization, a highly desired feature of mass vaccinations under field condition. The safety of QAC nanocarrier was examined by two common routes of field immunization, I.N and in ovo. Birds intranasally immunized by a single dose or double doses (at 1 and 14 days of age) did not show any signs of respiratory distress, and weight gain was same as observed with control birds. The in ovo immunization also did not affect embryo development and egg hatch rates. Previously, both Quil-A and chitosan were shown to be biocompatible with no adverse effects reported when administered to animals (30-32, 40). Similarly, our results indicate that the QAC adjuvant is safe, tolerable and biocompatible in chicken hosts.

For vaccine efficacy, our experimental vaccine (pQAC-N) was compared to the current commercial MLV in a challenge model adopted based on recommended guidelines from the food and drug administration with modifications (FDA-9CFR). The superiority of the QAC adjuvant system was shown in a challenge model where birds were challenged immediately at 7 days following vaccine boost with a relatively high dose of IBV Ark-DPI (6.5E9 genome copy no or $10^{6.5}$ $EID_{50}$). Specifically, we demonstrated the ability of QAC adjuvant system to enhance immunogenicity and protective efficacy of pCAG-N plasmid vaccine which otherwise conferred partial protection when administered independently (naked pCAG-N). It is possible that N protein uptake and processing by antigen-presenting cells (APCs) is a key step in the downstream activation of B and T-cells for developing a robust memory immune response (41) that was shown in the pQAC-N immunized birds. Factors that influence APC uptake of antigens includes particle surface charge, size, hydrophobicity and others (42). Soluble viral immunogens by themselves owing to their small size (<20 nm) are poorly taken up by APCs. Particulate adjuvant systems with a size range of 20-200 nm have been shown to promote APC uptake by endocytosis (42). Our findings have shown that QAC-based formulations formed spherical disaggregated particles of optimal size (<100 nm) for efficient APC uptake and processing, as expected when the Quil-A surfactant is added. Delivery systems with net positive surface charge like QAC (positive zeta potential 15±4.4 mV), temporarily disrupt membrane of cells causing membrane flipping and/or fusion at cell surfaces mediating payload delivery or enter cells via clathrin-mediated endocytic pathway, a potential pathway for effective antigen uptake (43). Chitosan DNA particles promote the slow release of packaged DNA and similarly, we observed the sustained release of DNA payload complexed with QAC in vitro (44). Our in vitro analysis indicated that QAC could promote targeted delivery of payload into cells and/or act as antigen depots maintaining a sustained release of payload priming immune cells continually. Overall, encapsulation of plasmid DNA by QAC mediated slow release of immunogen which could help in continuous priming of antigen presenting cells and overcome the need for multiple immunizations.

pQAC-N vaccinated SPF birds had a significantly lower viral burden when compared to unvaccinated birds. Chitosan by itself did not reduce viral shedding observed with naked unadjuvanted pCAG-N construct, suggesting a key role of the nanocarrier size and composition used in our hands. Interestingly, a strong correlation between reduced clinical severity and reduction in viral load was observed. The protective efficacy of pQAC-N was comparable to MLV with similar levels of reduced clinical severity and non-significant reduction in viral load observed between both groups. To our knowledge, with the exception of one study, most experimental IBV DNA vaccines have been tested against serotypes not endemic to US, via I.M route and without a comparable commercial live virus group (20-26). Here we observed that the pQAC-N vaccine when administered I.N was able to protect vaccinated birds against a field-relevant IBV Arkansas-DPI, most likely because of the induced localized immunity as suggested before (34, 45). PBMCs harvested from pQAC-N vaccinated birds responded to antigen stimulation ex vivo with significantly higher proliferation than seen with control and other plasmid DNA vaccine groups. Moreover, the analysis of different immunological parameters indicated that pQAC-N induces strong CMI responses in contrast to MLV, which induced potent antibody responses. The induction of CMI responses could be a hallmark for the pQAC-N nanovaccine. IBV N protein is a highly immunogenic antigen with mapped CTL epitopes in the C-terminal which mediate potent CTL memory responses. IBV specific memory CD8+ T-cell responses restrict IBV replication efficiently and are strong correlates of protection for IBV control (34). It is noteworthy here that birds vaccinated with an experimental IBV N-based vaccines generally have a higher percentage and proliferation of CD3+CD8+ T-cells, albeit not specific to IBV, a limitation of assaying total T-cell numbers (20, 23, 25).

To decipher QAC-DNA mediated IBV specific immunity, we used flow cytometry assisted lymphocyte proliferation assay to identify and quantify subsets of T-cells responding to IBV antigen. Similar to results with MTT assay, we noticed lung cells from pQAC-N vaccinated birds had higher stimulation ex vivo when compared to the control groups. More reactive CD8+ and TCRγδ+ T-cells were present in pQAC-N vaccinated birds, albeit non-significant. Large variations in recall proliferation within pQAC-N vaccinated group was observed, a phenomenon that has been reported in other published studies investigating chicken immune responses (46). Presented results suggest that vaccination with pQAC-N confers protection against IBV challenge to levels similar to MLV vaccination and that protection might be attributed to an induction of CD8+ and TCRγδ+ memory T cell responses, rather than CD4+ induction observed with MLV vaccination. Further studies to elucidate the exact mechanism of pQAC-N mediated immunity are needed.

Most commercial breeders are immunized with IBV vaccines and transfer IBV specific IgY to their progeny via egg yolk which can interfere with vaccine efficacy. Prior evidence suggests that DNA vaccination could overcome limitations of early vaccinations by priming the immune system even in the presence of interfering MDA (47-49). Our results indicate that pQAC-N can mediate protection in the presence of MDA reducing viral shedding in lachrymal fluid and in the trachea. As observed in the trial with SPF chicks, IBV specific IgA and IgY were detectable in pQAC N vaccinated birds albeit significantly lower than levels in MLV vaccinated birds. Mortality associated with IBV outbreaks in the field is usually low unless compounded by secondary bacterial infections (50). Interestingly, in the latest trial conducted, MLV vaccinated commercial birds had active bacterial superinfection leading to mortality in one bird (~8%), reduced weight gain and presence of respiratory clinical signs which was not seen in pQAC-N vaccinated birds. This observation underscores the inferior safety profile of commercial MLV vaccines.

Although protective, addition of other inexpensive biocompatible adjuvants to generate a complementing humoral response could be used to the current pQAC-N construct. In summary, we detailed the development of a safe plasmid DNA vaccine complimented by a mucosal adjuvant system (QAC) which protects SPF and commercial birds against IBV challenge by eliciting a strong T-cell immune response. We postulate that the QAC nano-adjuvant system can be used as a vaccine adjuvant for the delivery of plasmid DNA and protein immunogens against other respiratory viruses and intracellular pathogens for poultry and other animals.

Materials and Methods

Cells and Viruses—Expi293F cells obtained from ThermoFisher Scientific was used for confirming expression of IBV Ark N6×His protein from vaccine construct. The cells were cultured in Expi293 medium at 37° C., 125 rpm, 8% CO2 atmosphere in plastic flasks with ventilated caps. The virulent IBV Arkansas DPI strain (a kind gift from Dr Ladman and Dr Gelb) was propagated in 9-day old SPF ECEs and allantoic fluid harvested four days after infection. The stock virus titre was determined using RT-qPCR (see below) and also titrated and expressed as 50% embryo infectious dose ($EID_{50}$) (51). IBV S1 gene sequence of Ark DPI challenge isolate is AF006624.

Preparation of plasmids—Arkansas Nucleocapsid (N6× His) and S1 gene (S1 6×His) was amplified from reverse transcribed cDNA synthesized from IBV Arkansas 99 (ATCC VR-841) with a C-terminus 6×His tag. The forward primer ((5'-ATCACTGAATTCACCATGGCAAGCGGTAAAGCAG-3') SEQ ID NO: 13) and reverse primer ((5'-ATCACTGCGGCCGCTTAGTGGTGATGGTGGATGGTGATGATGACCTCCTCCAAGTTCATTCTCTC CTAGAGCTGC-3') SEQ ID NO: 14) were employed for amplifying N6×His. The forward primer ((5'-ATCACTGAATTCACCATGTTGGTGAAGTCACTGTTTCTAGTG-3') SEQ ID NO: 15) and reverse primer ((5'-ATCACTGCGGCCGCTCAGTGGTGATGGTGATGATGCCCTCCGCCGGAGGATCCAGTT CCATTAGTGATCTTAATGTAAAACTGGTTTTC') SEQ ID NO: 16) were employed for amplifying S1 6×His. Amplified gene fragments were cloned into EcoRI and NotI restriction sites of pCAG-GFP plasmid, a gift from Connie Cepko (addgene plasmid #11150, FIG. 3A). To confirm insertion of genes in the correct orientation, DNA sequencing was performed at the UW-Madison Biotechnology Center with an ABI Prism 3730XL DNA analyzer using BigDye terminators (Applied Biosystems, CA). To confirm expression of N6×His and S1 6×His protein, Expi293F cells seeded in 6-well format was transfected with an optimized ratio of DNA (4 ug): TransIT PRO transfection reagent (2 ul) according to manufacturer's instructions (Mirus Bio, WI, USA). Three days post transfection, cells were harvested for western blot analysis. Cell fractions were boiled in Laemmli sample buffer (BioRad, Hercules, CA, USA) and resolved on a 4-20% SDS-PAGE gel by electrophoresis using a Mini-PROTEAN 3 system (BIO-RAD, CA). Polyacrylamnide gels were electroblotted onto nitrocellulose membranes using a Turboblot® system. Membranes were blocked in 5% (W/V) skim milk and probed with polyclonal anti-6×His HRP antibody (ThermoFisher Scientific, MA1-21315-HRP). Membranes were developed using a solid phase 3,30,5,50-tetramethylbenzidine (TMB) substrate system.

Characterization of nanoparticles—Quil-A (VET-SAP, Desert King) stock solution of 0.2% was made in nuclease free water. Chitosan stock solution (≥75% deacetylated, Sigma) of 0.4% in 1% glacial acetic acid was prepared and diluted to 0.04% in 5 mM sodium acetate buffer, pH 5.5. Both components was heated separately for 30 mins in a 55 C water bath. Equal volume of Quil-A-plasmid DNA solution was added drop by drop to the chitosan solution and the mixture was vortexed for 30 s. The solution was left at room temperature for 1 hour to promote QAC-DNA particle formation. Plasmid DNA was diluted to 100 ug/ml in 50 mM sodium sulphate buffer and Quil-A was added to a final concentration of 0.002%. Size distribution and zeta potential of QAC-NPs in aqueous dispersion was measured by dynamic light scattering (DLS) on a Malvern zetasizer instrument at 25° C. For size distribution, 50 ul of QAC-NPs in solution was placed in a low volume cuvette and analyzed directly. For zeta potential measurement, approximately 1 mL of the QAC-NPs in solution was placed in a disposable capillary zeta potential cell available from the Zetasizer Nano series. TEM experiments were performed at the Medical school Electron Microscopy facility of the University of Wisconsin-Madison using a Philips CM120 transmission electron microscope (FBI, Eindhoven, the Netherlands) at 80 kV. The size and morphology of vaccine preparations was reexamined via negative staining using the drop method. QAC NPs loaded with 1 mg total DNA was resuspended in 600 μL of 0.05 M phosphate buffered saline (PBS, pH 7.4) at 37° C. At each time point, suspensions were removed and centrifuged at 14,000 rcf for 20 min. The supernatant was removed and replaced with PBS and returned to incubation. Supernatant samples were quantified for released DNA from the QAC using a NanoDrop™ Spectrophotometer and compared to the total DNA used. QAC-CEP DNA (5 ug) was added to $3\times10^7$ Expi293F cells seeded into a 6 well plate. 72 hours post addition the presence of GFP+ cells was identified using an upright fluorescence microscope. Background fluorescence was normalized using CEP-Expi293F control cells.

Nanoparticle characterization—The QAC complex forms distinct nanoparticles. Various ratios of Quil-A and chitosan were tested as recited in Table 1 and Table 2 below. Also see FIGS. 12 and 13.

TABLE 1

| Quil-A conc (%) | Chitosan conc (%) | Comments |
|---|---|---|
| 0.00004 | 0.02 | Aggregated structure |
| 0.0002 | | Aggregated structure |
| 0.001 | | Distinct nanostructure |
| 0.005 | | Aggregated structure - thick sheets |
| 0.025 | | Aggregated structure - thick sheets |

TABLE 2

| Quil-A conc (%) | Chitosan conc (%) | Comments |
|---|---|---|
| 0.001 | 0.0008 | Distinct filamentous structures |
| | 0.004 | Aggregated structure |

TABLE 2-continued

| Quil-A conc (%) | Chitosan conc (%) | Comments |
|---|---|---|
| | 0.02 | Distinct nanostrucutres |
| | 0.1 | Distinct nanostructures (size-20 nm ± 2 nm) |
| | 0.5 | Aggregated structure-thick sheets |

QAC-protein protocol—Quil-A stock solution of 0.2% was made in nuclease free water. Chitosan stock solution of 0.4% in 1% glacial acetic acid was prepared and diluted to 0.04% in 5 mM sodium acetate buffer, pH 5.5. Protein was diluted to 100 µg/ml in 50 mM sodium sulfate buffer and Quil-A was added to a final concentration of 0.002%. Equal volume of Quil-A-protein solution was added drop by drop to the chitosan solution and the mixture was vortexed for 30 s. The solution was vigorously mixed in shaking conditions (110 rpm) for 1 hour at 37 C to promote QAC-protein particle formation.

Vaccine safety study—In this study, the tolerability and biocompatibility of pQAC-N was evaluated in 1-day-old white leghorn SPF chicks and ECEs, A total of 30 chicks was divided into 3 groups of 10 each. Chicks from the first group was inoculated with PBS (negative control). Chicks from the other groups were inoculated with either a single dose (100 ug) or 2× the dose (200 ug) of pQAC-N at day-1 via the intranasal route. Chicks were monitored for general or respiratory distress, depression or in appetence and weight gain over the course of 30 days post inoculation. In another experiment, 6 embryonated chicken eggs (ECEs) was divided into 2 groups of 3 each. At 18.5 days post incubation, ECEs were either inoculated with PBS (negative control) or with 100 ug of pQAC-N construct into the allantoic cavity. Embryo development and hatch rate of inoculated ECEs was monitored.

Vaccine efficacy studies—For all the vaccine experiments, birds were challenged with a dose of 6.5E9 genome copy no or $10^{6.5}$ $EID_{50}$/bird of virulent 113V Arkansas DPI strain via direct intranasal instillations. The challenge dose was determined in an independent infection experiment wherein the challenge dose resulted in discernable clinical signs as early as 3 dpc and peak viral load replication was observed at 6 dpc. The protective efficacy of pQAC-N construct was evaluated in 1-day-old white leghorn SPF chicks (Charles River Laboratories). A total of 50 chicks was divided equally into 5 groups (n=10 each) and used for the efficacy study, first 2 groups were inoculated with PBS (negative control) or commercial Arkansas MLV (Mildvac-Ark®, Merck Animal Health USA, positive control) via direct intranasal instillations (dose according to manufacturer's instructions). The other groups were either vaccinated with naked (no adjuvant), chitosan complexed or pQAC-N at day-1 and followed by a booster dose at day-14 via intranasal (IN) route. A vaccine dose (100 ng/bird) was administered at each vaccination time point, At 20 days post first vaccination time point (DPV), PBMCs were harvested from blood collected using previously described protocols for proliferation assay (see below), At 10, 20 DPV & 3 days post challenge (DPC) lachrymal fluid (tears) samples were harvested for ELISA and at 6 DPC for viral load estimation (see below). Lacrimation was induced by placing sodium chloride (salt) crystals on the eyes and tears were collected using micropipettes (52). Clinical severity was noted everyday post challenge for 8 days. The severity scores of clinical signs of 1113V were as follows; 0=normal, 1=Infrequent sneezing (single event during observation), 2=frequent sneezing (more than one event during observation), 1=mild rales, 2=severe rales, 2=presence of nasal exudate. The severity scores of IBV clinical signs, described in the figure legends were recorded once a day for each chicken for 8 days after challenge. The severity score represents as average score of clinical signs measured for each chicken over 8 days (53). Lachrymal fluid harvested at 6 dpc was analyzed for viral RNA using IBV N gene specific RT-qPCR.

In another experiment, pQAC-N was used to immunize 1-day-old commercial white leghorn chicks (Cackle Hatchery®, MO, USA). A total of 10 chicks was divided into 2 groups. Chicks from the first group (n=4) was inoculated with PBS (negative control) while the second group (n=6) was immunized with pQAC-IN construct at day-1 and followed by a booster dose at day-14 via intranasal (IN) route. Blood was collected from birds in the negative control group at day-10, 20 and 24 in age to quantitate MDA IgY, All birds were sampled, challenged and followed for clinical scores and virus titers as described above for the SPF chicks.

In the final experiment, pQAC-N was used to immunize 3-day-old commercial white Leghorn chicks (Welp Hatchery, IA, USA). A total of 35 chicks was divided into 3 groups. Chicks were either inoculated with PBS (negative control, n=11) or commercial Arkansas MIN (Mildvac-Ark®, Merck Animal Health USA, positive control, n=12) or with pQAC-N construct at day-3 and followed by a booster dose at day-17 (14 dpv) via intranasal (IN) route as described above. Blood was collected from all the birds at 0,10,20 and 24 dpv to quantitate MDA IgY and lachrymal fluid from all the birds at 10,20 and 24 dpv to quantitate IBV specific IgA. All birds were sampled, challenged and followed for clinical scores as described above for the SIT chicks. Tracheal swabs were taken at 6 dpc and analyzed for viral RNA using IBV N gene specific RT-qPCR. One bird in MLV group died at 10 dpv, one bird from MLV and PBS control groups each were euthanized at 12 dpv for necropsy and diagnosis by the Wisconsin Veterinary Diagnostic Laboratory (WVDL), Madison, WI, USA.

Recombinant protein purification—The pCAG constructs with S1 6×His and N6×His were transfected into Expi293F cells as described above using TransIT PRO transfection reagent according to manufacturer's instructions (Minis Bio, WI, USA). For S1 6×His purification, supernatant was harvested and for N6×His purification, cells were harvested 3 days after transfection. The samples were purified using Thermo Scientific™ HisPur™ Ni-NTA Resin according to manufacturer's instructions (batch method). The protein was eluted with elution buffer (50 mM sodium phosphate, 0.3 M sodium chloride, 250 mM imidazole pH 8.0). The eluate was concentrated using PEG-20 solution (800 mg/ml) hygroscopically and dialyzed using Thermo Scientific™ SnakeSkin™ Dialysis Tubing (7K MWCO) against PEG free PBS. Protein concentration was determined by Thermo Scientific™ Pierce™ BCA Protein Assay Kit.

IBV specific ELISA—Sera and lachrymal fluid from different time-points were screened for humoral response against IBV Arkansas serotype. In order to measure IgY and IgA antibody levels in plasma and tears of chicken respectively, an IBV-specific enzyme-linked immunosorbent assay (ELISA) was developed as described previously with modifications(54). Briefly, ELISA plates were coated with inactivated IBV Arkansas (100 ng/well, IgY) or IBV Arkansas S1 and N6×His protein (50 ng total/well, IgA) diluted in carbonate/bicarbonate buffer, pH 9.6 and incubated overnight at 4 C followed by blocking with 5% Skim milk to reduce background. A 50 ul of diluted serum (1/200) or tears (1/50) harvested at different time-points from immunized chickens was added to the wells and incubated at 37 C for 1 hour. Post washing (PBS-TritonX 100, 0.1%), either HRP conjugated anti-chicken IgY (NBP1-74778, NOVUS Bio) or anti-chicken IgA (NB7284, NOVUS Bio) at dilutions of 1/1000 was added to the wells and incubated at 37° C. for 1 hr. Post washing, 50 ul of TMB substrate solution was added and incubated for 20 minutes or until color developed. The reaction was stopped by the addition of 1M sulphuric acid and plates are read at 450 nm. To generate standard curves, sera and tears from severely IBV infected chickens from previous experiments was used. Two-fold serial dilutions was assigned and arbitrary value and used for analysis.

Assessment of IBV specific lymphocyte proliferation assay—PBMCs were prepared from harvested blood as described previously (46). PBMCs were adjusted to $10^7$ cells/ml in RPMI 1640 (Invitrogen) supplemented with 10% inactivated fetal calf serum and 100 µl cells per well were transferred into flat-bottomed 96-well plates. Equal volumes of medium containing stimulant (IBV Ark DPI live virus, MOI=1) was added in triplicate and cultures were incubated for 2 days at 41° C., 5% CO2. Negative controls received 100 µl RPMI 1640 medium only. After incubation, to each well, 15 µl of MTT reagent (CellTiter 96 ® Non-Radioactive Cell Proliferation Assay, Promega) and cells incubated for a further 4 hrs at 41° C., 5% CO2 until development of MTT (3-(4,5-dimethylthiazole-2-yl)-2,5-diphenyl-tetrazolium bromide) formazan was observed. Post incubation, Dimethyl sulfoxide (DMSO) was added to dissolve the formazan crystals and incubated for an hour at 41° C., 5% CO2. The absorbance of the purple color was taken at 570 nm in an ELISA plate reader. PBMCs from 4 chicks/group was used to assess proliferative capacity. The output stimulation index (SI) is the ratio of absorbance post stimulation to the absorbance in unstimulated conditions.

Viral load measurement—RNA was extracted from lachrymal fluid (10 µl) or Tracheal swabs (100 µl) collected from chickens using Zymo Direct-Zol™ RNA mini prep kit (Zymo Research, CA, USA) according to manufacturer's instructions. RT-qPCR was conducted in two steps: cDNA synthesis (Invitrogen™ SuperScript™ III First-Strand Synthesis System) and qPCR reactions. cDNA synthesis was performed with 0.5 µl (50 ng/µl) random hexamers, 0.5 µl of 10 mM dNTPs. and 4 µl RNA and heated at 65° C. for 5 min and chilled on ice followed by addition of 1 µl of 10×RT buffer, 1 µl of 0.1 M DTT, 1 µl of 25 mM $MgCl_2$, 0.5 µl of RNaseOUT and 0.5 µl of SuperScript III enzyme in final volume of 10 µl. The reaction conditions include 25° C. for 5 min, 50° C. for 60 min and 70° C. for 15 min. SYBR green RT-qPCR was performed using an IBV N gene specific primer pair set forward primer: 5' ATGCTCAACCTAGTCCCTAGCA 3' (SEQ ID NO: 17) and reverse primer: 5' TCAAACTGCGGATCATCACGT 3' (SEQ ID NO: 18) amplifying 128 nt of N gene of IBV Arkansas DPI. PCRs were performed using a StepOnePlus™ Real-Time PCR System (Applied Biosystems, Foster City, CA, U.S.A) under the following conditions: one cycle 95 C for 2 min followed by 40 cycles of 95 C for 3 sec and 60 C for 30 sec. Each 20 µl reaction was carried out using 1 µl of diluted cDNA (1/10), 10 µl of GoTaq® qPCR mastermix (Promega), 2 µl of forward and reverse primers and 7 µl of nuclease free water. A serial 10-fold dilution of pCAG-IBV Ark N6×His plasmid was used to establish the standard curve. Temperature melt curve analysis was used to confirm the specificity of the product.

Flow cytometric assessment of IBV specific proliferation—A subgroup of additional chicks (N=4 each) from each vaccine group in the SPF chick vaccine efficacy study were used for flow cytometric assessment. All chicks were euthanized at 20 DPV and single cell suspensions from lungs were prepared using standard techniques and used for T-cell proliferation assay. Briefly, lungs were excised and placed in a gentleMACS dissociator M tube (Miltenyi 130-093-236) with 5 mL collagenase B (2 mg/ml, Roche). Lung tissue was processed using the gentleMACS dissociator followed by incubation for 30 min at 37° C. Single-cell suspensions lung were prepared by gently squeezing through a 70-mm cell strainer (Falcon) after lysing RBCs using IX BD Biosciences BD Pharm Lyse™. Total of $10^7$ cells/ml were stained with CellTrace™ Violet Cell Proliferation dye (Thermo Scientific C34557) according to manufacturer's instructions and 100 ul of cells plated/well in RPMI 1640 with 10% chicken immune serum. After overnight incubation at 41° C., 5% CO2, cells were stimulated with 130 ng of IBV Arkansas N6×His protein complexed with chitosan per well in 100 ul of RPMI 1640 with 10% chicken immune serum. Four days post stimulation, cells were stained for surface markers, CD4-AF647 (clone CT-4), CD8α-FITC (clone 3-298) together and TCRγδ-FITC (clone TCR-1) independently for flow cytometry analysis. All antibodies were purchased from SouthernBiotech (Birmingham, AL, USA). All samples were acquired on an BD LSR Fortessa flow cytometer. Data were analyzed with FlowJo software (BD Biosciences). The strategy for gating on proliferating CD4+ and CD8α+ T cells was debris exclusion on the Forward Scatter (FSC)—Side Scatter (SSC) dot plot followed by exclusion of dead cells by fixable viability dye eFluor 780 (Invitrogen™, #65-0865-14) staining. Out of the live cells, total proliferated cells were gated positive using a histogram plot with ef450 on the x-axis (for CellTrace™ Violet). Finally, CD4 cells were gated positive at the AF647 axis and CD8a cells were gated positive at the FITC axis in a FITC-AF647 dot plot. A similar approach was used for identifying proliferating TCRγδ+ T-cells. The output, stimulation index (SI) is the ratio of % proliferating cells post stimulation to the % proliferating cells in unstimulated condition.

Statistical analysis—Statistical analyses were performed using GraphPad software (La Jolla, CA). Weight gain, cellular immune assays, clinical severity scoring, viral loads were compared using an ordinary one-way ANOVA test with multiple comparisons where *, P<0.05; , P<0.01; *, P<0.001; ****, P<0.0001 were considered significantly different among groups. Antibody titers and absolute weight of birds were compared using a two-way ANOVA test where *, P<0.05; , P<0.01; *, P<0.001; ****, P<0.0001 were considered significantly different among groups.

REFERENCES

1 Cook J K A, Jackwood M, Jones R C. 2012. The long view: 40 years of infectious bronchitis research, vol 41, p 239-250.

2. Britton P, Armesto M, Cavanagh D, Keep S. 2012. Modification of the avian coronavirus infectious bronchitis virus for vaccine development. Bioengineered Bugs 3:114-119.

3. Geilhausen H E, Ligon F B, Lukert P D. 1973. The pathogenesis of virulent and avirulent avian infectious bronchitis virus. Archiv f╠╜ r die gesamte Virusforschung 40:285-290.

4. Dolz R, Vergara-Alert Jl, P ⊢-rez Mn, Pujols J, Maj ⊢| Ná. 2012. New insights on infectious bronchitis virus pathogenesis: Characterization of Italy 02 serotype in chicks and adult hens. Veterinary Microbiology 156:256-264.
5. Han Z, Sun C, Yan B, Zhang X, Wang Y, Li C, Zhang Q, Ma Y, Shao Y, Liu Q, Kong X, Liu S. 2011. A 15-year analysis of molecular epidemiology of avian infectious bronchitis coronavirus in China. Infection, Genetics and Evolution 11:190-200.
6. Fraga A P, Balestrin E, Ikuta N, Fonseca A S K, Spilki F R, Canal CiW, Lunge V R. 2013. Emergence of a New Genotype of Avian Infectious Bronchitis Virus in Brazil. Avian Diseases 57:225-232.
7. Cook J K, Jackwood M, Jones R C. 2012. The long view: 40 years of infectious bronchitis research. Avian Pathol 41:239-50.
8. de Wit J J, Cook J K A, van der Heijden H M J F. 2010. Infectious bronchitis virus in Asia, Africa, Australia and Latin America—history, current situation and control measures. Brazilian Journal of Poultry Science 12:97-106.
9. Cavanagh D, Ellis M M, Cook J K A. 1997. Relationship between sequence variation in the S1 spike protein of infectious bronchitis virus and the extent of cross-protection in vivo. Avian Pathology 26:63-74.
10. Gelb J, Weisman Y, Ladman B S, Meir R. 2005. S1 gene characteristics and efficacy of vaccination against infectious bronchitis virus field isolates from the United States and Israel (1996 to 2000). Avian Pathology 34:194-203.
11. Jackwood M W, Hilt D A, McCall A W, Polizzi C N, McKinley E T, Williams S M. 2009.
Infectious bronchitis virus field vaccination coverage and persistence of Arkansas-type viruses in commercial broilers. Avian Dis 53:175-83.
12. Hopkins S R Y H J. 1986. Reversion to virulence of chicken-passaged infectious bronchitis vaccine virus. Avian Diseases.
13. McKinley E T, Hilt D A, Jackwood M W. 2008. Avian coronavirus infectious bronchitis attenuated live vaccines undergo selection of subpopulations and mutations following vaccination. Vaccine 26:1274-84.
14. Lee C W, Jackwood M W. 2001. Origin and evolution of Georgia 98 (GA98), a new serotype of avian infectious bronchitis virus. Virus Research 80:33-39.
15. Wolff J A, Malone R W, Williams P, Chong W, Acsadi G, Jani A, Felgner P L. 1990. Direct gene transfer into mouse muscle in vivo. Science 247:1465-8.
16. Jazayeri S D, Poh C L. 2019. Recent advances in delivery of veterinary DNA vaccines against avian pathogens. Vet Res 50:78.
17. Liu M A. 2003. DNA vaccines: a review. J Intern Med 253:402-10.
18. Zhang P, Wang J, Wang W, Liu X, Liu H, Li X, Wu X. 2017. Astragalus polysaccharides enhance the immune response to avian infectious bronchitis virus vaccination in chickens. Microb Pathog 111:81-85.
19. Kapczynski D R, Hilt D A, Shapiro D, Sellers H S, Jackwood M W. 2003. Protection of chickens from infectious bronchitis by in ovo and intramuscular vaccination with a DNA vaccine expressing the S1 glycoprotein. Avian Dis 47:272-85.
20. Guo Z, Wang H, Yang T, Wang X, Lu D, Li Y, Zhang Y. 2010. Priming with a DNA vaccine and boosting with an inactivated vaccine enhance the immune response against infectious bronchitis virus. J Virol Methods 167:84-9.
21. Tan L, Zhang Y, Liu F, Yuan Y, Zhan Y, Sun Y, Qiu X, Meng C, Song C, Ding C. 2016.
Infectious bronchitis virus poly-epitope-based vaccine protects chickens from acute infection. Vaccine 34:5209-5216.
22. Tian L, Wang H N, Lu D, Zhang Y F, Wang T, Kang R M. 2008. The immunoreactivity of a chimeric multi-epitope DNA vaccine against IBV in chickens. Biochem Biophys Res Commun 377:221-5.
23. Tang M, Wang H, Zhou S, Tian G. 2008. Enhancement of the immunogenicity of an infectious bronchitis virus DNA vaccine by a bicistronic plasmid encoding nucleocapsid protein and interleukin-2. J Virol Methods 149:42-8.
24. Tan B, Wang H, Shang L, Yang T. 2009. Coadministration of chicken GM-CSF with a DNA vaccine expressing infectious bronchitis virus (IBV) S1 glycoprotein enhances the specific immune response and protects against IBV infection. Arch Virol 154:1117-24.
25. Yan F, Zhao Y, Hu Y, Qiu J, Lei W, Ji W, Li X, Wu Q, Shi X, Li Z. 2013. Protection of chickens against infectious bronchitis virus with a multivalent DNA vaccine and boosting with an inactivated vaccine. J Vet Sci 14:53-60.
26. Yang T, Wang H N, Wang X, Tang J N, Gao R, Li J, Guo Z C, Li Y L. 2009. Multivalent DNA vaccine enhanced protection efficacy against infectious bronchitis virus in chickens. J Vet Med Sci 71:1585-90.
27. Oyewumi M O, Kumar A, Cui Z. 2010. Nano-microparticles as immune adjuvants: correlating particle sizes and the resultant immune responses. Expert Rev Vaccines 9:1095-107.
28. Borges O, Borchard G, Verhoef J C, de Sousa A, Junginger H E. 2005. Preparation of coated nanoparticles for a new mucosal vaccine delivery system. Int J Pharm 299:155-66.
29. Brock A. Kingstad-Bakke S S C, YashdeepPhanse, Kathleen A. Ross, MasatoHatta, M. Suresh, Yoshihiro Kawaoka, Jorge E. Osorio, Balaji Narasimhan, Adel M. Talaat. 2019. Effective mosaic-based nanovaccines against avian influenza in poultry. Vaccine.
30. Riteau N, Sher A. 2016. Chitosan: An Adjuvant with an Unanticipated STING. Immunity 44:522-524.
31. Sogias I A, Williams A C, Khutoryanskiy V V. 2008. Why is chitosan mucoadhesive? Biomacromolecules 9:1837-42.
32. Rajput Z I, Hu S H, Xiao C W, Arijo A G. 2007. Adjuvant effects of saponins on animal immune responses. J Zhejiang Univ Sci B 8:153-61.
33. Seo S H, Wang L, Smith R, Collisson E W. 1997. The carboxyl-terminal 120-residue polypeptide of infectious bronchitis virus nucleocapsid induces cytotoxic T lymphocytes and protects chickens from acute infection. J Virol 71:7889-94.
34. Chhabra R, Chantrey J, Ganapathy K. 2015. Immune Responses to Virulent and Vaccine Strains of Infectious Bronchitis Viruses in Chickens. Viral Immunol 28:478-88.
35. Collisson E W, Pei J, Dzielawa J, Seo S H. 2000. Cytotoxic T lymphocytes are critical in the control of infectious bronchitis virus in poultry. Dev Comp Immunol 24:187-200.
36. Seo S H, Pei J, Briles W E, Dzielawa J, Collisson E W. 2000. Adoptive transfer of infectious bronchitis virus primed alphabeta T cells bearing CD8 antigen protects chicks from acute infection. Virology 269:183-9.
37. Mockett A P, Cook J K, Huggins M B. 1987. Maternally-derived antibody to infectious bronchitis virus: Its detection in chick trachea and serum and its role in protection. Avian Pathol 16:407-16.

38. Mondal S P, Naqi S A. 2001. Maternal antibody to infectious bronchitis virus: its role in protection against infection and development of active immunity to vaccine. Vet Immunol Immunopathol 79:31-40.
39. de Wit J J, Cook J K. 2014. Factors influencing the outcome of infectious bronchitis vaccination and challenge experiments. Avian Pathol 43:485-97.
40. Roy K, Mao H Q, Huang S K, Leong K W. 1999. Oral gene delivery with chitosan-DNA nanoparticles generates immunologic protection in a murine model of peanut allergy. Nat Med 5:387-91.
41. Ho N I, Huis In't Veld L G M, Raaijmakers T K, Adema G J. 2018. Adjuvants Enhancing Cross-Presentation by Dendritic Cells: The Key to More Effective Vaccines? Front Immunol 9:2874.
42. Behzadi S, Serpooshan V, Tao W, Hamaly M A, Alkawareek M Y, Dreaden E C, Brown D, Alkilany A M, Farokhzad O C, Mahmoudi M. 2017. Cellular uptake of nanoparticles: journey inside the cell. Chem Soc Rev 46:4218-4244.
43. Harush-Frenkel O, Debotton N, Benita S, Altschuler Y. 2007. Targeting of nanoparticles to the clathrin-mediated endocytic pathway. Biochem Biophys Res Commun 353: 26-32.
44. Mohammed M A, Syeda J T M, Wasan K M, Wasan E K. 2017. An Overview of Chitosan Nanoparticles and Its Application in Non-Parenteral Drug Delivery. Pharmaceutics 9.
45. Chhabra R, Forrester A, Lemiere S, Awad F, Chantrey J, Ganapathy K. 2015. Mucosal, Cellular, and Humoral Immune Responses Induced by Different Live Infectious Bronchitis Virus Vaccination Regimes and Protection Conferred against Infectious Bronchitis Virus Q1 Strain. Clin Vaccine Immunol 22:1050-9.
46. Norup L R, Dalgaard T S, Pedersen A R, Juul-Madsen H R. 2011. Assessment of Newcastle disease-specific T cell proliferation in different inbred MHC chicken lines. Scand J Immunol 74:23-30.
47. Hamers C, Juillard V, Fischer L. 2007. DNA vaccination against pseudorabies virus and bovine respiratory syncytial virus infections of young animals in the face of maternally derived immunity. J Comp Pathol 137 Suppl 1:S35-41.
48. Griot C, Moser C, Cherpillod P, Bruckner L, Wittek R, Zurbriggen A, Zurbriggen R. 2004.
Early DNA vaccination of puppies against canine distemper in the presence of maternally derived immunity. Vaccine 22:650-4.
49. Zhang F, Peng B, Chang H, Zhang R, Lu F, Wang F, Fang F, Chen Z. 2016. Intranasal Immunization of Mice to Avoid Interference of Maternal Antibody against H5N1 Infection. PLoS One 11:e0157041.
50. Ignjatovi-ç J, Sapats S. 2000. Avian infectious bronchitis virus. Revue scientifique et technique (International Office of Epizootics) 19:493-508.
51. MUENCH LJRAH. 1938. A SIMPLE METHOD OF ESTIMATING FIFTY PERCENT ENDPOINTS THE AMERICAN JOURNAL OF HYGIENE 27.
52. Ganapathy K, Cargill P W, Jones R C. 2005. A comparison of methods of inducing lachrymation and tear collection in chickens for detection of virus-specific immuoglobulins after infection with infectious bronchitis virus. Avian Pathol 34:248-51.
53. Shirvani E, Paldurai A, Manoharan V K, Varghese B P, Samal S K. 2018. A Recombinant Newcastle Disease Virus (NDV) Expressing S Protein of Infectious Bronchitis Virus (IBV) Protects Chickens against IBV and NDV. Sci Rep 8:11951.
54. Orr-Burks N, Gulley S L, Toro H, van Ginkel F W. 2014. Immunoglobulin A as an early humoral responder after mucosal avian coronavirus vaccination. Avian Dis 58:279-86.

Example 2

This prophetic example outlines a QAC complex antigen in vivo cross presentation study. Antigen cross presentation is important for effective immune response to tumors and viral infections. Dendritic cells are antigen presenting cells and are unique in their ability to cross-present exogenous antigens on MHC class I molecules and activate antigen specific cytotoxic T cells. This study examines the function of the QAC complex to mediate antigen cross presentation by dendritic cells (DCs, specifically, bone marrow derived DCs and splenic DCs) in an in vivo assay system using soluble ovalbumin protein (OVA).

Figure 15:
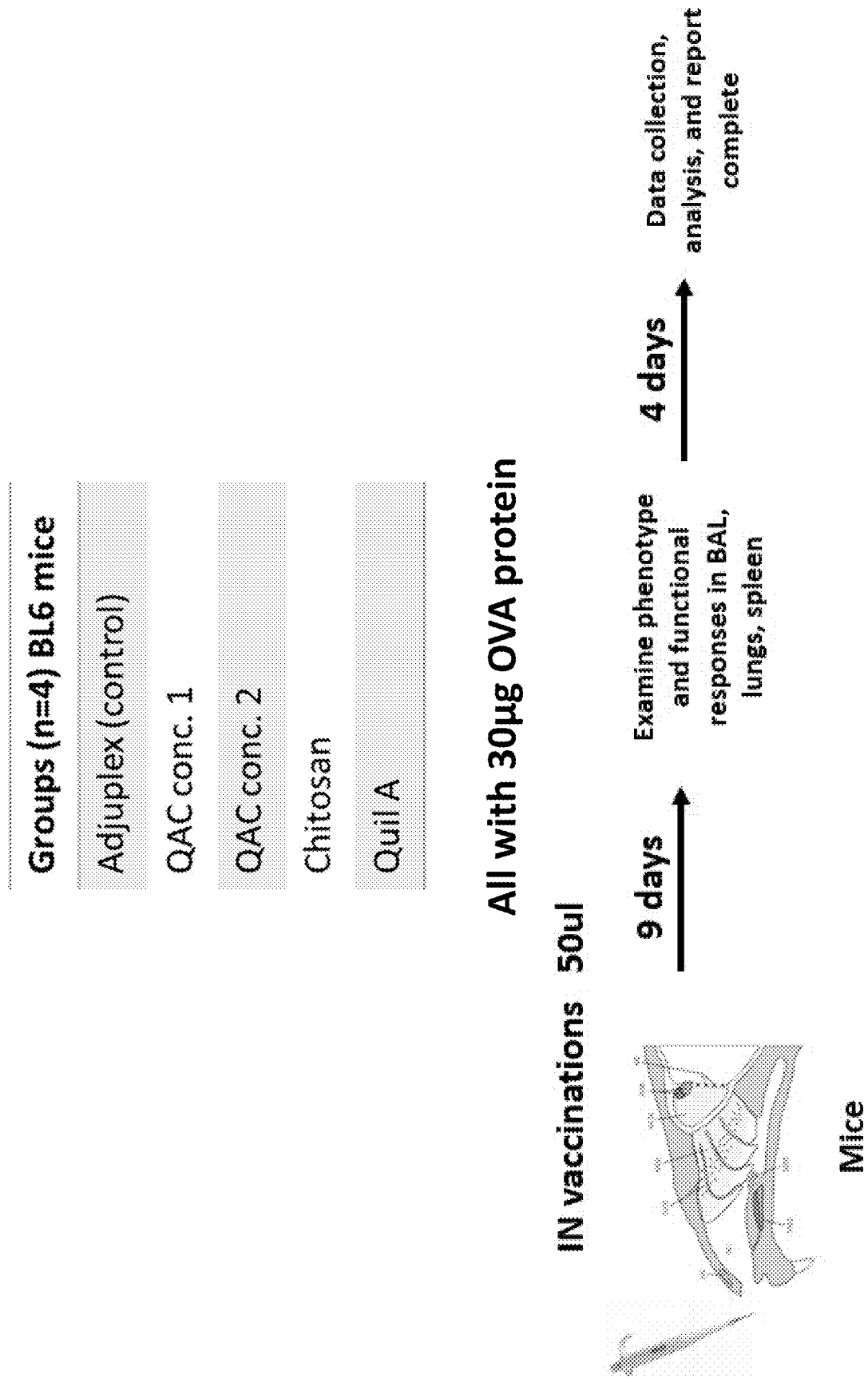

BL6 mice will be separated into groups (n=4) corresponding to treatment with Adjuplex control, a first concentration of QAC complex loaded with 30 µg OVA protein, a second concentration of QAC complex loaded with 30 µg OVA protein, chitosan loaded with 30 µg OVA protein, and Quail-A loaded with 30 µg OVA protein. Mice will receive a 50 µL intra nasal vaccination with the selected treatment. After 9 days, phenotype and functional responses in bronchoalveolar lavage (BAL), lungs, and spleen will be assessed. At 13 days post treatment, data collection and further analysis on the mice will be carried out. (FIG. 15) Phenotypic parameters measured include MHCI tetramers specific to ovalbumin peptide sequence SIINFEKL (SIINFEKL MHCI tetramers, SEQ ID NO: 19), CD103 and CD69 tissue residency, and KLRG1, CD127, CD44, and CD62L expression. Functional parameters measured include ovalbumin immunogenic peptide CD8 sequence SIINFEKL (OVA I CD8 SIINFEKL, SEQ ID NO: 19), ovalbumin immunogenic peptide CD4 sequence ISQAVHAAHAEINEAGR (OVA II CD4 ISQAVHAAHAEINEAGR, SEQ ID NO: 20), and expression of CD4, CD8, IL-2, IL-4, IL-6, IL-10, IL-13, IL-17, IFNg, and TNFa.

This study will confirm that the cross presentation measured in vitro in primary DC cells using the QAC complex is mirrored in vivo. Additionally, the mouse experiment will generate a model immunologic system for QAC mediated cross presentation in vivo for other antigens and immunogens.

Example 3

This prophetic example outlines an in vivo study to measure innate and adaptive immune responses to the loaded QAC complex. The QAC complex can strongly induce cross presentation with OVA in vitro in DC cells. The mouse study presented provides a model immunologic system for the study of in vivo QAC complex induced cross presentation. Measurements including antigen presenting cells will strongly augment the adjuvant mechanism. Chitosan has been demonstrated to work in vitro, but will not function in vivo for protein antigens. The present studies will confirm the function of the QAC complex in antigen presenting cell recruitment and activation.

Figure 16:
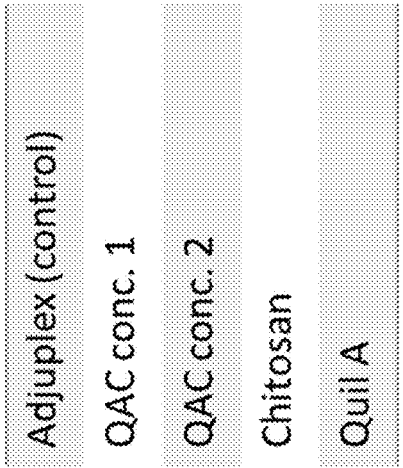
Figure 16:
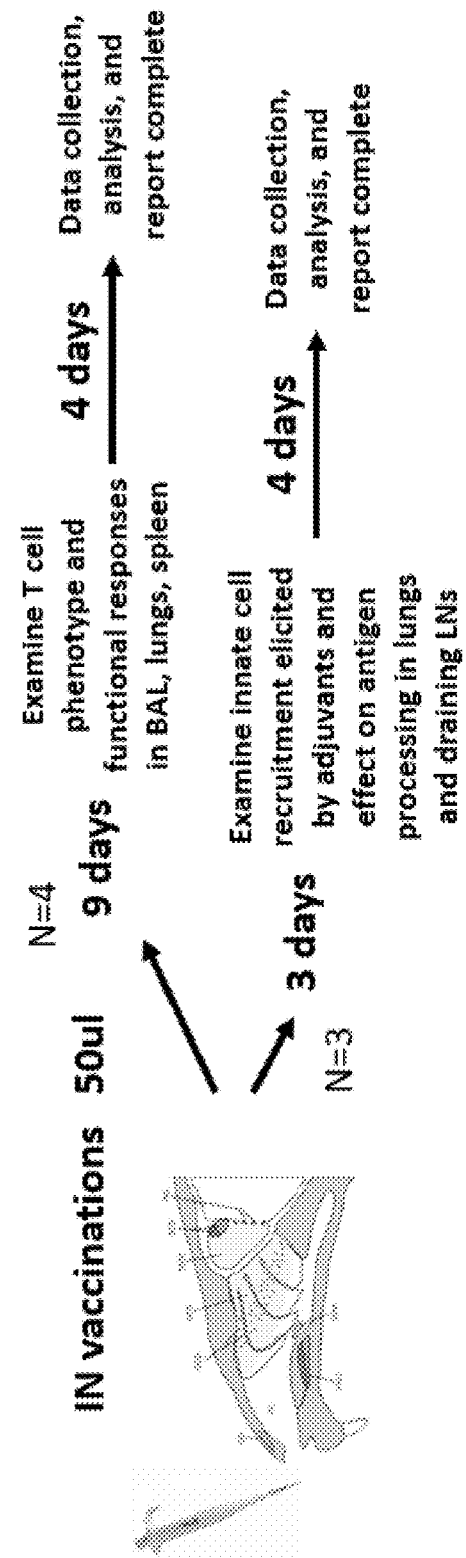
Figure 17:
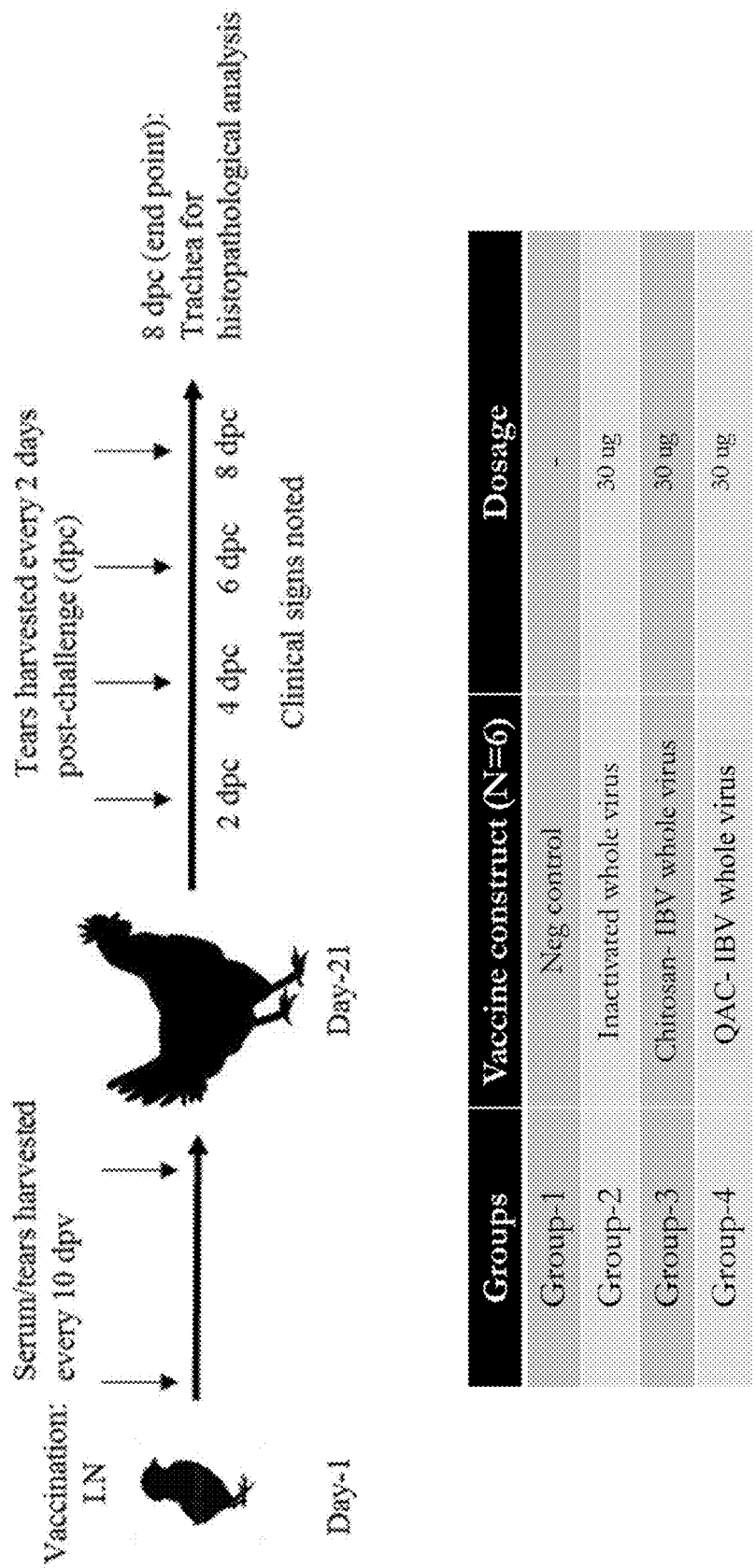

BL6 mice will be separated into groups (n=7) corresponding to treatment with Adjuplex control, a first concentration of QAC complex loaded with 30 µg OVA protein or DQ- OVA protein, a second concentration of QAC complex loaded with 30 μg OVA protein or DQ-OVA protein, chitosan loaded with 30 μg OVA protein or DQ-OVA, and Quail-A loaded with 30 μg OVA protein or DQ-OVA. Mice will receive a 50 μL intra nasal injection of the indicated treatment. After 3 days, mice treated with DQ-OVA will be examined for innate cell recruitment elicited by adjuvants and its effect on antigen processing in lungs and draining lymph nodes (LNs). At 7 days post treatment data collection and further analysis on the mice will be carried out. (FIG. 16). At 4 days after treatment, mice treated with OVA will be examined for T cell phenotype and functional responses in BAL, lungs, and spleen. At 13 days post treatment, data collection and further analysis on the mice will be carried out.

Phenotypic parameters measured in T cells will include SIINFEKL MEW I tetramers, and expression of CD103, CD69, KLRG1, CD127, CD44, and CD62L. Functional parameters measured include OVA I CD8 SIINFEKL, OVA II CD4 ISQAVHAAHAEINEAGR, and expression of CD4, CD8, IL-2, IL-4, IL-6, IL-10, IL-13, IL-17, IFNg, and TNFa. Parameters measured in innate immune cells include antigen uptake, such as uptake of unprocessed Texas Red or digested GFP, and analysis of antigen presenting cells including neutrophils, Alv macs, Eosinophils, CD103 cDCs, monocyte derived DCs, monocyte, Natural Killer cells, and new cell subsets. Antigen presenting cells (APCs) will be analyzed using flow cytometry to assay for antigen uptake which is essentially a flurophore encapsulated by QAC. If there is efficient antigen uptake, antigen presenting cells would have taken up the flurophore. Potent adjuvants are able to efficiently deliver payload to APCs and mediate antigen uptake.

The invention claimed is:

1. A method of forming a composition comprising Quil-A chitosan spherical nanostructures, comprising the steps of:
   heating a first solution comprising Quil-A at about 55° C. for about 30 minutes;
   heating a second solution comprising chitosan at about 55° C. for about 30 minutes;
   mixing equal volumes of the first and second solution to form a combined solution;
   vortex mixing the combined solution for about 30 seconds to form a combined, vortexed solution; and
   incubating the combined vortexed solution whereby a composition comprising Quil-A chitosan spherical nanostructures is formed, wherein the ratio of the concentration of Quil-A in the first solution and the concentration of chitosan in the second solution is between 1:15 weight:weight and 1:100 weight:weight.

2. The method of claim 1, wherein the combined vortexed solution is incubated at room temperature for about 1 hour.

3. The method of claim 2, wherein the first solution additionally comprises a DNA antigen.

4. The method of claim 1, wherein the combined vortexed solution is incubated at about 37 C with shaking at about 110 rpm for about 1 hour.

5. The method of claim 4, wherein the first solution additionally comprises a protein antigen.

6. The method of claim 1, wherein the first solution comprises about 0.002% Quil-A and the second solution comprises about 0.04% chitosan.

7. The method of claim 1, wherein the first solution and the second solution each have a pH between 5.5 and 7.0.

8. A composition comprising Quil-A chitosan spherical nanostructures produced by the method of claim 6.

9. The method of claim 1, wherein the first solution additionally comprises an antigen payload molecule.

10. The method of claim 3, wherein the DNA antigen comprises a sequence encoding a viral polypeptide.

11. The method of claim 10, wherein the viral polypeptide has at least 80% sequence identity to one of SEQ ID NOs: 5, 7, 9, and 11.

12. The method of claim 3, wherein the DNA antigen comprises a sequence with at least 90% identity to one of SEQ ID NOs: 6, 8, 10, and 12.

13. The method of claim 3, wherein the DNA antigen comprises a sequence with at least 90% identity to one of SEQ ID NOs: 1-4.

14. The method of claim 5, wherein the protein antigen comprises a viral antigen.

15. The method of claim 14, wherein the viral antigen comprises an amino acid sequence with at least 80% sequence identity to one of SEQ ID NOs: 5, 7, 9, and 11.

16. The method of claim 9, wherein the antigen payload molecule comprises a sequence encoding a polypeptide with at least 80% sequence identity to one of SEQ ID NOs: 5, 7, 9, and 11.

17. The method of claim 9, wherein the antigen payload molecule comprises a sequence with at least 90% identity to one of SEQ ID NOs: 6, 8, 10, and 12.

18. The method of claim 9, wherein the antigen payload molecule comprises a sequence with at least 90% identity to one of SEQ ID NOs: 1-4.

19. The method of claim 9, wherein the antigen payload molecule comprises a viral antigen.

20. The method of claim 9, wherein the viral antigen comprises an amino acid sequence with at least 80% sequence identity to one of SEQ ID NOs: 5, 7, 9, and 11.

* * * * *